(12) United States Patent
Cabra et al.

(10) Patent No.: US 9,618,002 B1
(45) Date of Patent: Apr. 11, 2017

(54) MINI NOTCHED TURBINE GENERATOR

(71) Applicants: Henry Cabra, Wesley Chapel, FL (US); Sylvia W. Thomas, Orlando, FL (US)

(72) Inventors: Henry Cabra, Wesley Chapel, FL (US); Sylvia W. Thomas, Orlando, FL (US)

(73) Assignee: University of South Florida, Tampa, FL (US)

( * ) Notice: Subject to any disclaimer, the term of this patent is extended or adjusted under 35 U.S.C. 154(b) by 279 days.

(21) Appl. No.: 14/475,663

(22) Filed: Sep. 3, 2014

Related U.S. Application Data

(60) Provisional application No. 61/883,702, filed on Sep. 27, 2013.

(51) Int. Cl.
| | | |
|---|---|---|
| *F01D 15/10* | (2006.01) |
| *F02C 6/00* | (2006.01) |
| *H02K 7/18* | (2006.01) |
| *H02P 9/04* | (2006.01) |
| *F04D 25/06* | (2006.01) |
| *F03B 13/00* | (2006.01) |

(52) U.S. Cl.
CPC ................ *F04D 25/0613* (2013.01)

(58) Field of Classification Search
USPC .................................................... 290/52, 54
See application file for complete search history.

(56) References Cited

U.S. PATENT DOCUMENTS

| | | | | |
|---|---|---|---|---|
| 3,678,629 A | * | 7/1972 | Leliaert | B24C 5/062 |
| | | | | 451/97 |
| 3,970,411 A | * | 7/1976 | Wallman | F04D 29/283 |
| | | | | 415/53.1 |
| 4,041,593 A | * | 8/1977 | Wallman | B21D 53/78 |
| | | | | 29/889.4 |

(Continued)

FOREIGN PATENT DOCUMENTS

EP    1235981 B1    10/2005

OTHER PUBLICATIONS

ABIOMED AB5000 Circulatory Support System—Texas Heart Institute—Heart Assist Devices. [Online]. Available: http://texasheart.org/Research/Devices/abiomed_ab5000.cfm. [Accessed: Apr. 5, 2013].

(Continued)

*Primary Examiner* — Pedro J Cuevas
(74) *Attorney, Agent, or Firm* — Nicholas Pfeifer; Smith & Hopen, P. A.

(57) ABSTRACT

The present invention is turbine generator capable of integration into a bio-physiological or microfluidic system. The generator can convert biomechanical energy into electrical energy by using electromagnetic subsystems to transform the kinetic energy to electricity. These systems have the potential to convert hydraulic energy (such as flow of body fluid, blood flow, contraction of blood vessel, dynamic fluid in nature) into electric energy that may be sufficient for self-powering nano/micro devices and systems, such as artificial organs, valves, sensors, micro motors, and micro robots. The system incorporates a new turbine model having, notched blades; a rotor in levitation; and a special casing capable of integration into a bio-physiological or microfluidic system.

19 Claims, 25 Drawing Sheets
(6 of 25 Drawing Sheet(s) Filed in Color)

(56) References Cited

U.S. PATENT DOCUMENTS

| | | | | |
|---|---|---|---|---|
| 4,289,450 A * | 9/1981 | Kling | B64C 11/001 | 416/189 |
| 4,293,274 A * | 10/1981 | Gilman | F03D 3/061 | 416/132 B |
| 4,359,311 A * | 11/1982 | Benesh | F03D 3/061 | 416/197 A |
| 4,362,470 A * | 12/1982 | Locastro | F03D 3/061 | 416/197 A |
| 4,526,007 A * | 7/1985 | Smith | F01B 21/04 | 310/46 |
| 4,555,637 A * | 11/1985 | Irvine | F01D 15/10 | 290/52 |
| 4,730,983 A * | 3/1988 | Naudet | F01D 11/006 | 416/220 R |
| 4,731,545 A * | 3/1988 | Lerner | H02K 7/1823 | 290/43 |
| 4,740,711 A * | 4/1988 | Sato | F01B 13/061 | 290/52 |
| 4,802,824 A * | 2/1989 | Gastebois | F01D 5/282 | 416/193 A |
| 4,830,570 A * | 5/1989 | Benesh | F03D 3/02 | 415/4.4 |
| 5,261,785 A * | 11/1993 | Williams | F01D 25/32 | 415/169.2 |
| 5,494,407 A * | 2/1996 | Benesh | F03D 3/005 | 416/197 A |
| 5,509,784 A * | 4/1996 | Caruso | F01D 5/3046 | 416/190 |
| 5,594,288 A * | 1/1997 | Husain | F01D 5/028 | 310/62 |
| 6,011,334 A * | 1/2000 | Roland | H02K 7/11 | 290/43 |
| 6,097,104 A * | 8/2000 | Russell | F03D 9/008 | 290/1 R |
| 6,172,429 B1 * | 1/2001 | Russell | F03D 9/008 | 290/4 R |
| 6,234,754 B1 * | 5/2001 | Zelesky | F01D 5/187 | 415/115 |
| 6,363,612 B1 * | 4/2002 | Roberts | B24B 19/14 | 29/402.06 |
| 6,422,821 B1 * | 7/2002 | Lee | F01D 5/186 | 416/224 |
| 6,518,680 B2 * | 2/2003 | McDavid, Jr. | F03D 1/04 | 290/54 |
| 6,655,919 B2 | 12/2003 | Rossi et al. | | |
| 6,710,469 B2 * | 3/2004 | McDavid, Jr. | F03D 1/04 | 290/44 |
| 6,800,955 B2 * | 10/2004 | McDavid, Jr. | F03D 1/04 | 290/43 |
| 6,822,343 B2 | 11/2004 | Estevez | | |
| 6,827,682 B2 | 12/2004 | Bugge et al. | | |
| 7,008,171 B1 * | 3/2006 | Whitworth | F03D 3/061 | 415/4.2 |
| 7,270,518 B2 * | 9/2007 | Barb | F01D 5/147 | 416/191 |
| 7,275,914 B2 | 10/2007 | Geppert et al. | | |
| 7,287,954 B2 * | 10/2007 | Kinkaid | F03D 3/061 | 415/4.2 |
| 7,312,545 B2 * | 12/2007 | Sasaki | B62D 5/0406 | 310/68 B |
| 7,704,045 B1 | 4/2010 | Liang | | |
| 7,723,860 B2 * | 5/2010 | Nagler | F03B 13/00 | 290/43 |
| 7,729,767 B2 | 6/2010 | Baker, III et al. | | |
| 7,887,295 B2 | 2/2011 | Brittingham et al. | | |
| 7,896,608 B2 * | 3/2011 | Whitworth | F03D 3/02 | 415/4.2 |
| 8,587,144 B2 * | 11/2013 | Urch | F03B 17/061 | 290/54 |
| 8,770,939 B2 * | 7/2014 | Tsukuda | F01D 5/3046 | 416/217 |
| 8,847,423 B2 * | 9/2014 | Wang | F03D 3/067 | 290/43 |
| 8,933,575 B2 * | 1/2015 | Lipman | F03B 13/264 | 290/54 |
| 8,981,585 B2 * | 3/2015 | Soong | F03B 13/10 | 290/54 |
| 9,074,580 B2 * | 7/2015 | Curtis | F03D 3/02 | |
| 9,291,153 B2 * | 3/2016 | Ortiz | B60K 6/485 | |
| 9,464,527 B2 * | 10/2016 | Thompson, Jr. | F01D 5/185 | |
| 9,470,605 B2 * | 10/2016 | Koonankeil | F01D 5/005 | |
| 9,494,043 B1 * | 11/2016 | Lee | F01D 11/08 | |
| 9,506,352 B2 * | 11/2016 | Lehmann | F01D 5/188 | |
| 9,518,562 B2 * | 12/2016 | Mongeau | F03D 9/002 | |
| 2002/0090301 A1 * | 7/2002 | Lee | F01D 5/186 | 416/224 |
| 2002/0180216 A1 * | 12/2002 | McDavid, Jr. | F03D 1/04 | 290/54 |
| 2003/0025334 A1 * | 2/2003 | McDavid, Jr. | F03D 1/04 | 290/54 |
| 2005/0256549 A1 | 11/2005 | Holzer | | |
| 2006/0006749 A1 * | 1/2006 | Sasaki | B62D 5/0406 | 310/68 R |
| 2006/0263213 A1 * | 11/2006 | Barb | F01D 5/147 | 415/208.1 |
| 2007/0077145 A1 * | 4/2007 | Kinkaid | F03D 3/061 | 416/197 A |
| 2008/0200963 A1 | 8/2008 | Pless et al. | | |
| 2008/0284174 A1 * | 11/2008 | Nagler | F03B 13/00 | 290/54 |
| 2010/0266382 A1 * | 10/2010 | Campe | F03D 1/0608 | 415/1 |
| 2010/0317977 A1 | 12/2010 | Piaget et al. | | |
| 2011/0008173 A1 * | 1/2011 | Tsukuda | F01D 5/3046 | 416/220 R |
| 2011/0250068 A1 | 10/2011 | Haugen | | |
| 2014/0161616 A1 * | 6/2014 | Mardis | F01D 11/006 | 416/193 A |
| 2014/0217738 A1 * | 8/2014 | Lipman | F03B 13/264 | 290/54 |
| 2015/0369073 A1 * | 12/2015 | Japikse | F04D 29/664 | 415/115 |
| 2016/0076546 A1 * | 3/2016 | Arnold | F04D 25/166 | 416/179 |
| 2016/0245095 A1 * | 8/2016 | Chouhan | F01D 5/20 | |
| 2016/0258301 A1 * | 9/2016 | Chouhan | F01D 5/20 | |
| 2016/0258414 A1 * | 9/2016 | Grove-Nielsen | F03D 1/001 | |
| 2016/0319675 A1 * | 11/2016 | Ahmad | F01D 5/187 | |
| 2016/0348684 A1 * | 12/2016 | Kuhns | F04D 25/045 | |
| 2016/0376910 A1 * | 12/2016 | Sellers | F01D 1/04 | 290/52 |

OTHER PUBLICATIONS

D. P. Arnold, S. Das, J. W. Park, I. Zana, J. H. Lang, and M. G. Allen, "Microfabricated high-speed axial-flux multiwatt permanent-magnet generatorsGenerators-Part II: Design, Fabrication, and Testing" Journal of Microelectromechanical Systems, vol. 15, No. 5, pp. 1351-1363, 2006.

David P. Arnold and Mark G. Allen, Chapter 5 Fabrication of Microscale Rotating Magnetic Machines, Multi-Wafer Rotating MEMS Machines, J. Lang, Ed. Springer US, 2010, pp. 157-190.

Kateryna Bazaka and Mohan V. Jacob, Implantable Devices: Issues and Challenges, Electronics 2013, 2, 1-34.

J.R. Bumby and R. Martin, Axial-flux permanent-magnet air-cored generator for small-scale wind turbines, IEE Proc.-Electr. Power Appl., vol. 152, No. 5, Sep. 2005.

D. J. Burke, E. Burke, F. Parsaie, V. Poirier, K. Butler, D. Thomas, L. Taylor, and T. Maher, "The HeartMate II: Design and Development of a Fully Sealed Axial Flow Left Ventricular Assist System," Artificial Organs, vol. 25, No. 5, pp. 380-385, 2001.

S. Chalasani and J. M. Conrad, "A survey of energy harvesting sources for embedded systems," in IEEE Southeastcon, 2008, pp. 442-447.

Bi Chao, Hard Disk Drive Spindle Motor System Design for Data Recording With Ultrahigh TPI, IEEE Transactions on Magnetics, vol. 45, No. 11, Nov. 2009.

(56) References Cited

OTHER PUBLICATIONS

P. C. P. Chao, C. I. Shao, C. X. Lu, and C. K. Sung, "A new energy harvest system with a hula-hoop transformer, micro-generator and interface energy-harvesting circuit," Microsyst Technol, vol. 17, No. 5-7, pp. 1025-1036, Jun. 2011.
K. T. Chau, C. C. Chan, and Chunhua Liu, Overview of Permanent-Magnet Brushless Drives for Electric and Hybrid Electric Vehicles, IEEE Transactions on Industrial Electronics, vol. 55, No. 6, Jun. 2008, pp. 2246-2257.
Jianyi Chen, Chemmangot V. Nayar, and Longya Xu, Design and Finite-Element Analysis of an Outer-Rotor Permanent-Magnet Generator for Directly Coupled Wind Turbines, IEEE Transactions on Magnetics, vol. 36, No. 5, Sep. 2000, pp. 3802-3809.
Y. J. Chen, C. T. Pan, Z. H. Liu, Analysis of an in-plane microgenerator with various microcoil shapes, Microsyst Technol (2013) 19:43-52.
Y. D. Choi, J. I. Lim, Y. T. Kim, and Y. H. Lee, "Performance and Internal Flow Characteristics of a Cross-Flow Hydro Turbine by the Shapes of Nozzle and Runner Blade," Journal of Fluid Science and Technology, vol. 3, No. 3, pp. 398-409, 2008.
"Circulatory & Ventricular Assist Devices—Center for Circulatory Support—University of Michigan Cardiac Surgery." [Online]. Available: http://www.med.umich.edu/cardiac-surgery/patient/adult/ccs/vad.shtml. [Accessed: Apr. 5, 2013].
Bryan R. Cobb, Kendra V. Sharp, Impulse (Turgo and Pelton) turbine performance characteristics and their impact on pico-hydro installations, Renewable Energy 50 (2013) 959-964.
R. Cordero, A. Rivera, M. Neuman, R. Warrington, and E. Romero, "Microrotational electromagnetic generator for high speed applications," presented at the 2012 IEEE 25th International Conference on Micro Electro Mechanical Systems (MEMS), 2012, pp. 1257-1260.
S. Das, D. P. Arnold, I. Zana, J. W. Park, M. G. Allen, and J. H. L. Lang, "Microfabricated high-speed axial-flux multiwatt permanent-magnet generators-Part I: Modeling," Microelectromechanical Systems, Journal of, vol. 15, No. 5, pp. 1330-1350, 2006.
Jesus De Andrade, Christian Curiel, Frank Kenyery, Orlando Aguillon, Auristela Vasquez, and Miguel Asuaje, Numerical Investigation of the Internal Flow in a Banki Turbine, International Journal of Rotating Machinery vol. 2011, pp. 1-12.
Lokenath Debnath, The legacy of Leonhard Euler—a tricentennial tribute, International Journal of Mathematical Education in Science and Technology, vol. 40, No. 3, Apr. 15, 2009, 353-388.
M. Durali and M. I. of T. T. A. Program, Design of small water turbines for farms and small communities. Technology Adaptation Program, Massachusetts Institute of Technology, 1976, pp. 1-150.
A. M. EL-Refaie and T. M. Jahns, "Optimal flux weakening in surface PM machines using concentrated windings," in Conference Record of the 2004 IEEE Industry Applications Conference, 2004. 39th IAS Annual Meeting, 2004, vol. 2, pp. 1038-1047, vol. 2. 56, pp. 1038-1047.
A. C. Fernandez-Pello, A. P. Pisano, K. Fu, D. C. Walther, A. Knobloch, F. Martinez, M. Senesky, C. Stoldt, R. Maboudian, S. Sanders, and D. Liepmann, "MEMS Rotary Engine Power System," IEEJ Transactions on Sensors and Micromachines, vol. 123, No. 9, pp. 326-330, 2003.
O. H. Frazier, C. Gemmato, T. J. Myers, I. D. Gregoric, B. Radovancevic, P. Loyalka, and B. Kar, "Initial Clinical Experience with the HeartMate® II Axial-Flow Left Ventricular Assist Device," Tex Heart Inst J, vol. 34, No. 3, pp. 275-281. 2007.
N. Ghalichechian, A. Modafe, M. I. Beyaz, and R. Ghodssi, "Design, Fabrication, and Characterization of a Rotary Micromotor Supported on Microball Bearings," Journal of Microelectromechanical Systems, vol. 17, No. 3, pp. 632-642, 2008.
J.L. Gordon, Hydraulic turbine efficiency, Can. J. Civ. Eng. 28: 238-253 (2001).
Kevin E Griffith, Eric Jenkins, Abiomed Impella® 2.5 patient transport: lessons learned, Perfusion, vol. 25, No. 6, pp. 381-386, 2010.

S. Haj-Yahia, E. J. Birks, P. Rogers, C. Bowles, M. Hipkins, R. George, M. Amrani, M. Petrou, J. Pepper, and G. Dreyfus, "Midterm experience with the Jarvik 2000 axial flow left ventricular assist device," The Journal of Thoracic and Cardiovascular Surgery, vol. 134, No. 1, pp. 199-203, 2007.
Florian Herrault, Chang-Hyeon Ji, and Mark G. Allen, Ultraminiaturized High-Speed Permanent-Magnet Generators for Milliwatt-Level Power Generation, Journal of Microelectromechanical Systems, vol. 17, No. 6, Dec. 2008, pp. 1376-1387.
A. S. Holmes, G. Hong, K. R. Pullen, and K. R. Buffard, "Axial-flow microturbine with electromagnetic generator: design, CFD simulation, and prototype demonstration," presented at the Micro Electro Mechanical Systems, 2004. 17th IEEE International Conference on. (MEMS), 2004, pp. 568-571.
T. Ikeda, S. Ilo, and K. Tatsuno, "Performance of nano-hydraulic turbine utilizing waterfalls," Renewable Energy, vol. 35, No. 1, pp. 293-300, 2010.
J. D. Jackson and R. F. Fox, "Classical electrodynamics," American Journal of Physics, vol. 67, p. 841, 1999.
D. K. Jang and J.-H. Chang, "Development of a new spindle motor for a hard disk drive," Microsyst Technol (2013) 19, pp. 1601-1606, Sep. 2013.
B. S. Jeon, K. J. Park, S. J. Song, Y. C. Joo, and K. D. Min, "Design, fabrication, and testing of a MEMS microturbine," J Mech Sci Technol, vol. 19, No. 2, pp. 682-691, Feb. 2005.
L. Jiangtao, "Analysis and determination of cogging torque and unbalanced magnetic forces in permanent magnet spindle motors for hard disk drives," Dissertation 2006, pp. 1-257.
S. Kerzenmacher, J. Ducrée, R. Zengerle, and F. von Stetten, "An abiotically catalyzed glucose fuel cell for powering medical implants: Reconstructed manufacturing protocol and analysis of performance," Journal of Power Sources, vol. 182, No. 1, pp. 66-75, Jul. 2008.
S. Kerzenmacher, J. Ducrée, R. Zengerle, and F. von Stetten, "Energy harvesting by implantable abiotically catalyzed glucose fuel cells," Journal of Power Sources, vol. 182, No. 1, pp. 1-17, Jul. 2008.
R. Krishnamani, D. DeNofrio, and M. A. Konstam, "Emerging ventricular assist devices for long-term cardiac support," Nature Reviews Cardiology, vol. 7, No. 2, pp. 71-76, 2010.
Q. Li, V. Naing, and J. M. Donelan, "Development of a biomechanical energy harvester," Journal of NeuroEngineering and Rehabilitation, vol. 6, No. 1, p. 22, Jun. 2009.
Z. J. Liu, C. Bi, Q. D. Zhang, M. A. Jabbar, and T. S. Low, "Electromagnetic design for hard disk drive spindle motors with fluid film lubricated bearings," IEEE Transactions on Magnetics, vol. 32. No. 5, pp. 3893-3895, Sep. 1996.
C. S. Liu, P. D. Lin, and M. C. Tsai, "A miniature spindle motor with fluid dynamic bearings for portable storage device applications," Microsystem Technologies, vol. 15, No. 7, pp. 1001-1007, 2009.
M. Lossec, B. Multon, and H. Ben Ahmed, "Micro-kinetic generator: Modeling, energy conversion optimization and design considerations," in MELECON 2010, 15th IEEE Mediterranean Electrotechnical Conference, 2010, pp. 1516-1521.
J. Lueke and W. A. Moussa, "MEMS-Based Power Generation Techniques for Implantable Biosensing Applications," Sensors (Basel), vol. 11, No. 2, pp. 1433-1460, Jan. 2011.
J. C. Marongiu, F. Leboeuf, J. Caro, and E. Parkinson, "Free surface flows simulations in Pelton turbines using an hybrid SPH-ALE method," Journal of Hydraulic Research, vol. 48, No. sup1, pp. 40-49, 2010.
J. Martinez-Quijada and S. Chowdhury, "Body-Motion Driven MEMS Generator for Implantable Biomedical Devices," presented at the Electrical and Computer Engineering, 2007. CCECE 2007. Canadian Conference on, 2007, pp. 164-167.
J. Martinez-Quijada and S. Chowdhury, "A two-stator MEMS power generator for cardiac pacemakers," in IEEE International Symposium on Circuits and Systems, 2008. ISCAS 2008, 2008, pp. 161-164.
"[Micro and Precision Engineering Research Group] Microturbine for electric power generation." [Online]. Available: http://www.mech.kuleuven.be/micro/topics/turbine/. [Accessed: Apr. 2, 2013].

(56) References Cited

OTHER PUBLICATIONS

K. Miyazaki, M. Takashiri, J. -i. Kurosaki, B. Lenoir, A. Dauscher, and H. Tsukamoto, "Development of a micro-generator based on Bi2Te3 thin films," presented at the Thermoelectrics, 2007. ICT 2007. 26th International Conference on, 2007, pp. 294-299.

Y. Nakanishi, S. Iio, Y. Takahashi, A. Kato, and T. Ikeda, "Development of a Simple Impulse Turbine for Nano Hydropower," Journal of Fluid Science and Technology, vol. 4, No. 3, pp. 567-577, 2009.

J. Peirs, D. Reynaerts, and F. Verplaetsen, "A microturbine for electric power generation," Sensors and Actuators A: Physical, vol. 113, No. 1, pp. 86-93, Jun. 2004.

"Permanent Magnets—Magnetism & Spin Electronics—Physics—Trinity College Dublin." [Online]. Available: http://www.tcd.ie/Physics/Magnetism/Research/permanent.php. [Accessed: Oct. 18, 2013].

A. Perrig, "Hydrodynamics of the free surface flow in Pelton turbine buckets," EPFL Theses, No. 3715, 2007, pp. 1-242.

B. Philippon, "Design of a film cooled MEMS micro turbine," Massachusetts Institute of Technology, 2001, pp. 1-120.

H. Polinder and M. J. Hoeijmakers, "Analytic calculation of the magnetic field in PM machines," in , Conference Record of the 1997 IEEE Industry Applications Conference, 1997. Thirty-Second IAS Annual Meeting, IAS '97, 1997, vol. 1, pp. 35-41.

C. R. Saha, T. O'Donnell, N. Wang, and P. McCloskey, "Electromagnetic generator for harvesting energy from human motion," Sensors and Actuators A: Physical, vol. 147, No. 1, pp. 248-253, Sep. 2008.

M. S. Slaughter, M. A. Sobieski, D. Tamez, T. Horrell, J. Graham, P. S. Pappas, A. J. Tatooles, and J. LaRose, "HeartWare Miniature Axial-Flow Ventricular Assist Device," Tex Heart Inst J, vol. 36, No. 1, pp. 12-16, 2009.

S. Takatani, "Progress of rotary blood pumps," Artificial organs, vol. 30, No. 5, pp. 317-321, 2006.

D. Timms, "A review of clinical ventricular assist devices," Medical Engineering & Physics, vol. 33, No. 9, pp. 1041-1047, Nov. 2011.

D. L. Trumper, W. Kim, and M. E. Williams, "Design and analysis framework for linear permanent-magnet machines," IEEE Transactions on Industry Applications, vol. 32, No. 2, pp. 371-379, 1996.

M. C. Tsai and L. Y. Hsu, "Design of a Miniature Axial-Flux Spindle Motor With Rhomboidal PCB Winding," IEEE Transactions on Magnetics, vol. 42, No. 10, pp. 3488-3490.

Wang, J. Liu, Song, and Z. L. Wang, "Integrated Nanogenerators in Biofluid," Nano Letters, vol. 7, No. 8, pp. 2475-2479, 2007.

Z. Wang, "Energy harvesting for self-powered nanosystems," Nano Research, vol. 1, No. 1, pp. 1-8, Jul. 2008.

S. J. Williamson, B. H. Stark, and J. D. Booker, "Performance of a low-head picohydro Turgo turbine," Applied Energy, vol. 102, pp. 1114-1126, Feb. 2013.

R. Yang, Y. Qin, C. Li, G. Zhu, and Z. L. Wang, "Converting Biomechanical Energy into Electricity by a Muscle-Movement-Driven Nanogenerator," Nano Letters, vol. 9, No. 3, pp. 1201-1205, Mar. 2009.

Z. Q. Zhu and C. C. Chan, "Electrical machine topologies and technologies for electric, hybrid, and fuel cell vehicles," in Vehicle Power and Propulsion Conference,2008. VPPC'08. IEEE, 2008, pp. 1-6.

* cited by examiner

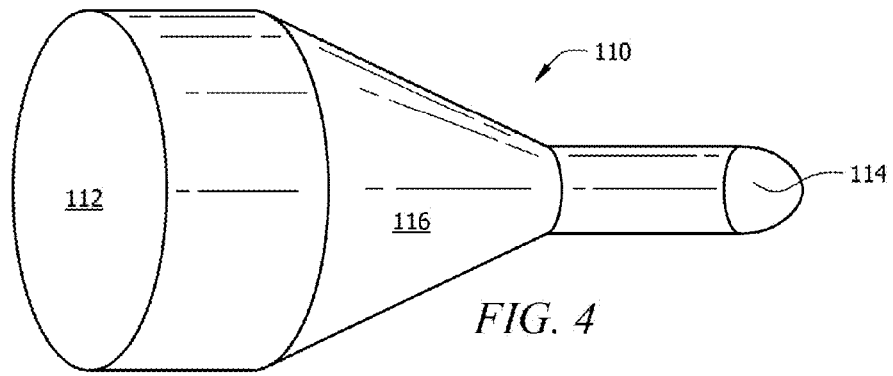
FIG. 4
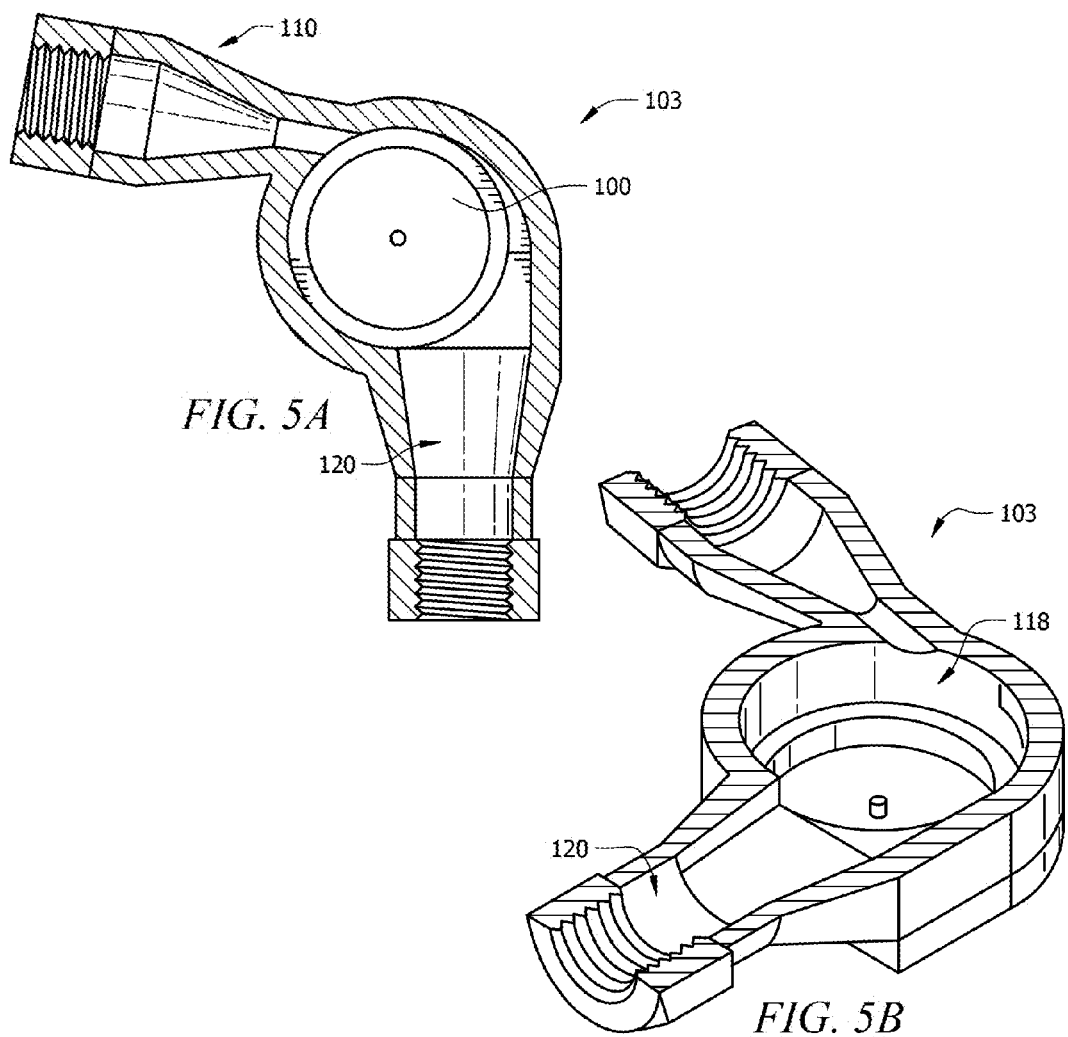
FIG. 5A
FIG. 5B

MINI NOTCHED TURBINE GENERATOR

CROSS-REFERENCE TO RELATED APPLICATIONS

This nonprovisional application claims priority to provisional application No. 61/883,702, entitled "MINI NOTCHED TURBINE GENERATOR," filed Sep. 27, 2013 by the same inventors.

BACKGROUND OF THE INVENTION

1. Field of the Invention

This invention relates to turbine generators, and more specifically to a turbine generator capable of integration into a bio-physiological or microfluidic system.

2. Brief Description of the Related Art

Currently, there are many devices, such as a cochlear implant, a cardiac pacemaker, or an artificial heart, that can be integrated into the human body to enhance the quality of life or allow for the continuation of life. While these implantable devices do improve the quality of life, they are limited due to their use of batteries. The problem is not only that the battery is made from toxic chemicals, but also that the battery life is finite. At the end of the battery's life, the patient with the implant must have the battery surgically replaced. Repeated surgeries are expensive and may adversely affect the patient's quality of life.

Accordingly, there is a need for an efficient means of powering or recharging these implantable devices. The development of a turbine generator capable of integration into a bio-physiological or microfluidic system would provide a solution.

However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need for turbine generator capable of integration into a bio-physiological or microfluidic system is now met by a new, useful, and nonobvious invention.

The novel structure includes a turbine generator having a turbine casing, a rotor, and a magnet generator assembly that is specifically designed to reduce pressure differentials and turbulent flow. The turbine casing includes an inlet section, a nozzle fluidly coupled to the inlet section, a rotor chamber fluidly coupled to the nozzle, and an outlet section fluidly coupled to the rotor chamber. Additionally, the turbine casing incudes hollows adapted to receive inductor coils and the inlet section and the outlet section are separated by one hundred degrees.

The rotor includes a central hub, a plurality of blades, and two support discs, and is adapted for receipt by the rotor chamber. Each blade has a central transversal axis, a distal edge, a proximal edge attached to the central hub, and a notch disposed along the central transversal axis adjacent to the proximal edge. The support discs are located on either sides of the blades and are axially aligned with the rotor's rotational axis.

The magnet generator assembly includes a plurality of PMs disposed on the rotor and a plurality of inductor coils disposed in the hollow of the turbine casing. The inductor coils are arranged in an orientation perpendicular to the centrifugal movement of the PMs in the rotor to induce a current.

In a certain embodiment, the present invention includes a levitation system. The levitation system comprises of a plurality of permanent magnets disposed in a first wall of the turbine casing, a plurality of permanent magnets disposed in a second wall of the turbine casing, and a plurality of permanent magnets disposed in the rotor, wherein the permanent magnets disposed in the rotor and turbine casing are configured to magnetically suspend the rotor structure in the rotor chamber such that the rotor structure is not in contact with the turbine casing.

In a certain embodiment, the plurality of inductor coils include a 3-phase, 9-slot winding layout, where each phase has three circular coils separated by 120 degrees in a star configuration and connected in series.

In a certain embodiment, the hub of the rotor has a cylindrical shape with a radius that is generally equal to half of a total radius of the rotor. In a certain embodiment, the notches in each blade are semicircular in shape and have a radius equal to or less than half of the radius of one of the blades.

In a certain embodiment, the present invention uses a turbine casing designed for a bio-physiological or microfluidic system.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which:

FIG. 4 is a perspective view of a certain embodiment of the inlet section of the turbine casing.

FIG. 5A is a side cutout view of a certain embodiment of the turbine casing and the rotor.

FIG. 5B is a side cutout view of a certain embodiment of the turbine casing without the rotor.

DETAILED DESCRIPTION OF THE INVENTION

Figure 1A:
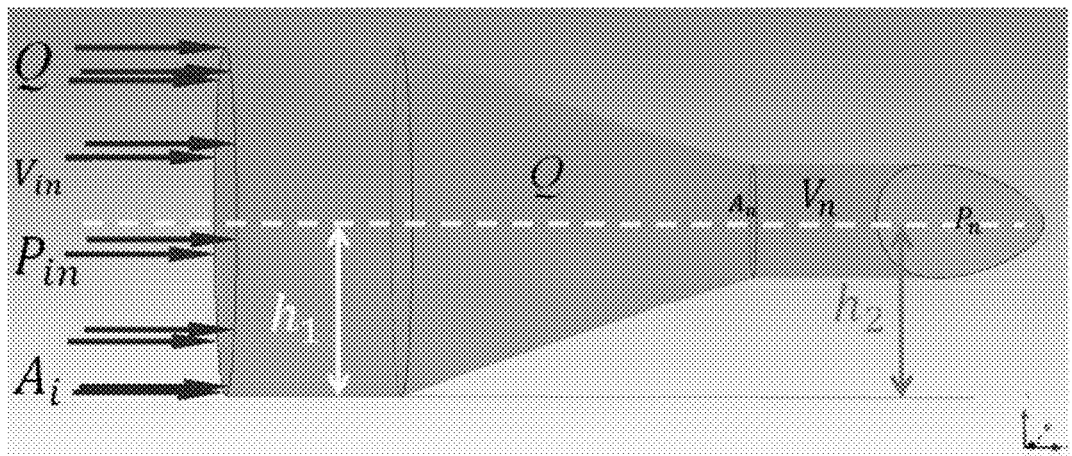
FIG. 1A is a perspective view of the inlet section of the turbine casing.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Cross-Flow Turbine: is an impulse turbine where the water passes through the turbine transversely, or across the turbine blades.

Impulse Turbine: is a turbine that is driven by jets directed against turbine blades.

Inductor Coil: is a passive two-terminal electrical component that resists changes in electric current passing through it.

Internally Notched Blade: is a blade where the notch is on the edge of the blade nearest the axis of rotation (proximal edge).

Magnet Generator: is a system that uses the changes in the magnetic field to induce current in inductor coils.

Permanent Magnet: is a magnet that retains its magnetic properties in the absence of an inducing field or current.

Rotor Chamber: is a housing for the rotor structure in the turbine casing.

Rotor Structure: is a mechanical piece consisting of the hub, notched blades, and two rotor support discs on either side of the blades.

Total Radius: is the radius to the outermost edge of the rotor.

Turbine Casing: is a housing for the turbine consisting of an inlet section, a nozzle, a rotor chamber, an outlet section.

Turbine: is a device that can extract energy from a fluid, such as water, steam, air, or combustion gases.

The present invention provides a new option of green energy conversion; focusing on the use of turbines to extract energy from microfluidics, with diverse application in biomedical, military/aerospace, and home areas. These systems have the potential of converting mechanical movement energy, and hydraulic energy into electric energy that may be sufficient for self-powering micro-sized devices and micro-sized systems. A flow, with constant pressure, a magnetic generator, and a novel impulse turbine design are combined to form a self-contained miniaturized generator system. The turbine consists of two main parts: a bearingless rotor and the enclosure or casing; while the miniaturized magnetic generator is a permanent magnet brushless machine, preferably comprising of permanent magnets in a ring configuration and radial coils. A permanent pressure, from microfluidic pressure system, is the force used to move the blades. This rotational motion of the turbine is transformed into electricity using magnetic induction, formed by permanent magnets on the rotor and nine coils fixed in the holder of the turbine. The electricity is generated when the magnetic field rotates and moves past the conductor, which induces a current according to Faraday's Law. The system has potential uses not only in medical equipment, but also in automotive applications, home appliances, and aquatic and ventilation systems.

The present invention is a turbine generator, that utilizes an impulse turbine design, notched blades, a rotor in levitation, and special turbine casing designed for a bio-physiological or microfluidic system. The preferred embodiment contains a cross-flow turbine design and can be installed and used in different orientations and positions; in contrast to the more standard turbine designs and energy generating systems, which only work in one position and have limited orientations.

Mathematical Background

Equations Governing Flow and Pressure

The principle of fluid machines is centered on the utilization of useful work due to the force applied by a fluid jet, impacting and moving, over a series of blades attached to a rotating wheel that spins about an axis. The equations of flow and pressure in a tube flow system, such as in FIG. 1A, are defined through the equations of continuity of steady flow (mass conservation) and momentum equations [15], [69]. These equations may be written as follows:

$$\Sigma \rho V \cdot A = 0 \qquad 1.1$$

$$-\rho_1 A_1 v_1 + \rho_2 A_2 v_2 = 0$$

$$\rho_1 A_1 v_1 = \rho_2 A_2 v_2 \qquad 1.2$$

The variables $\rho_1$, $A_1$, and $v_1$ are density, transversal area, and velocity respectively. The principles of conservation of mass and momentum, which predicts that a fluid of constant volume and flow rate, with density p, and flowing during a period of time through an area, produces simultaneously an increase in the mean velocity and a decrease in pressure at the outlet of the system.

Figure 1B:
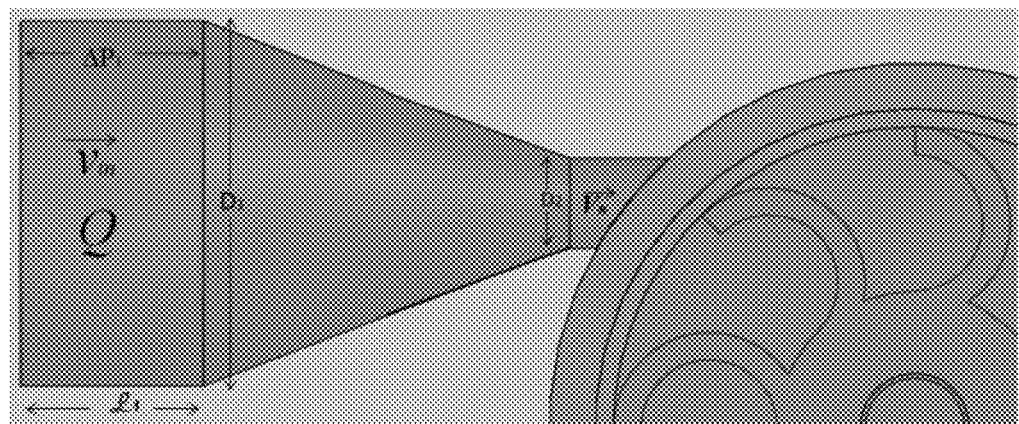
FIG. 1B is a side view of the inlet section of the turbine casing and a portion of the rotor chamber.
Figure 1C:
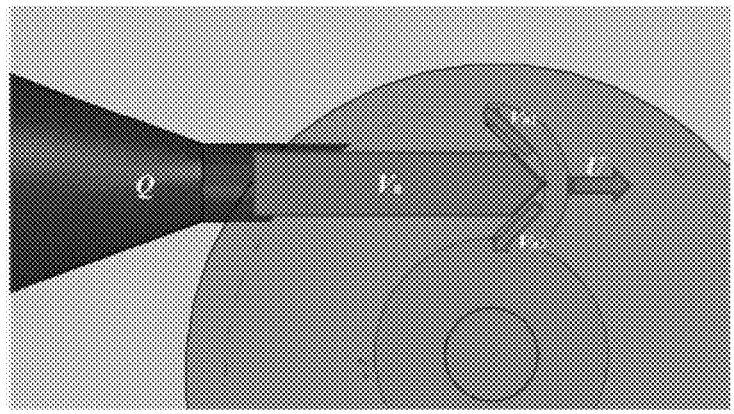
FIG. 1C is provides an illustration of a fluid leaving the nozzle and impacting a blade.

To determine the rate of change of momentum in FIGS. 1B and 1C, it is important to analyze the momentum of fluid entering and leaving in the stream conical pipe in the time $\Delta t$. The volume of the fluid in time $\Delta t$, is moved a distance $v_i \Delta t$, and the momentum equations can be written as Momentum of fluid entering=mass×inlet velocity $$\dot{m}_i v_{in} \Delta t = \rho A_1 v_{in} v_{in} \Delta t = \rho A_1 v_{in}^2 \Delta t \qquad 1.3$$

Momentum of fluid leaving=mass×oulet velocity $$\dot{m}_o v_n \Delta t = \rho A_n v_n v_n \Delta t = \rho A_n v_n^2 \Delta t \qquad 1.4$$

If equations 1.3 and 1.4 are combined with Newton's second law, is possible to find the total force supplied by the fluid. The law states that the force is equal to the rate of change of momentum [69], [70], [73], and can be written as $$F = \frac{(A_n v_n^2 \Delta t - \rho A_i v_{in}^2 \Delta t)}{\Delta t} \qquad 1.5$$

The equation 1.5 defines the force inside of the conical pipe, when it is acting in the direction of the flow of the fluid. The volume flow rate (Q) will be considered constant through the system, if the fluid is incompressible, density $\rho$ is constant, and one-dimensional [69], [70], [73]. The expression governing Q will be written as $$Q = A_i v_{in} = A_n v_n \qquad 1.6$$

where nozzle area is defined as $$A_n = \pi * \left(\frac{D_n}{2}\right) (m^2) \qquad 1.7$$

Therefore, the Q and $A_n$ equations can be used to rewrite the force equation as $$F = Q\rho(v_n - v_{in}) \qquad 1.8$$

The Bernoulli equation defines the fluid dynamic relationship between fluid velocity (v), fluid pressure (p), and height (h) [69], [70], which describe the behavior of fluids in a tube, but some assumptions such as flow viscosity=0 (internal friction), constant density ($\rho$), steady flow, and Incompressible flow, must be defined to assure the applicability of this equation. The analysis of forces and velocities in a turbine could be developed using similar shapes and variables, shown in FIG. 1A-1C, and reported by [69], [74]-[77].

Bernoulli's equation [69], [70], is defined as:

$$p_{in} + \frac{\rho v_{in}^2}{2} + \rho g h_1 = p_n + \frac{\rho v_n^2}{2} + \rho g h_2 \qquad 1.9$$

Where
$\rho$=fluid density (kg/m3);
g=acceleration due to gravity on Earth (m/s2);
h=height from an arbitrary point in the direction of gravity (m).
$p_{in}$=Inlet pressure (N/m2, Pa).
$p_n$=Nozzle pressure (N/m2, Pa).
$v_{in}$=mean inlet velocity (m/s).
$v_n$=mean nozzle velocity (m/s).

If h1=h2, then the equation is reduced to:

$$\frac{\rho}{2}(v_n^2 - v_{in}^2) = p_{in} - p_n \qquad 1.10$$

On the other hand, the potential power or power extracted [69], [70], [73] from the turbine nozzle (Pn) is $$p_n = \rho g Q h \qquad 1.11$$

But, $$v_n = \sqrt{2gh} \qquad 1.12$$

to find an expression to power ($P_n$), in function of known and defined variables, combine Q, $P_n$, and $v_n$ equations:

$$p_n = \frac{\rho A_n v_n^2}{2} \qquad 1.13$$

Figure 1D:
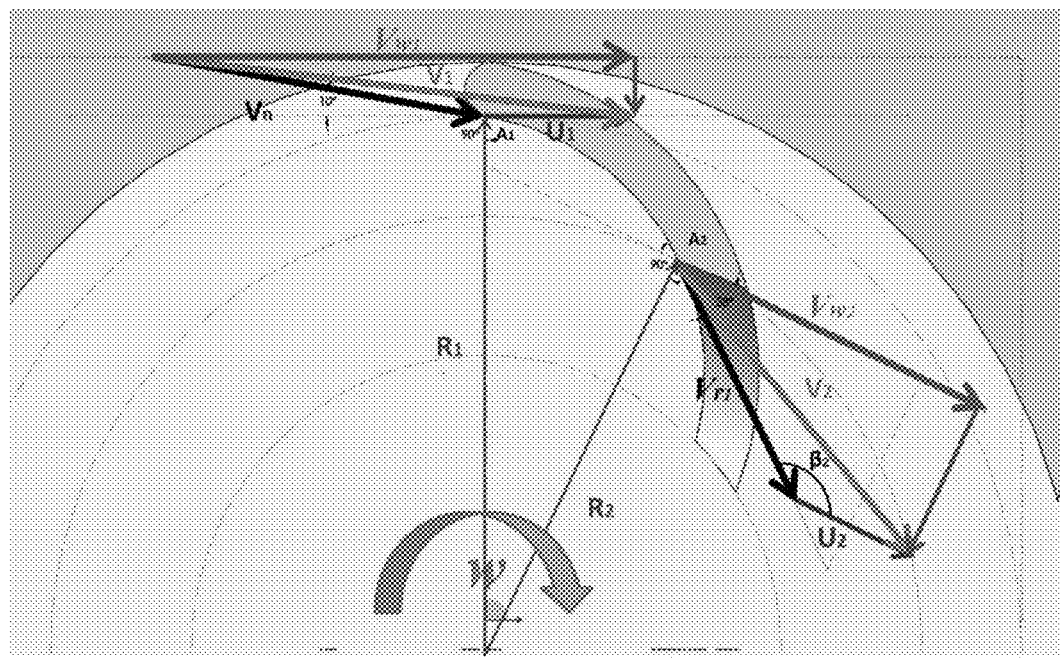
FIG. 1D is an illustration of theoretical velocity triangles at different locations on a blade.

The velocity triangle shown in FIG. 1D is typically used to explain the interaction between the fluid and the blades in a turbine, and determines the components of velocities and the forces acting on the rotor. The rotor is moved by the action of forces from the nozzle jet stream, which impacts the blades. The kinetic energy is transformed to mechanical energy, producing a continuous spin of the rotor. The mass of the liquid striking the blades per second [78]-[81] is given by $$\dot{m} = \rho A_n V_n \qquad 1.14$$

Where $A_n$ is the transversal area of the nozzle, $V_n$ is the velocity of the fluid from nozzle to blades, and $\rho$ is the density of the liquid. The product of mass of the fluid striking per second and the component of velocity impacting the blades in tangential direction ($V_{w_i}$) is known as the momentum of the fluid striking the blades [69], [73] and the general equation is given by $$M_i = \dot{m} V_{w_i} = \rho A_n V_n V_{w_i} \qquad 1.15$$

Similar momentums are produced by the fluid from the nozzle, striking the blade, and the fluid striking the outlet of each blade. The new components are $V_{w_1}$ in the tangential direction of the blade inlet, and $V_{w_2}$ in the tangential direction of the outlet of each blade. The velocity components can be positive or negative. If it contributes to the movement, it is positive, otherwise it will be negative.

If the momentum of the liquid at the nozzle and the momentum leaving the blade are combined as a product of radial distances, the results will be the angular momentum per second at the inlet and at the outlet of the blade.

$$M_{A_i} = \rho A_n V_n V_{w_i} R_1 \quad 1.16$$

$$M_{A_2} = \rho A_n V_n V_{w_i} R_2 \quad 1.17$$

The equations 1.19 and 1.20 are related in the impulse momentum theorem [69], [70], [82], which states that the rate of change of angular momentum is equal to the torque on the wheel or torque on the rotor. The equation is given by $$T = \rho A_n V_n V_{w_i} R_1 \pm \rho A_n V_n V_{w_i} R_2$$

$$T = \rho A_n V_n (V_{w_i} R_1 \pm V_{w_i} R_2) \quad 1.18$$

In addition, the torque equation could be written as, $$T = F_t R_1 \quad 1.19$$

Where $F_t$ is the total force applied to each blade, in a direction tangential to the rotor, and $R_i$ is the distance or radius from which the forces are applied, measured from rotor axis of rotation.

Power from the turbine ($P_r$) is a function that relates torque and angular velocity, and is expressed in the Euler turbomachine equation [47], [69], [70]. The power delivered to the fluid is thus, $$P_r = T\omega \quad 1.20$$

The angular velocity $\omega$ and torque T are variables that characterize the rotor behavior, which were defined in equations 1.18 and 1.21, $$\omega = \frac{U_i}{R_i} \quad 1.21$$

Figure 1E:
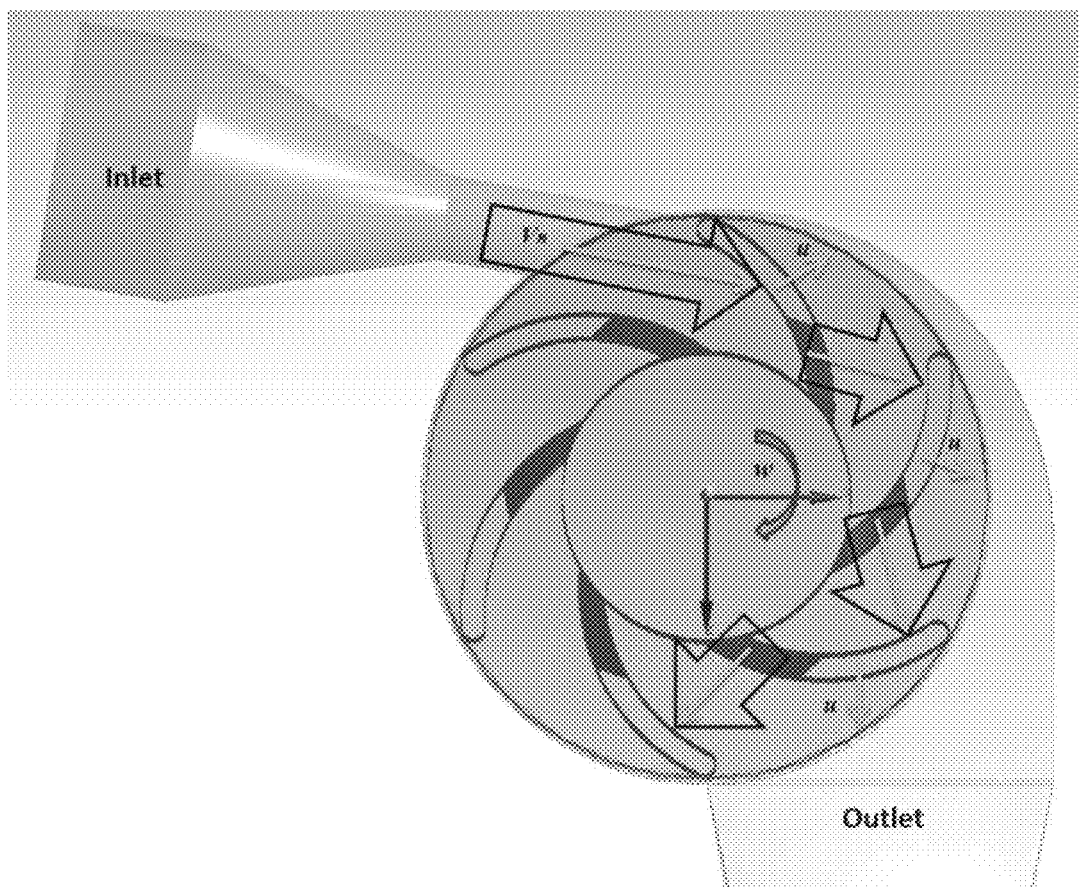
FIG. 1E is an illustration of the theoretical fluid forces on internally notched blades.

The $U_i$ variables are the blade tangential velocities, measured in different points with radius $R_i$ measured from the axis of rotation to each defined point on the blade. Finally, the power from the rotor is a relationship between rotor torque (T) and angular velocity ($\omega$). The rotor torque is in direct relation with the forces impacting the blades, especially the blades located between the nozzle output and the turbine output zone as shown in FIG. 1E.

Finally, all equations are related in one expression known as efficiency of the system ($\eta$) [69], [70], [77], which reflects the system's behavior, showing the percent of losses into the system, when the potential energy is converted to mechanical energy. The efficiency is calculated with the following relation, $$\text{Efficiency } (\eta) = \frac{P_r}{P_n} \quad 1.22$$

Equations Describing Electromagnetic Field

There are constitutive relations in electromagnetic systems which describe how two or more physical parameters are related, depending on the medium's properties involved in the process. The relationship between electric field intensity (E) and the conductive current due to the movements of free charges (J) is given by the microscopic form of the Ohm's law, $J = \sigma E$ and $D = \in E$, where $\sigma$ and $\in$ are electric conductivity and dielectric permittivity; also, the relationship between the magnetic induction or magnetic flux density (B), the magnetic field strength (H), and the magnetic polarization (M) are given by $B = \mu H$ and $M = XH$, where $\mu$ and X are the magnetic permeability and magnetic susceptibility [13], [14], [83], [84]. Assuming, $\sigma$, $\in$, $\mu$, and X describe the electromagnetic properties of a material, then an electromagnetic phenomena can be described by four relationships known as Maxwell's equations [13], [14], [84], which describe how objects can be influenced by the propagation of electric and magnetic fields and how the system response could be in accordance with that kind of electromagnetic input. The simpler form preferred by authors in books [13], [14] and papers [12], [85], [86] are written as, $$\nabla \times \overline{H} = \overline{J} + \frac{\partial D}{\partial t} \quad 1.23$$

This equation is known as Ampere's law, and $$\nabla \times \overline{E} = -\frac{\partial B}{\partial t} \quad 1.24$$

is known as Faraday's law. Now, using a form of the Gaussian theorem and the relationship [87]-[89], the next two equations are derived. The magnetic Gauss's law states that if the magnetic source is contained in a closed surface, the net magnetic flux crossing through this surface is zero, $$\nabla \cdot \overline{B} = 0 \quad 1.25$$

The relationship between magnetic field intensity H and magnetic field density B can be written as $$B = \mu H = (\mu_r \mu_0) H$$

Where $\mu_r$ is the relative permeability of the medium (unit less) and $\mu_0$ is the magnetic permeability in vacuum ($\mu_0 = 4\pi \times 10^{-7}$ henry/m) [87]-[89].

Finally, the magnetic Gauss's law may be derived from Faraday's and Ampere's laws going from open surface to become a closed surface. This Maxwell equation is defined in terms of electric flux density and electric charge density, to state how the electric field acts around electric charges.

$$\nabla \cdot \overline{D} = \rho \quad 1.27$$

The total magnetic flux density B inside the magnetic material and the presence of an external magnetic field H, are related through magnetization M, and can be written as $$\nabla \times \overline{B} = \mu_0 (\overline{H} + \overline{M}) \quad 1.28$$

Faraday discovered the phenomenon, known as electromagnetic induction, which provides that an electric current is induced, in a wire in loop shape, by changing the magnetic field. Faraday's law states that an electromotive force (emf) is generated, if for any reason, the magnetic flux changes with the time. The average emf, induced in a coil of N turns is expressed in the following equation:

$$\varepsilon = -N \left( \frac{\emptyset - \emptyset_0}{t - t_0} \right) = -N \frac{\Delta \emptyset}{\Delta t} = -\omega \frac{\Delta \emptyset}{\Delta \theta} \quad 1.29$$

Where N is the number of turns on each coil, $\omega$ is the angular velocity, and Ø is the magnetic flux. The magnetic flux is the total flux through a surface. Ø is found by integrating the flux density over this area $$\emptyset = \int B \, dA \quad 1.30$$

If the flux density is constant through this area, the above equation will be expressed as, $$\emptyset = \vec{B} \cdot \vec{A} = BA \times \cos\theta \qquad 1.31$$

Where θ is the angle between $\vec{B}$ and the normal vector from a transversal coil area $\vec{A}$, so if the spatially uniform magnetic field $\vec{B}$ is used, this equation will be written as $$\emptyset = -BR_s \alpha_t l_t \qquad 1.32$$

Where $R_s$ is the radius of the stator surface, $\alpha_t$ is the coil arc, expressed in radians, and $l_t$ is the effective axial length of each coil. The combination of flux density and magnetic field produces the induced voltage equation, which can be written as $$\varepsilon = -N\left[\frac{d}{dt}(BA\cos\theta)\right] = -N\left[\left(\frac{dB}{dt}\right)A\cos\theta + B\left(\frac{dA}{dt}\right)\cos\theta - BA\sin\theta\left(\frac{d\theta}{dt}\right)\right] \qquad 1.33$$

As is stated in Faraday's law [90], [91], the three components of the induced voltage equation determine that an emf can be induced, by modifying at least one of the three parameters involved in this expression, the magnetic field, the coil transversal area, or the angle between $\vec{A}$ and $\vec{B}$. In this research work, only the case when the magnetic field is rotated around the coils was considered, resulting in the following equation, $$\varepsilon = -N\left[\frac{d}{dt}(BA\cos\theta)\right] = -N\left[\left(\frac{dB}{dt}\right)A\cos\theta\right] = -N\left[\left(\frac{dB}{dt}\right)R_s \alpha_t l_t\right] \qquad 1.34$$

This equation represents the variation of the electromagnetic field into the coils, which induces currents into coils and generates emf (voltage) in the coils terminals.

Faraday's law of induction is a basic law of electromagnetism, which supposes that a magnetic field will create an electric current, relating to the operating principles of generators, electrical motors and transformers; also, Lenz's law reaffirms the applicability of Faraday's law, which states that the induced emf in the coil, results from a changing magnetic flux, and has a polarity that leads to an induced current, which in turn tends to oppose the change in magnetic flux that induces such currents.

Permanent Magnets (PMs) Brushless Machines

PMs brushless machines are electromechanical systems that can be operated as generators or motors. There are different topologies of PM brushless machines [90], [92], [96], [97], but these can be grouped in two general types: radial flux permanent magnets (RFPM) and axial flux permanent magnets (AFPM), which in turn can be classified into slotted or slotless, and internal or external rotor. Although various rotor and stator topologies may be employed to develop motor and generator machines, the most common RFPM and AFPM use configurations of permanent magnets attached on the rotor, and the coil or armature winding mounted on the stator. The magnetic distribution and flux flow direction are the principal differences of AFPM and RFPM machines. The magnetic field in RFPM machines flows radially between rotor and stator, while the magnetic field in AFPM flows axially in the direction parallel to the vertical axis of the rotor.

Permanent-magnet brushless turbine generators are machines (PMBLM) that produce electricity through variation magnetic field created by moving PMs, which induce currents within stator windings. The core benefit of a PMBLM is that it does not require any additional or external excitation current.

Example of the Present Invention

The design of the present invention includes three main parts—the turbine system, the motor generator system, and the integration of both in a closed system.

Turbine System

Figure 2:
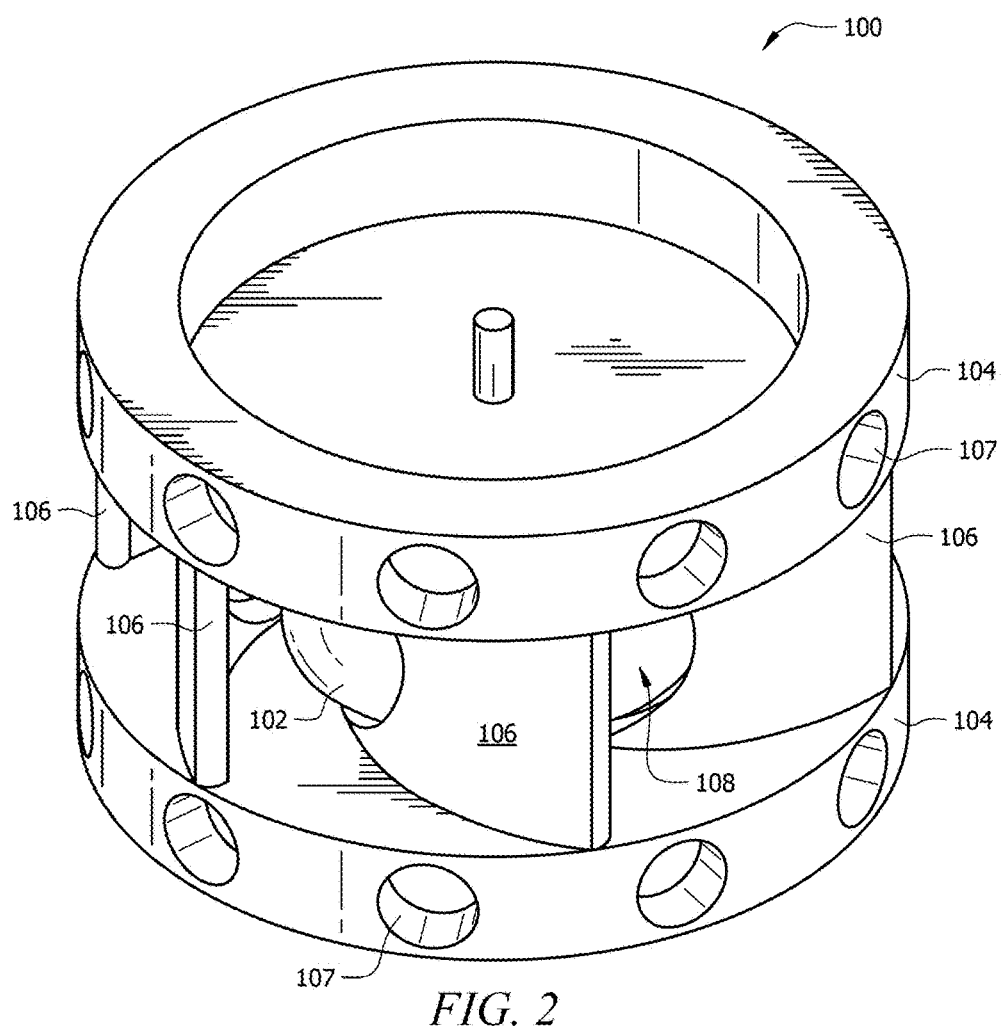
FIG. 2 is a perspective view of a certain embodiment of the rotor having PMs located in the support discs to aid in rotor levitation.

The turbine is divided in two main parts: rotor and holder or casing. The rotor is a new model of impulse turbine to be immersed, which additionally uses reaction characteristics to contribute to the rotor spin. As shown in FIG. 2, a certain embodiment of rotor structure 100 includes central hub 102, two support discs 104 either side of central hub 102, and notched blades 106 arranged concentrically around central hub 102 supported by rotor support discs 104. Support discs 104 assure blade stability, and canalize and redirect the fluid flow to central hub 102 or internal notch 108 of each blade 106. Complementally, the top and bottom of the rotor have a special design, which joins the hub and the blades in a unique piece, making the blade stronger and increasing its resistance. In addition, the top and bottom design helps to support the assembling of the spindle machine, which converts the mechanical energy to electric energy. Further support for the improvements created from the notched design is incorporated in the following sections. FIG. 2 also includes PM receptacles 107, which area adapted to receive PMs that correspond to PMs in the rotor housing to allow for rotor levitation, resulting in frictionless rotation. As provided in FIG. 2, these PM receptacles are preferably located in the outer surface of support discs 104.

Figure 3A:
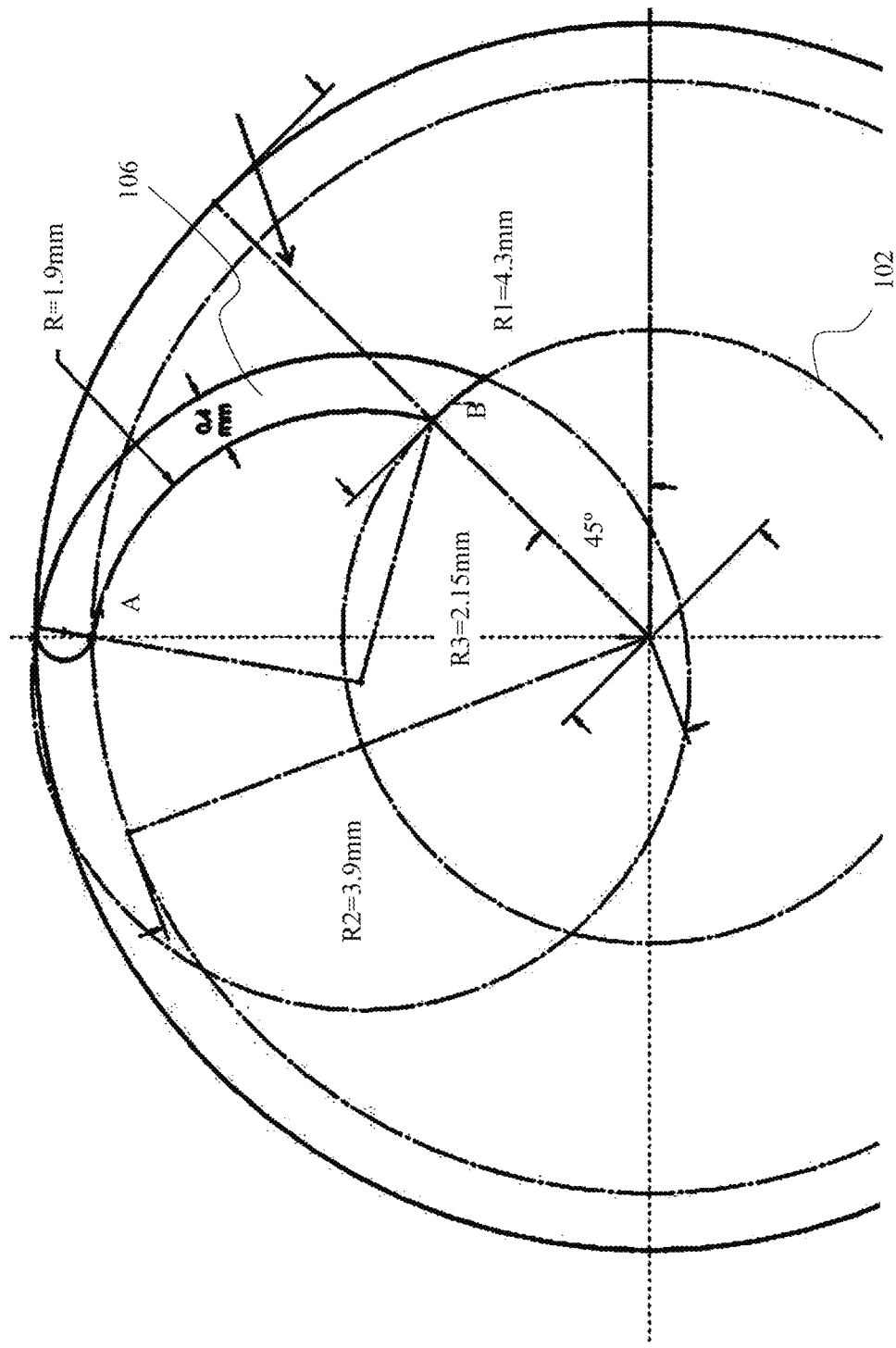
FIG. 3A is an illustration of the geometry of a certain embodiment of the rotor.

As shown in FIG. 3A, the blades have curved forms to improve the capabilities of the design. The intersection point between the reference line and the radius of the internal circle $R_3$, plus the blade thickness, defines the shape and curvature of each blade. FIG. 3A provides an exemplary geometry, where the reference line, denoted by reference element "C", is 45° degrees, the radius of the inner circle or hub 102 ($R_3$=2.15 mm) is half of the total turbine radius ($R_1$=4.3 mm), the blade thickness (about 0.4 mm) is 10% of the total turbine radius. The internal blade radius R=1.9 mm, and the internal blade arc is 90° degrees, measured between intersection point "A" (intersection point of the vertical axis and the circle of radius $R_2$) and intersection point "B" (intersection point of reference line and the circle of radius $R_3$, which represents the hub). $R_2$ is equivalent to the total turbine radius $R_1$ minus the blade thickness. The design is scalable so that the system can be used for any objective.

Figure 3B:
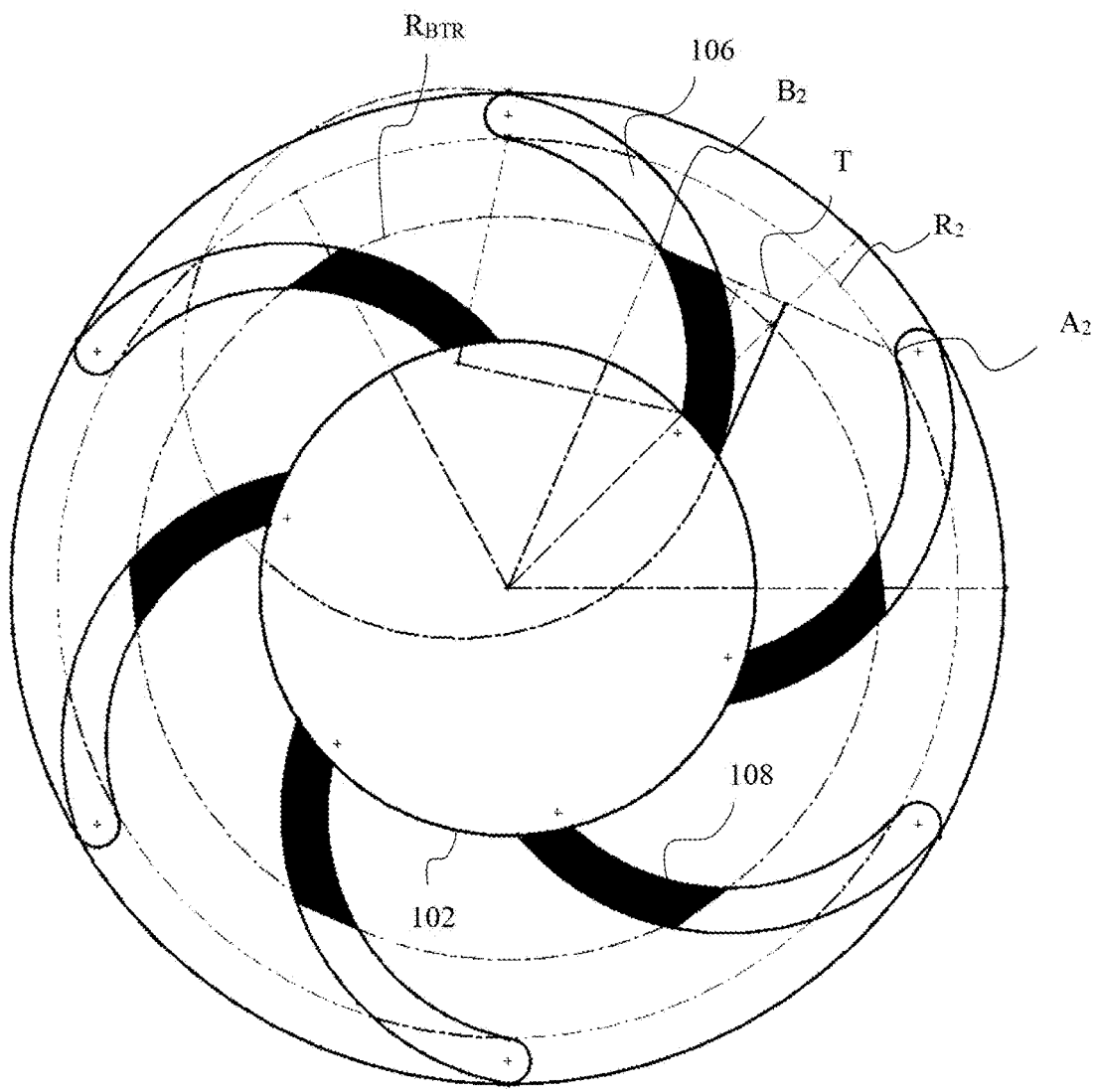
FIG. 3B is an illustration of the geometry of a certain embodiment of the rotor and the notches.

As highlighted in FIG. 3B, blades 106 include semicircular notch 108 on the internal proximal edge of blades 106. The notches are centrally located about the tangential axis of the turbine. The radius of the notches arc is equal to or less than half of the radius of a blade. In this exemplary embodiment, blade tangential reference circle RBTR is drawn having a diameter of 6.45 mm, such that the circle intersects the notch along the internal blade arc at point $B_2$. A tangent line "T" is drawn from point $B_2$ and the tangent line intersects the circle of radius $R_2$ at point $A_2$, which marks the location of the next blade. The tangent line provides the angle at which the notch is created in the blade.

The internally notched blades permit a continuous circulation of fluid inside the rotor chamber, which decreases the possibility of clogging, fouling, or stagnation of the flow. As part of the reaction benefits, the notch also assures more interaction between the fluid and the blades because at the time of jet stream impact on the blade, the notch redirects the fluid so that more than one blade is impacted to increase the impulse force and the angular velocity of the blades. When the blades are initially impacted by the liquid, the direction of the liquid is changed, but the notched blades are able to redirect around 40% of the fluid to the outer surface of the next blade of the rotor chamber, adding more force that contributes to the continuous spin of the rotor. Therefore, the notch not only contributes toward increasing rotation, but towards minimizing the vortices between blades, thus, guaranteeing the proper rotation of the fluid inside of the rotor chamber and between blades.

Turbine Casing Design

The holder or casing is a new design, the final product of three years of research work. The CAD designs, simulations, prototypes and testing of pieces, helped find the best model, and were done according to potential applications as well as to satisfy the basic principles of stability, compatibility, adaptability, and simple assembly. As shown in FIG. 5, turbine casing 103 includes main three sections: inlet-nozzle 110, rotor chamber, 118 and outlet 120. The input and output of the turbine were designed using a standard circular shape, with initial inlet and final output diameters of 4 mm, which is an ideal size to connect the micro turbine with microfluidic systems such as the circulatory system, micro pumps, mixers and refrigeration systems found in medical equipment, automotive systems, and home appliances. Similar to the rotor, the casing is scalable to allow the turbine generator to be used in other applications as is known to a person having ordinary skill in the art.

The inlet-nozzle section 110, shown in FIG. 4, illustrates a gradual contraction between the inlet 112 and the nozzle 114, where a conical section 116 is formed with sharp discontinuities at the intersections. The inlet and nozzle dimensions used are a response to the laminar behavior requirement, especially in the blood system. The nozzle geometry has 10° degrees of inclination with respect to the horizontal axis, or in other words, an angle of 100 degrees between the inlet and outlet sections. The inclination concentrates the jet on the maximum area of the first blade and optimizes the impact. Moreover, this inclination contributes to the discharge through the notch and reduces the vortices in the central area of the rotor. The inlet was designed into a gradual contraction pipe or funnel shape to create a venturi effect with the fluid flow, increasing the output velocity of the fluid at the nozzle and focusing the jet on the blades.

As shown in FIG. 5, rotor chamber 118 and outlet section 120 have unique geometries that permit free flow circulation to the output. The rotor chamber was designed with a curvature, which combines parabolas and circular geometries, to ease the flow discharge, and direct the impact of the fluid on more than one blade, and to increase the pressure on the output area of the turbine. The outlet section is designed to reestablish the inlet pressure, which was modified when the fluid passed into the inlet conical section and through the nozzle to the rotor chamber.

Figure 5C:
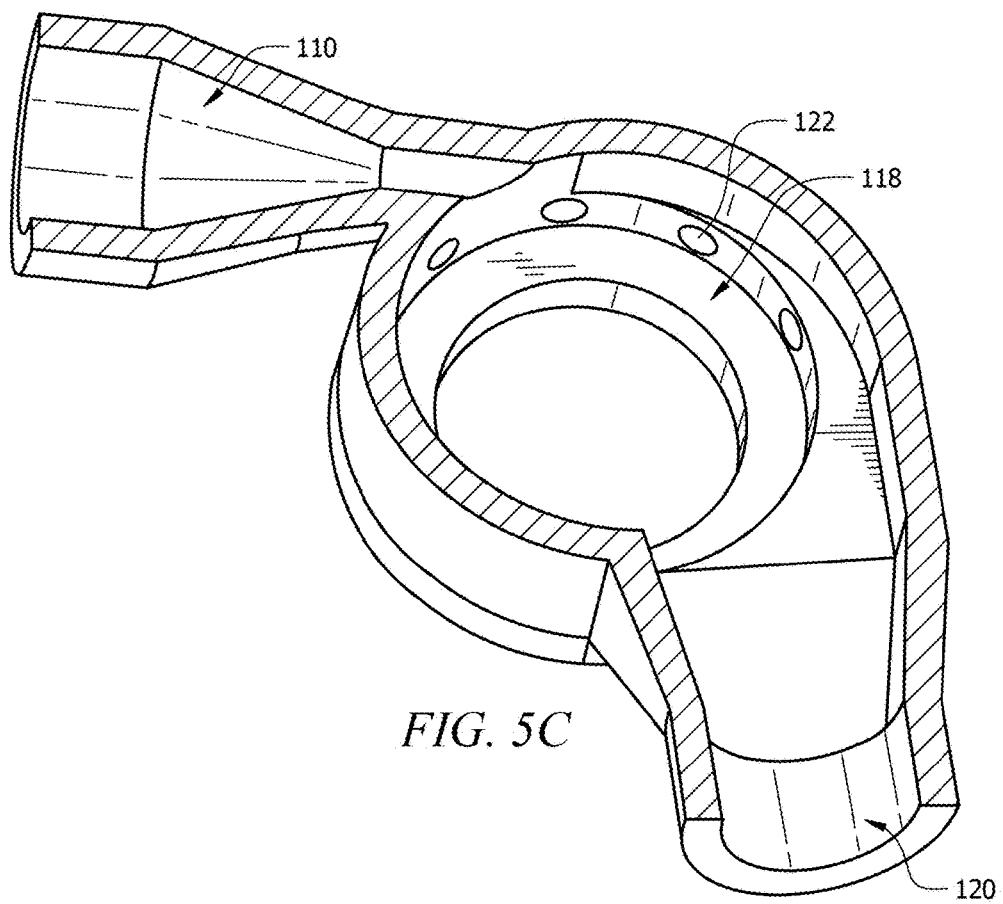
FIG. 5C is a side cutout view of a certain embodiment of the turbine casing having PMs for rotor levitation.

In addition, the curved shape of the walls surrounding the rotor chamber contributes to the free flow of the fluid, avoiding any type of accumulation or stenosis, thus reducing stress on walls and assuring a good fluid displacement to the outlet turbine. Finally, and looking to have the best adaptability, the inlet 110 and outlet 120 of the turbine were designed as circular pipes given that it is the most common shape used to transport and connect microfluidic systems. In a certain embodiment, as shown in FIG. 5C, rotor chamber 118 includes PMs 122, which interact with PMs on the rotor, such as the ones shown in FIG. 2, allowing for rotor levitation.

The characteristics of the turbine casing, inlet, rotor chamber, and outlet, were defined according to biomedical and circulatory system specifications. The rotor chamber was designed to keep the turbine rotor aligned in the center and frictionless and to keep a variable gap between rotor and enclosing walls. The gap contributes to the circulation and redirects the fluid to the blades; also, the gap design avoids the friction when the rotor is in motion. The outlet chamber is a free zone to discharge the fluid from rotor chamber with a conical shape and circular end.

Turbine Mathematical Model

In the turbine mathematical model, the mass of fluid per second, entering from nozzle to the rotor chamber, is used to find the momentum of the liquid when the blades are pushed, and establishes the relationship with the forces striking the blades, torque and mechanical power generated by the system.

Figure 6A:
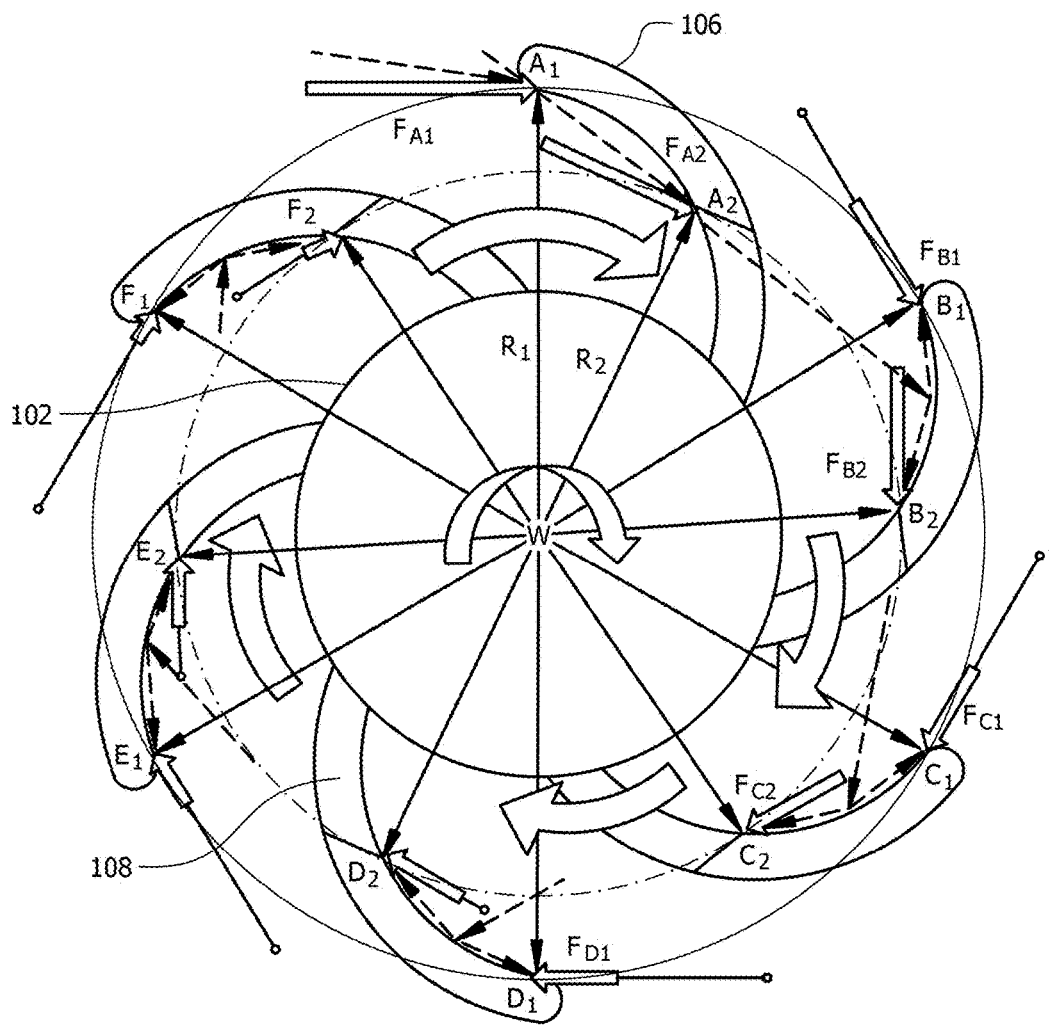
FIG. 6A is an illustration of the theoretical variable affecting the rotor's rotation.

A vector representation of velocities and flow direction is shown in FIG. 6A, where the dashed arrows represent the velocity trajectories of the fluid applied from nozzle. Curved block arrows represent the permanent internal flow fluid circulation, and block arrows are the forces produced by the injected flow fluid, which create the torque to keep the rotor in constant speed. To concentrate the analysis and develop the mathematical model, three principal points, central, external, and internal, were defined on each blade.

Figure 6B:
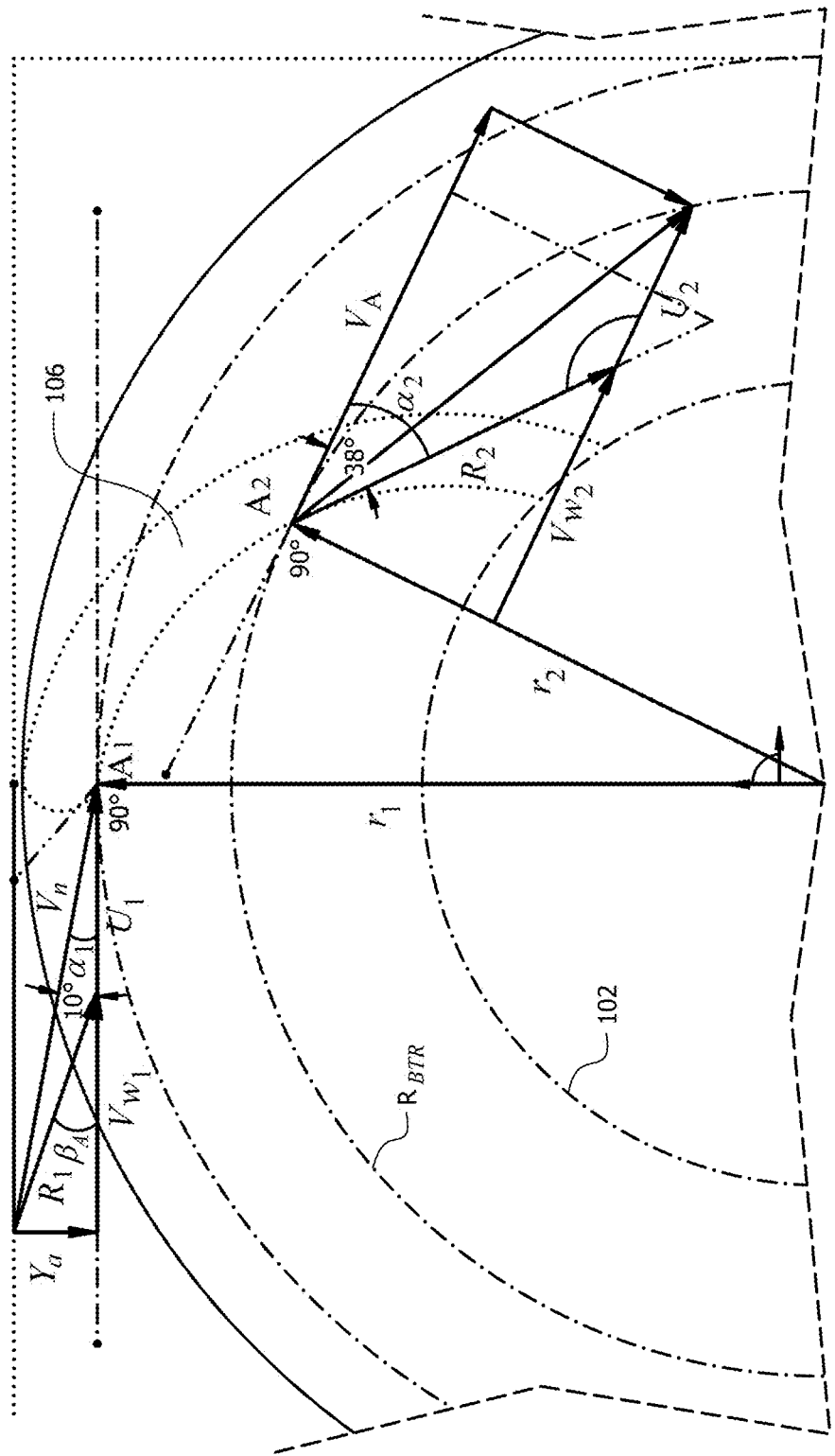
FIG. 6B is an illustration of the theoretical velocity triangles on the first blade.

To know the minimum and maximum values of volume flow rate required to satisfy the mechanical power and angular velocities of this turbine, an analysis involving torques, forces, areas, and linear velocities affecting the blades was developed. Starting with the velocity and fluid flow behavior to the first blade, FIG. 6B, where the total velocity is represented as the sum of angular velocity (U) on rotor and the lineal velocity of flow fluid entering from nozzle (G). However, the analysis required the real impact of the fluid entering on each of blade is centered on the velocity vector, which is a subtraction between angular velocity on rotor and the lineal velocity of flow fluid entering from nozzle. FIG. 6B shows the first blade vector analysis, which represents the components of velocities of the working fluid in a turbomachine. This analysis produced as a result, the equation that connects the desired rotor behavior (speed and torque) with the inlet volume flow rate, velocity, and forces of the fluid flow pushing the blades.

According to the shapes and geometries defined for this novel turbine, two velocity triangles on two points (internal $A_2$ and external $A_1$ points) of the first blade are defined, but a blade-by-blade analysis is developed. This is followed by the mechanical power and the efficiency equations of the turbine. The velocity triangles used in this analysis explain the flow direction and state the principal points of pressure, through which torque is applied to spin the rotor.

Through the vector analysis of velocities (velocity triangles), on two points of the first blade, the equations that explain the behavior of the notched blade turbine as an impulse turbine are defined. In FIG. 6B, $V_{w_1}$ and $V_{w_2}$ are the tangential velocities at $A_1$ and $A_2$, and $V_n$ is the jet velocity at the output of the nozzle. In addition, an angle $\alpha_1$ is formed between the nozzle and the horizontal plane tangent to the rotor radius. Also, the horizontal plane and the tangential line in $A_2$, create an angle $\alpha_2$, just into the notch of the first blade, in the direction of the second blade.

The system on the first blade is analyzed as an impulse turbine and the equations on the first blade are developed at two positions, $A_1$ and $A_2$ resulting in the tangential velocities $V_{w_1}$ and $V_{w_2}$. In both cases, the results of the tangential velocities are functions of the nozzle velocity and the angles involved in the input and output of the fluid on the blade. Additionally, the fluid flow leaving the first blade has a velocity $V_A$. The equations resulting from the analysis on the first blade are written as:

Tangential Inlet Velocity:

$$V_{w_1} = V_N \cos \alpha_1 - U_1$$

Tangential Outlet Velocity (Notch Velocity):

$$V_{w_2} = (V_N \cos \alpha_1 - U_1) \cos \alpha_2$$

The fluid velocity crossing the notch of the first blade is written as $$V_A = V_{w_2} + U_2 = (V_N \cos \alpha_1 - U_1) \cos \alpha_2 + U_2$$

The model of forces on the first blade was found using the geometry shown in FIGS. 6.A-6.B, but applying the momentum balance analysis combined with the velocity triangles. In addition, the torque equation on first blade was found as the product of these forces and the radial distances.

Force on First Blade $$F_A = \rho Q(V_{w_1} + V_{w_2}) = (V_N \cos \alpha_1 - U_1)(1 + \cos \alpha_2)$$

Torque on First Blade $$T_A = \rho Q(V_{w_1} r_1 + V_{w_2} r_2) = \rho Q[V_N \cos \alpha_1 (r_1 + r_2 \cos \alpha_2) - U_1(r_1 + r_2 \cos \alpha_2)]$$

$$T_A = \rho Q[(V_N \cos \alpha_1 - U_1)(r_1 + r_2 \cos \alpha_2)]$$

If $A = (r_1 + r_2 \cos \alpha_2)$ then $$T_A = \rho Q(V_N A \cos \alpha_1 - U_1 A)$$

The analysis to find the equations on the second blade starts with the flow fluid from the first blade after passing by the notch, and goes until it totally leaves the second blade, but includes the central impact on second blade. As FIG. 6.C shows, the velocity $V_A$ from the notch area of the first blade enters to the second blade with an inclination angle $\alpha_3$, measured between the central point of the second blade, in the tangential direction to the rotor.

The equations for the second blade on the $B_1$, $B_2$, and the central point $B_m$ are described as follows.

Figure 6C:
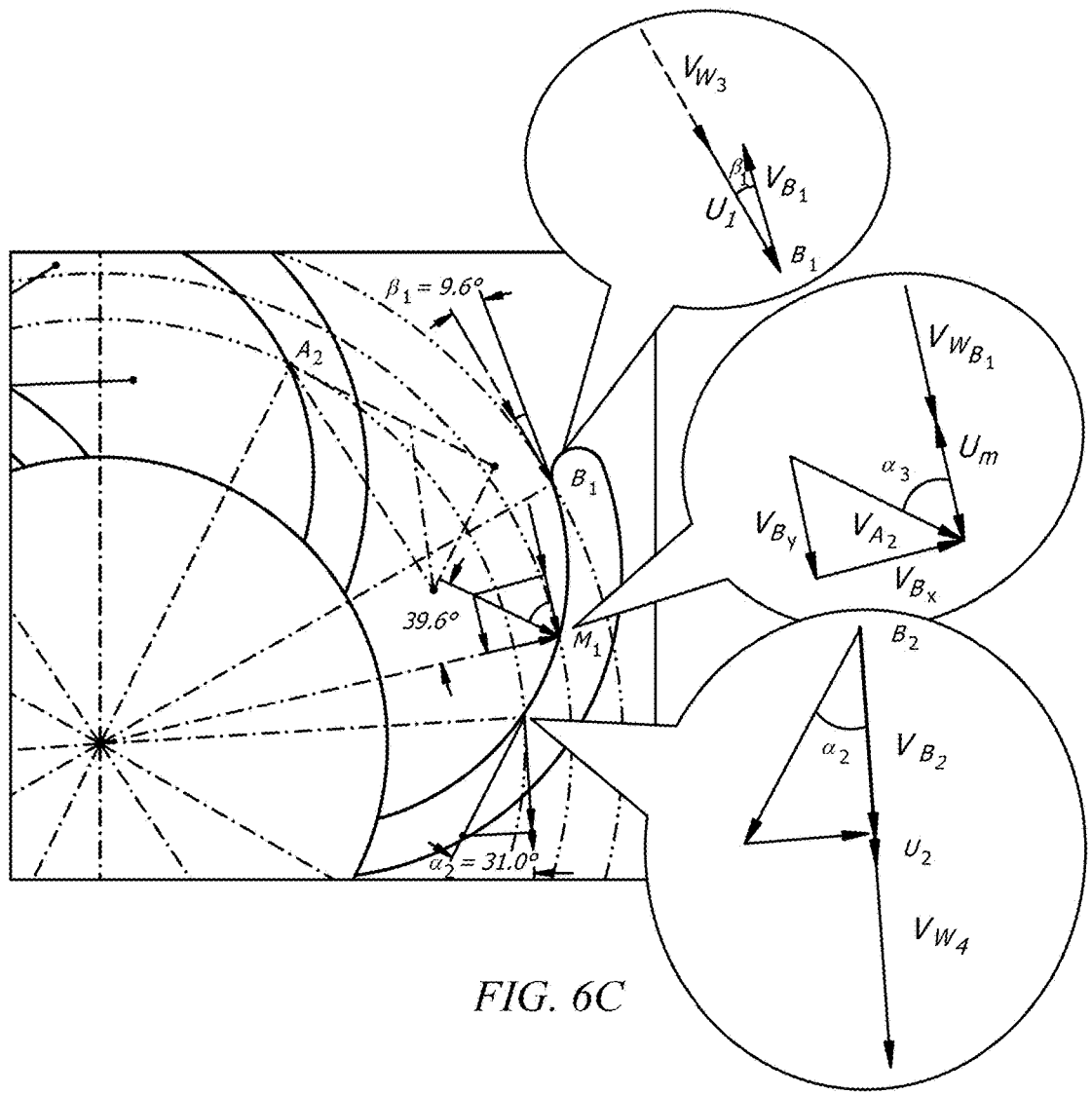
FIG. 6C is an illustration of the theoretical velocity triangles on the second blade.

Second Blade:

$V_A$ is the inlet velocity at the second blade, but has an inclination angle $\alpha_3$ casing measured between the flow fluid direction and the center blade on the tangential line of this point. FIG. 6C, shows the geometry, $$V_A = V_{w_2} + U_2 = (V_N \cos \alpha_1 - U_1) \cos \alpha_2 + U_2$$

Tangential inlet velocity on second blade, denoted as $V_{M_B}$ is written as $$V_{M_B} = V_A \cos \alpha_3 = (V_{w_2} + U_2) \cos \alpha_3 = [(V_N \cos \alpha_1 - U_1) \cos \alpha_2 + U_2] \cos \alpha_3$$

$$V_{M_B} = \left[(V_N \cos \alpha_1 - U_1) \cos \alpha_2 + U_1 \frac{r_2}{r_1}\right] \cos \alpha_3$$

$$V_{M_B} = V_N \cos \alpha_1 \cos \alpha_2 \cos \alpha_3 - U_1 \left(\cos \alpha_2 - \frac{r_2}{r_1}\right) \cos \alpha_3$$

if $B = \cos \alpha_2 \cos \alpha_3$ and $C = \left(B - \frac{r_2}{r_1} \cos \alpha_3\right)$ then $$V_{M_B} = V_N B \cos \alpha_1 - U_1 C$$

Flow fluid velocity from the first blade impacts the second blade on center place, then the fluid flow is divided into two components after pushing the second blade, the first velocity component is directed to the external edge $B_1$, and the second component is directed to the internal edge $B_2$ or notch. The velocities results on $B_1$ and $B_2$ have a tangential direction in the same line of the rotor tangential velocity on these points. The component on $B_1$ is opposite of that of tangential velocity $U_1$, while the component on $B_2$ has the same direction as the tangential velocity on this point $U_2$.

$$V_{B_1} = U_1 - (V_{M_B} - U_M) \cos \beta_1$$

$$V_{B_2} = U_2 + (V_{M_B} - U_M) \cos \alpha_2$$

$$\Delta V_{B_1} = V_{M_B} - V_{B_1}$$

$$\Delta V_{B_1} = V_{M_B}(1 + \cos \beta_1) - U_1\left(1 + \frac{r_m}{r_1} \cos \beta_1\right)$$

$$\Delta V_{B_2} = V_{M_B} - V_{B_2}$$

$$\Delta V_{B_2} = V_{M_B}(1 - \cos \alpha_2) - U_1\left(\frac{r_2}{r_1} - \frac{r_m}{r_1} \cos \alpha_2\right)$$

The force on second blade is represented by $$F_B = \rho Q(\Delta V_{B_1} + \Delta V_{B_2})$$

$$F_B = \rho Q(V_{M_B}[(1 + \cos \beta_1) + (1 - \cos \alpha_2)] - U_1\left[\left(1 + \frac{r_M}{r_1} \cos \beta_1\right) + \left(\frac{r_2}{r_1} - \frac{r_m}{r_2} \cos \alpha_2\right)\right]$$

By using the above equations plus the mass flow rate $(\dot{m} = \rho Q)$ then the torque on second blade is found $$T_B = \rho Q(\Delta V_{B_1} r_1 + \Delta V_{B_2} r_2)$$

$$T_B = \rho Q\left[V_{M_B}(r_1(1 + \cos \beta_1) + r_2(1 - \cos \alpha_2)) - U_1\left(r_1\left(1 + \frac{r_M}{r_1} \cos \beta_1\right) + r_2\left(\frac{r_2}{r_1} - \frac{r_m}{r_1} \cos \alpha_2\right)\right)\right]$$

If $D = r_1(1 + \cos \beta_1) + r_2(1 - \cos \alpha_2)$ and $$E = r_1\left(1 + \frac{r_M}{r_1} \cos \beta_1\right) + r_2\left(\frac{r_2}{r_1} - \frac{r_m}{r_1} \cos \alpha_2\right)$$

then torque on second blade is rewritten as $$T_B = \rho Q(V_{M_B} D - U_1 E) = \rho Q[V_N BD \cos \alpha_1 - U_1 CD - U_1 E]$$

$$T_B = \rho Q[V_N BD \cos \alpha_1 - U_1(CD + E)]$$

The analysis to find the equations in the next blades, third to sixth, use the same physical principles and the same geometry as the first and second blades, which starts with the fluid flow from the previous blade, passing through the notch in direction of the next blade at the central point of the blade. As shown in FIG. 6, there are components of velocity from the notch areas by each blade, which enter to the next blade with an inclination angle $\beta_1$, measured between the central point of the blade and in the rotor radial direction. The components of velocity have the same angle on entry and exit on each blade, but the magnitudes of these vectors are different, having the maximum value in the first blade and a minimum in the sixth blade.

Third Blade:

$$V_{M_C} = V_{B_2} \cos \alpha_3 = (U_2 + (V_{M_B} - U_M) \cos \alpha_2) \cos \alpha_3$$

$$V_{M_C} = (U_2 + (V_N B \cos \alpha_1 - U_1 C - U_M) \cos \alpha_2) \cos \alpha_3$$

$$V_{M_C} = \left(V_N B\cos\alpha_1 \cos\alpha_2 \cos\alpha_3 + U_1 \frac{r_2}{r_1}\cos\alpha_3\right.$$
$$\left. - U_1 C\cos\alpha_2 \cos\alpha_3 - U_1 \frac{r_m}{r_1}\cos\alpha_2 \cos\alpha_3\right)$$

$$V_{M_C} = \left[V_N B^2 \cos\alpha_1 + U_1\left(\frac{r_2}{r_1}\cos\alpha_3 - BC - B\frac{r_m}{r_1}\right)\right]$$

$$V_{C_1} = U_1 - (V_{M_C} - U_M)\cos\beta_1$$

$$V_{C_2} = U_2 + (V_{M_C} - U_M)\cos\alpha_2$$

$$\Delta V_{C_1} = V_{M_C} - V_{C_1}$$

$$\Delta V_{C_1} = V_{M_C}(1 + \cos\beta_1) - U_1\left(1 + \frac{r_m}{r_1}\cos\beta_1\right)$$

$$\Delta V_{C_2} = V_{M_C} - V_{C_2}$$

$$\Delta V_{C_2} = V_{M_C}(1 - \cos\alpha_2) - U_1\left(\frac{r_2}{r_1} + \frac{r_m}{r_1}\cos\alpha_2\right)$$

Force on Third Blade $$F_C = \rho Q(\Delta V_{C_1} + \Delta V_{C_2})$$
$$F_C = \rho Q(V_{M_C}[(1+\cos\beta_1) + (1-\cos\alpha_2)]) -$$
$$U_1\left[\left(1 + \frac{r_M}{r_1}\cos\beta_1\right) + \left(\frac{r_2}{r_1} - \frac{r_m}{r_1}\cos\alpha_2\right)\right]$$

Torque on Third Blade $$T_C = \rho Q(\Delta V_{C_1} r_1 + \Delta V_{C_2} r_2)$$
$$T_C = \rho Q\left[V_{M_C}(r_1(1+\cos\beta_1) + r_2(1-\cos\alpha_2)) - \right.$$
$$\left. U_1\left(r_1\left(1 + \frac{r_M}{r_1}\cos\beta_1\right) + r_2\left(\frac{r_2}{r_1} - \frac{r_m}{r_1}\cos\alpha_2\right)\right)\right]$$

If D=$r_1(1+\cos\beta_1)+r_2(1-\cos\alpha_2)$ and $$E = r_1\left(1 + \frac{r_M}{r_1}\cos\beta_1\right) + r_2\left(\frac{r_2}{r_1} - \frac{r_m}{r_1}\cos\alpha_2\right)$$

then torque on third blade is rewritten as $$T_C = \rho Q(V_{M_C} D - U_1 E) =$$
$$\rho Q\left[V_N(B^2 D\cos\alpha_1) + U_1\left(\frac{r_2}{r_1}D\cos\alpha_3 - CBD - B\frac{r_m}{r_1}D - E\right)\right]$$

Fourth Blade:

$$V_{M_D} = V_{C_2}\cos\alpha_3 = (U_2 + (V_{M_C} - U_M)\cos\alpha_2)\cos\alpha_3$$
$$V_{M_D} =$$
$$\left(U_2 + \left(V_N B^2\cos\alpha_1 + U_1\left(\frac{r_2}{r_1}\cos\alpha_3 - CB - B\frac{r_m}{r_1}\right) - U_M\right)\cos\alpha_2\right)\cos\alpha_3$$
$$V_{M_D} = \left(V_N B^3\cos\alpha_1 + U_1\frac{r_2}{r_1}\cos\alpha_3 \right.$$
$$\left. + U_1 B\frac{r_2}{r_1}\cos\alpha_3 - U_1 CB^2 - U_1\frac{r_m}{r_1}B^2 - U_1\frac{r_m}{r_1}B\right)$$
$$V_{M_D} = \left[V_N B^3\cos\alpha_1 + U_1\left(\frac{r_2}{r_1}\cos\alpha_3 + B\frac{r_2}{r_1}\cos\alpha_3 - CB^2 - B^2\frac{r_m}{r_1} - B\frac{r_m}{r_1}\right)\right]$$

-continued $$V_{D_1} = U_1 - (V_{M_D} - U_M)\cos\beta_1$$
$$V_{D_2} = U_2 - (V_{M_D} - U_M)\cos\alpha_2$$
$$\Delta V_{D_1} = V_{M_D} - V_{D_1}$$
$$\Delta V_{D_1} = V_{M_D}(1+\cos\beta_1) - U_1\left(1 + \frac{r_m}{r_1}\cos\beta_1\right)$$
$$\Delta V_{D_2} = V_{M_D} - V_{D_2}$$
$$\Delta V_{D_2} = V_{M_D}(1-\cos\alpha_2) - U_1\left(\frac{r_2}{r_1} - \frac{r_m}{r_1}\cos\alpha_2\right)$$

The Force on the Fourth Blade $$F_D = \rho Q(\Delta V_{D_1} + \Delta V_{D_2})$$
$$F_D = \rho Q(V_{M_D}[(1+\cos\beta_1) + (1-\cos\alpha_2)]) -$$
$$U_1\left[\left(1 + \frac{r_M}{r_1}\cos\beta_1\right) + \left(\frac{r_2}{r_1} - \frac{r_m}{r_1}\cos\alpha_2\right)\right]$$

And the torque on the fourth blade as $$T_D = \rho Q(\Delta V_{D_1} r_1 + \Delta V_{D_2} r_2)$$
$$T_D = \rho Q\left[V_{M_D}(r_1(1+\cos\beta_1) + r_2(1-\cos\alpha_2)) - \right.$$
$$\left. U_1\left(r_1\left(1 + \frac{r_M}{r_1}\cos\beta_1\right) + r_2\left(\frac{r_2}{r_1} - \frac{r_m}{r_1}\cos\alpha_2\right)\right)\right]$$

Substituting D=$r_1(1+\cos\beta_1)+r_2(1-\cos\alpha_2)$ and $$E = r_1\left(1 + \frac{r_M}{r_1}\cos\beta_1\right) + r_2\left(\frac{r_2}{r_1} - \frac{r_m}{r_1}\cos\alpha_2\right)$$

then torque on fourth blade is rewritten as $$T_D = \rho Q(V_{M_D}D - U_1 E)$$
$$T_D = \rho Q\left[D\left(V_N B^3\cos\alpha_1 \right.\right.$$
$$\left.\left. + U_1\left(\frac{r_2}{r_1}\cos\alpha_3 + B\frac{r_2}{r_1}\cos\alpha_3 - CB^2 - B^2\frac{r_m}{r_1} - B\frac{r_m}{r_1}\right)\right) - U_1 E\right]$$
$$T_D = \rho Q\left[V_N B^3\cos\alpha_1 + U_1\left(\frac{r_2}{r_1}D\cos\alpha_3 + BD\frac{r_2}{r_1}\cos\alpha_3 \right.\right.$$
$$\left.\left. - B^2 CD - B^2 D\frac{r_m}{r_1} - BD\frac{r_m}{r_1} - E\right)\right]$$

Fifth Blade:

$$V_{M_E} = V_{D_2}\cos\alpha_3 = (U_2 + (V_{M_D} - U_M)\cos\alpha_2)\cos\alpha_3$$
$$V_{M_E} =$$
$$\left(U_2 + \left(V_N B^3\cos\alpha_1 + U_1\left(\frac{r_2}{r_1}\cos\alpha_3 + B\frac{r_2}{r_1}\cos\alpha_3 - CB^2 - B^2\frac{r_m}{r_1} - B\frac{r_m}{r_1}\right) - \right.\right.$$
$$\left.\left. U_M\right)\cos\alpha_2\right)\cos\alpha_3$$
$$V_{M_E} = \left(V_N B^4\cos\alpha_1 + U_1\frac{r_2}{r_1}\cos\alpha_3 + U_1 B\frac{r_2}{r_1}\cos\alpha_3 + U_1 B^2\frac{r_2}{r_1}\cos\alpha_3 \right.$$
$$\left. - U_1 CB^2 - B^3 U_1\frac{r_m}{r_1} - B^2 U_1\frac{r_m}{r_1} - U_1\frac{r_m}{r_1}B\right)$$

-continued $$V_{M_E} = \left[V_N B^4 \cos\alpha_1 + U_1\left(\frac{r_2}{r_1}\cos\alpha_3 + B\frac{r_2}{r_1}\cos\alpha_3 \right.\right.$$
$$\left.\left. + B^2\frac{r_2}{r_1}\cos\alpha_3 - CB^3 - B^3\frac{r_m}{r_1} - B^2\frac{r_m}{r_1} - \frac{r_m}{r_1}B\right)\right]$$

$$V_{E_1} = U_1 - (V_{M_E} - U_M)\cos\beta_1$$

$$V_{E_2} = U_2 - (V_{M_E} - U_M)\cos\alpha_2$$

$$\Delta V_{E_1} = V_{M_D} - V_{D_1}$$

$$\Delta V_{E_1} = V_{M_E}(1 + \cos\beta_1) - U_1\left(1 + \frac{r_m}{r_1}\cos\beta_1\right)$$

$$\Delta V_{E_2} = V_{M_E} - V_{E_2}$$

$$\Delta V_{E_2} = V_{M_E}(1 - \cos\alpha_2) - U_1\left(\frac{r_2}{r_1} - \frac{r_m}{r_1}\cos\alpha_2\right)$$

Force on Fifth Blade $$F_E = \rho Q(\Delta V_{D_1} + \Delta V_{D_2})$$

$$F_E = \rho Q(V_{M_E}[(1+\cos\beta_1) + (1-\cos\alpha_2)]) -$$
$$U_1\left[\left(1 + \frac{r_M}{r_1}\cos\beta_1\right) + \left(\frac{r_2}{r_1} - \frac{r_m}{r_1}\cos\alpha_2\right)\right]$$

Torque on Fifth Blade $$T_E = \rho Q(\Delta V_{E_1} r_1 + \Delta V_{E_2} r_2)$$

$$T_E = \rho Q\left[V_{M_E}(r_1(1+\cos\beta_1) + r_2(1-\cos\alpha_2)) -\right.$$
$$\left. U_1\left(r_1\left(1 + \frac{r_M}{r_1}\cos\beta_1\right) + r_2\left(\frac{r_2}{r_1} - \frac{r_m}{r_1}\cos\alpha_2\right)\right)\right]$$

Substituting D=$r_1$(1+cos $\beta_1$)+$r_2$(1−cos $\alpha_2$) and $$E = r_1\left(1 + \frac{r_M}{r_1}\cos\beta_1\right) + r_2\left(\frac{r_2}{r_1} - \frac{r_m}{r_1}\cos\alpha_2\right)$$

then torque on fifth blade is rewritten as $$T_E = \rho Q(V_{M_E} D - U_1 E)$$

$$T_E = \rho Q\left[D\left(V_N B^4 \cos\alpha_1 + U_1\left(\frac{r_2}{r_1}\cos\alpha_3 + B\frac{r_2}{r_1}\cos\alpha_3 + B^2\frac{r_2}{r_1}\cos\alpha_3 -\right.\right.\right.$$
$$\left.\left.\left. CB^3 - B^3\frac{r_m}{r_1} - B^2\frac{r_m}{r_1} - \frac{r_m}{r_1}B\right)\right) - U_1 E\right]$$

$$T_E = \rho Q\left[V_N B^4 D\cos\alpha_1 + U_1\left(\frac{r_2}{r_1}D\cos\alpha_3 + BD\frac{r_2}{r_1}\cos\alpha_3 + B^2 D\frac{r_2}{r_1}\cos\alpha_3 -\right.\right.$$
$$\left.\left. B^3 CD - B^3 D\frac{r_m}{r_1} - B^2 D\frac{r_m}{r_1} - \frac{r_m}{r_1}BD - E\right)\right]$$

Sixth Blade:

$$V_{M_F} = V_{E_2}\cos\alpha_3 = (U_2 + (V_{M_E} - U_M)\cos\alpha_2)\cos\alpha_3$$

$$V_{M_F} = \left(U_2 + \left(V_N B^4 \cos\alpha_1 + U_1\left(\frac{r_2}{r_1}\cos\alpha_3 + B\frac{r_2}{r_1}\cos\alpha_3 + B^2\frac{r_2}{r_1}\cos\alpha_3 -\right.\right.\right.$$
$$\left.\left.\left. CB^3 - B^3\frac{r_m}{r_1} - B^2\frac{r_m}{r_1} - \frac{r_m}{r_1}B\right) - U_M\right)\cos\alpha_2\right)\cos\alpha_3$$

$$V_{M_F} = \left(V_N B^5 \cos\alpha_1 + U_1\frac{r_2}{r_1}\cos\alpha_3 + U_1 B\frac{r_2}{r_1}\cos\alpha_3 + U_1 B^2\frac{r_2}{r_1}\cos\alpha_3 +\right.$$
$$U_1 B^3\frac{r_2}{r_1}\cos\alpha_3 - U_1 CB^4 - B^4 U_1\frac{r_m}{r_1} - B^3 U_1\frac{r_m}{r_1} - B^2 U_1\frac{r_m}{r_1} -$$
$$\left. U_1\frac{r_m}{r_1}B\right)$$

$$V_{M_F} = \left[V_N B^5 \cos\alpha_1 + U_1\left(\frac{r_2}{r_1}\cos\alpha_3 + B\frac{r_2}{r_1}\cos\alpha_3 + B^2\frac{r_2}{r_1}\cos\alpha_3 +\right.\right.$$
$$\left.\left. B^3\frac{r_2}{r_1}\cos\alpha_3 - CB^4 - B^4\frac{r_m}{r_1} - B^3\frac{r_m}{r_1} - B^2\frac{r_m}{r_1} - \frac{r_m}{r_1}B\right)\right]$$

$$V_{F_1} = U_1 - (V_{M_F} - U_M)\cos\beta_1$$

$$V_{F_2} = U_2 + (V_{M_F} - U_M)\cos\alpha_2$$

$$\Delta V_{F_1} = V_{M_F} - V_{F_1}$$

$$\Delta V_{F_1} = V_{M_F}(1+\cos\beta_1) - U_1\left(1 + \frac{r_m}{r_1}\cos\beta_1\right)$$

$$\Delta V_{F_2} = V_{M_F} - V_{F_2}$$

$$\Delta V_{F_2} = V_{M_F}(1-\cos\alpha_2) - U_1\left(\frac{r_2}{r_1} - \frac{r_m}{r_1}\cos\alpha_2\right)$$

Force on Sixth Blade $$F_F = \rho Q(\Delta V_{D_1} + \Delta V_{D_2})$$

$$F_F = \rho Q(V_{M_F}[(1+\cos\beta_1) + (1-\cos\alpha_2)]) - U_1\left[\left(1 + \frac{r_M}{r_1}\cos\beta_1\right) +\right.$$
$$\left.\left(\frac{r_2}{r_1} - \frac{r_m}{r_1}\cos\alpha_2\right)\right]$$

Torque on Sixth Blade $$T_F = \rho Q(\Delta V_{F_1} r_1 + \Delta V_{F_2} r_2)$$

$$T_F = \rho Q\left[V_{M_F}(r_1(1+\cos\beta_1) + r_2(1-\cos\alpha_2)) - U_1\left(r_1\left(1 + \frac{r_M}{r_1}\cos\beta_1\right) +\right.\right.$$
$$\left.\left. r_2\left(\frac{r_2}{r_1} - \frac{r_m}{r_1}\cos\alpha_2\right)\right)\right]$$

Substituting D=$r_1$(1+cos $\beta_1$)+$r_2$(1−cos $\alpha_2$) and $$E = r_1\left(1 + \frac{r_M}{r_1}\cos\beta_1\right) + r_2\left(\frac{r_2}{r_1} - \frac{r_m}{r_1}\cos\alpha_2\right)$$

then torque on sixth blade is rewritten as $$T_F = \rho Q(V_{M_F} D - U_1 E)$$

$$T_E = \rho Q\left[D\left(V_N B^5 \cos\alpha_1 + U_1\left(\frac{r_2}{r_1}\cos\alpha_3 + B\frac{r_2}{r_1}\cos\alpha_3 + B^2\frac{r_2}{r_1}\cos\alpha_3 +\right.\right.\right.$$
$$\left.\left.\left. B^3\frac{r_2}{r_1}\cos\alpha_3 - CB^4 - B^4\frac{r_m}{r_1} - B^3\frac{r_m}{r_1} - B^2\frac{r_m}{r_1} - \frac{r_m}{r_1}B\right)\right) - U_1 E\right]$$

$$T_F = \rho Q\left[V_N B^5 D\cos\alpha_1 + U_1\left(\frac{r_2}{r_1}D\cos\alpha_3 + BD\frac{r_2}{r_1}\cos\alpha_3 + B^2 D\frac{r_2}{r_1}\cos\alpha_3 -\right.\right.$$
$$\left.\left. B^3 D\frac{r_2}{r_1}\cos\alpha_3 - B^4 CD - B^4 D\frac{r_m}{r_1} - B^3 D\frac{r_m}{r_1} - B^2 D\frac{r_m}{r_1} - \frac{r_m}{r_1}BD - E\right)\right]$$

Rotor Mechanical Power $\alpha_1 = 10$, $\alpha_2 = 30.01°$, $\alpha_3 = 50.35°$, $\beta_1 = 9.6°$, $r_1 = 3.95$ mm, $r_2 = 3.1$ m, and $r_m = 3.5$ mm $\rho = 1000 \left[\frac{kg}{m^3}\right]$ $Q = V_N A_N \left[\frac{m^3}{s}\right]$ $A_N = \pi(0.00065)^2 [m^2]$ $A = (r_1 + r_2 \cos\alpha_2) = 0.0066$ $B = \cos\alpha_2 \cos\alpha_3 = 0.8528$ $C = \left(\cos\alpha_2 - \frac{r_2}{r_1}\right) = 0.0582$ $D = r_1(1 + \cos\beta_1) + r_2(1 - \cos\alpha_2) = 0.0082$ $E = r_1\left(1 + \frac{r_M}{r_1}\cos\beta_1\right) + r_2\left(\frac{r_2}{r_1} - \frac{r_m}{r_1}\cos\alpha_2\right) = 0.0074$ Torque on first blade: $T_A = \rho Q(V_N A \cos\alpha_1 - U_1 A)$ Torque on second blade: $T_B = \rho Q(V_{M_B} D - U_1 E)$ Torque on third blade: $T_C = \rho Q(V_{M9di\ c} D - U_1 E)$ Torque on fourth blade: $T_D = \rho Q(V_{M_D} D - U_1 E)$ Torque on fifth blade: $T_E = \rho Q(V_{M_E} D - U_1 E)$ Torque on sixth blade: $T_F = \rho Q(V_{M_F} D - U_1 E)$ Turbine Total Torque:

$T_T = \rho Q(V_N A \cos\alpha_1 + D(V_{M_B} + V_{M_C} + V_{M_D} + V_{M_E} + V_{M_F}) - U_1(5E + A))$ The tangential inlet velocities on each blade can be analyzed as follows:

$V_{M_A} = V_N \cos\alpha_1 - U_1$ $V_{M_B} = V_N B \cos\alpha_1 - U_1 C$ $V_{M_C} = \left[V_N B^2 \cos\alpha_1 + U_1\left(\frac{r_2}{r_1}\cos\alpha_3 - BC - B\frac{r_m}{r_1}\right)\right]$ $V_{M_D} = \left[V_N B^3 \cos\alpha_1 + U_1\left(\frac{r_2}{r_1}\cos\alpha_3 + B\frac{r_2}{r_1}\cos\alpha_3 - CB^2 - B^2\frac{r_m}{r_1} - B\frac{r_m}{r_1}\right)\right]$ $V_{M_E} = \left[V_N B^4 \cos\alpha_1 + U_1\left(\frac{r_2}{r_1}\cos\alpha_3 + B\frac{r_2}{r_1}\cos\alpha_3 + B^2\frac{r_2}{r_1}\cos\alpha_3 - CB^3 - B^3\frac{r_m}{r_1} - B^2\frac{r_m}{r_1} - \frac{r_m}{r_1}B\right)\right]$ $V_{M_F} = \left[V_N B^5 \cos\alpha_1 + U_1\left(\frac{r_2}{r_1}\cos\alpha_3 + B\frac{r_2}{r_1}\cos\alpha_3 + B^2\frac{r_2}{r_1}\cos\alpha_3 + B^3\frac{r_2}{r_1}\cos\alpha_3 - CB^4 - B^4\frac{r_m}{r_1} - B^3\frac{r_m}{r_1} - B^2\frac{r_m}{r_1} - \frac{r_m}{r_1}B\right)\right]$ Substituting $V_{M_B}$, $V_{M_C}$, $V_{M_D}$, $V_{M_E}$, and $V_{M_F}$ on total torque equation, $T_T$ is rewritten as, $$T_T = \rho Q\{V_N \cos\alpha_1[A + DB(1 + B + B^2 + B^3 + B^4)] - U_1[A + 5E + D((B\frac{r_m}{r_1} - \frac{r_2}{r_1}\cos\alpha_3)(4 + 3B + 2B^2 + B^3) + BC(1 + B + B^2 + B^3) + C)]\}$$

The objective of this mathematical analysis was to find a general equation modeling the behavior of the turbine to find the minimum and maximum values of volume flow rate required to satisfy the mechanical power and angular velocities of the model. The sum of torques on each blade or total torque, multiplied by the rotor angular velocity, produces the new mechanical power general equation of this turbine, which is a function involving tangential velocity on the rotor and the velocity from the nozzle. However, as the principles of conservation of mass and momentum relate the volume flow rate and the velocity, then the mechanical power equation developed on the rotor ($P_R = T_T \omega$), satisfies the objective.

$P_T = T_T \omega = T_T \frac{U_1}{r_1}$ $$P_T = \frac{\rho Q}{r_1}\{V_N U_1 \cos\alpha_1[A + DB(1 + B + B^2 + B^3 + B^4)] - U_1^2[A + 5E + D((B\frac{r_m}{r_1} - \frac{r_2}{r_1}\cos\alpha_3)(4 + 3B + 2B^2 + B^3) + BC(1 + B + B^2 + B^3) + C)]\}$$

The maximum mechanical power developed on the rotor is found by differentiating the mechanical power equation and is found where the derivative is equal to zero.

$$\frac{dP_T}{dU_1} = \frac{\rho Q}{r_1}\left\{\frac{d}{dU_1}(V_N U_1 \cos\alpha_1[A + DB(1 + B + B^2 + B^3 + B^4)] - U_1^2[A + 5E + D((B\frac{r_m}{r_1} - \frac{r_2}{r_1}\cos\alpha_3)(4 + 3B + 2B^2 + B^3) + BC(1 + B + B^2 + B^3) + C)]\right\}$$

$$\frac{dP_T}{dU_1} = 0 = V_N \cos\alpha_1[A + DB(1 + B + B^2 + B^3 + B^4)] - 2U_1\{A + 5E + D[(B\frac{r_m}{r_1} - \frac{r_2}{r_1}\cos\alpha_3)(4 + 3B + 2B^2 + B^3) + BC(1 + B + B^2 + B^3) + C]\}$$

$$V_N = 2U_1 \frac{\{A + 5E + D[(B\frac{r_m}{r_1} - \frac{r_2}{r_1}\cos\alpha_3)(4 + 3B + 2B^2 + B^3) + BC(1 + B + B^2 + B^3) + C]\}}{\cos\alpha_1[A + DB(1 + B + B^2 + B^3 + B^4)]}$$

The relationship between $V_N$ and $U_1$ is found by substituting the following constants values on the above equation:

$\alpha_1 = 10$, $\alpha_2 = 30.01°$, $\alpha_3 = 50.35°$,

-continued $\beta_1 = 9.6°$, $r_1 = 3.95$ mm, $r_2 = 3.1$ m, and $r_m = 3.5$ mm $A = (r_1 + r_2 \cos \alpha_2) = 0.0066$ $B = \cos \alpha_2 \cos \alpha_3 = 0.8528$ $C = \left(\cos \alpha_2 - \frac{r_2}{r_1}\right) = 0.0582$ $D = r_1(1 + \cos\beta_1) + r_2(1 - \cos \alpha_2) = 0.0082$ $E = r_1\left(1 + \frac{r_M}{r_1}\cos\beta_1\right) + r_2\left(\frac{r_2}{r_1} - \frac{r_m}{r_1}\cos \alpha_2\right) = 0.0074$ If $F = \left\{A + 5E + D\left[\left(B\frac{r_m}{r_1} - \frac{r_2}{r_1}\cos \alpha_3\right)(4 + 3B + 2B^2 + B^3) + BC(1 + B + B^2 + B^3) + C\right]\right\}$ And $G = \cos \alpha_1 [A + DB(1 + B + B^2 + B^3 + B^4)]$ then F=0.0435 and G=0.0509 and $V_N$ is rewritten as $V_N = 2U_1 \frac{F}{G}$ The maximum power is reached when $V_N = 5.5106\ U_1$.

On the other hand, the potential power or power extracted from the nozzle turbine is $P_n = \rho g Q h$, but, since $V_n = \sqrt{2gh}$ then a new equation to potential power is written as, $P_n = \frac{\rho Q V_n^2}{2}$ Finally, the equations of mechanical power on the rotor and the potential power from nozzle equations are related in one expression known as hydraulic efficiency of the system ($\eta$) [67], [68], [75], which reflects the system behavior, showing the percent of losses into the system, when the potential energy is converted to mechanical energy. Hydraulic efficiency is the ratio of the power developed by the turbine rotor (rotor power) to the power supplied at the nozzle by the fluid (fluid power). The efficiency is calculated with the following relation, $\eta_{max} = \frac{P_T}{P_N} = \frac{T_T\omega}{\frac{1}{2}V_N^2\rho Q} = \frac{\frac{\rho Q}{r_1}(V_n U_1 G - U_1^2 F)}{\frac{1}{2}V_N^2 \rho Q} = \frac{2\left(2U_1\frac{F}{G}U_1 G - U_1^2 F\right)}{r_1\left(2U_1\frac{F}{G}\right)^2}$ -continued $\eta_{max} = \frac{G^2}{2r_1 F} = 0.7499 = 74.97\%$ Magnetic Generator System Design The present invention is a combination of two systems to harvest the conversion of mechanical energy to electrical energy. The first system (previously analyzed) is the turbine, and the second is an alternating current generator, which uses electromagnetic principles to induce alternating current into coils, when permanent magnets are rotated around of the wires, creating on them a periodical change of magnetic flux.

PMs in a ring configuration, with alternated polarity and magnetic fields in the radial direction are combined with coils to form the PM generator. The PMs around the static central axis are rotated, and the magnetic flux from them crosses the coils to induce an electromotive force (emf). The coils are distributed in a central and stationary way, inside of the circle formed by the PM ring, with the PMs.

PM Generator Mathematical Model

The designs of magnets and coils used here have the same shape and distribution as most of the commercial HDD motor designs, which use a three-phase system with 9 coils and 12 magnets, distributed in a ring around the coils, with radial alternated polarity. Also, to select the number of armature coils and the number of pair poles the equation from [96], which supports the currents micro motor designs used in commercial hard drive disk machines, was used.

$n_{coil} = \frac{3}{4}n_p$

Where $n_p$ is the number of permanent magnets used in the ring configuration. The present invention preferably uses a 3-phase winding with S=9 slots and a ring of $n_p=12$ PMs, creating a permanent magnet system of (S/3)/P=3/12=1/4. In this relation, the numerator 1 in 1/4 is the number of slots for each phase in each pole phase and the denominator 4 is the number of poles required for a complete pattern. However, some laws and principles must be used to find the relationship between parameters of the permanent magnet machine. For instance, Ampere's Law relates the net magnetic field along a closed loop to the electric current passing through the loop, Biot-Savart's law describes the magnetic fields induced by a current, and Lenz's Law states the direction of the induced electromotive force (emf) resulting from a changing magnetic flux which has a polarity that leads to an induced current in the coils. Finally, as defined in the second chapter, Faraday's Law states that an emf is generated, if the magnetic flux changes for any reason A, B or Ø change.

As mentioned before, the simplest practical generator consists of circular coils and permanent magnets rotating. The coils are stationary and the ring of permanent magnets rotates with constant angular velocity co, and a uniform magnetic field of strength B. The flux per pole area Ø is defined as the integral of the flux density over the pole area $A_{pm}=$ $l\frac{P_r}{n_p}$, (Where $n_p$ is the number of poles, l is the pole height, and $p_r$ is the ring of magnets perimeter ($p_r=2\pi r_{PM}$), also, $r_{PM}$ is the radius of the ring of PMs), if the flux density is considered sinusoidally distributed. The flux per pole can be calculated using the winding function method [97]-[99], which is given by:

$$\emptyset = \int_{-\pi/2}^{\pi/2} B_p A_{pm} \cos\theta d\theta = (2B_p A_{pm}) = 2B_p l \frac{p_r}{n_p} = 2B_p l \frac{2\pi r_{PM}}{n_p}$$

$$\emptyset = \frac{4\pi l r_{PM} B_p}{n_p}$$

When the rotor is moving and the magnets spin around the coils at constant electrical angular velocity $\omega_e$, the flux linked by coil is given by:

$$\lambda(t) = N\phi \cos(\omega_e t)$$

The induced voltage (emf) in the full-pitch stator coil is, $$\text{emf} = -\frac{d\lambda}{dt} = -\left(N\cos(\omega_e t)\frac{d\phi}{dt} - N\phi\omega_e \sin\omega_e t\right) = N\phi\omega_e \sin\omega_e t$$

$$\text{emf} = \frac{4\pi l r_{PM} B_p}{n_p}\omega_e N \sin\omega_e t$$

The mechanical angular velocity and the electrical angular velocity are related in this relationship as, $$\omega_e = \frac{n_p}{2}\omega_m$$

($n_p$ is the number of machine poles, and $\omega_m$ is the mechanical angular velocity).

$$\text{emf} = \frac{4\pi l r_{PM} B_p}{n_p} \frac{n_p}{2}\omega_m N \sin\left(\frac{n_p}{2}\omega_m t\right)$$

$$\text{emf} = 2\pi l r_{PM} B_p \omega_m N \sin\left(\frac{n_p}{2}\omega_m t\right)$$

The maximum value is reached when sin $$\left(\frac{n_p}{2}\omega_m t\right) = 1,$$

then $$efm_{max} = 2\pi l r_{PM} B_p \omega_m N$$

The maximum value of induced RMS value of speed voltage is written as, $$E_{RMS} = \frac{\phi \omega_e N}{\sqrt{2}} = \frac{2\pi l r_{PM} B_p \omega_m N}{\sqrt{2}} [\text{Volt}]$$

Permanent magnets machines or high power AC machines may have distributed or short-pitch windings and a winding factor must be included in the $E_{RMS}$ equation, but in this research, this factor will be included in the general losses of the system.

Complete Energy Generation System Theoretical Calculations

A new mathematical analysis is developed to find a general equation that establishes the relationship between the mechanical system (turbine) and the permanent magnet generator system. The initial conditions and some pre-defined geometry parameters are summarized in the next table,

TABLE 1

Energy Generation System Design Dimensions.

| Turbine | | | Permanent Magnet Machine (PMM) | | |
|---|---|---|---|---|---|
| Parameter | Dimension | Units | Parameter | Dimension | Units |
| $\alpha_1$ | 10 | degree | $n_p$ | 12 | |
| $\alpha_2$ | 30.01 | degree | Slots (S) | 9 | |
| $\alpha_3$ | 50.35 | degree | l | 1 | mm |
| $\beta_1$ | 9.6 | degree | $r_{PM}$ | 2.6 | mm |
| $r_1$ | 3.95 | mm | $p_r$ | 16.34 | mm |
| $r_2$ | 3.1 | mm | N | 60 | Turns |
| $r_m$ | 3.5 | mm | $B_p$ | 1 | Tesla |
| $r_N$ | 0.65 | mm | $A_{pm}$ | 1.361 E−6 | m$^2$ |
| $r_r$ | 4 | mm | $\omega_m$ | 1000-8000 | RPM |
| $A_N$ | 1.327 E−6 | m$^2$ | Electrical Power | 70-700 | mW |

The coil and magnet shapes were inspired by the motors used in computer hard disc drive (HDD), combined with the fundamental principles of hydro turbines. The HDD motor is a kind of brushless machine, which uses a conjunct of coils oriented in the radial direction inside a stator chamber, surrounded by a ring of frictionless permanent magnets, assembled on a rotor. In this invention, the permanent magnetic configuration is used as a magnet generator to produce current in the inductor coils, transforming the rotational motion of the turbine into electricity.

Figure 7B:
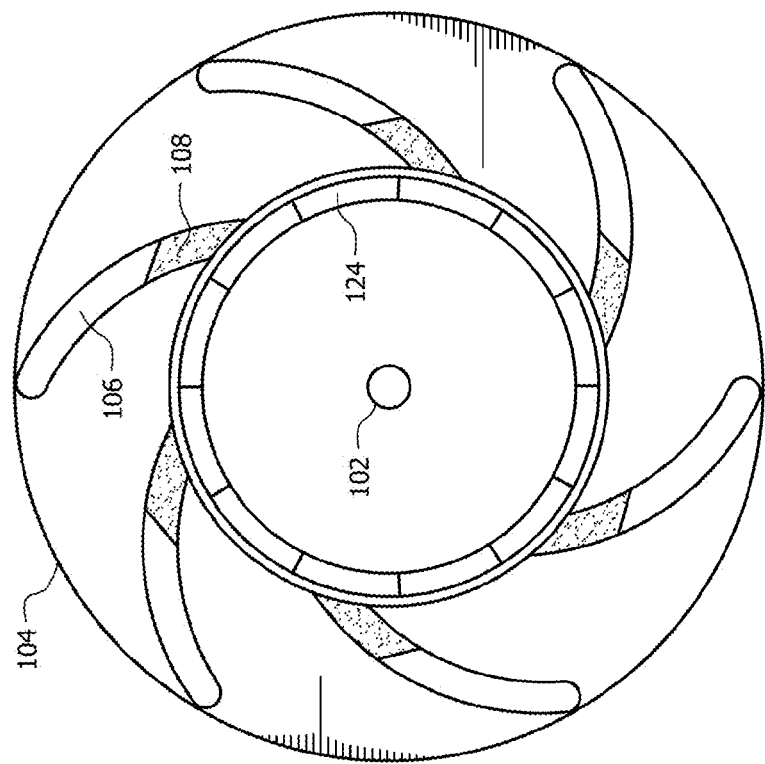
FIG. 7B is a top view of the rotor in FIG. 7A.
Figure 7A:
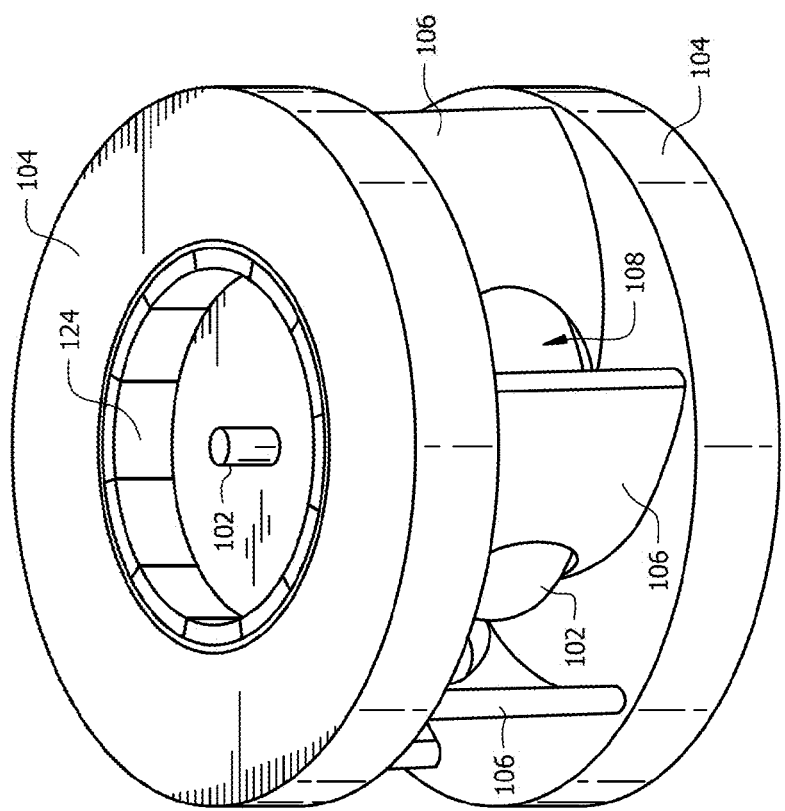
FIG. 7A is a perspective view of a certain embodiment of the rotor having a ring of PMs in the rotor support discs.
Figure 8A:
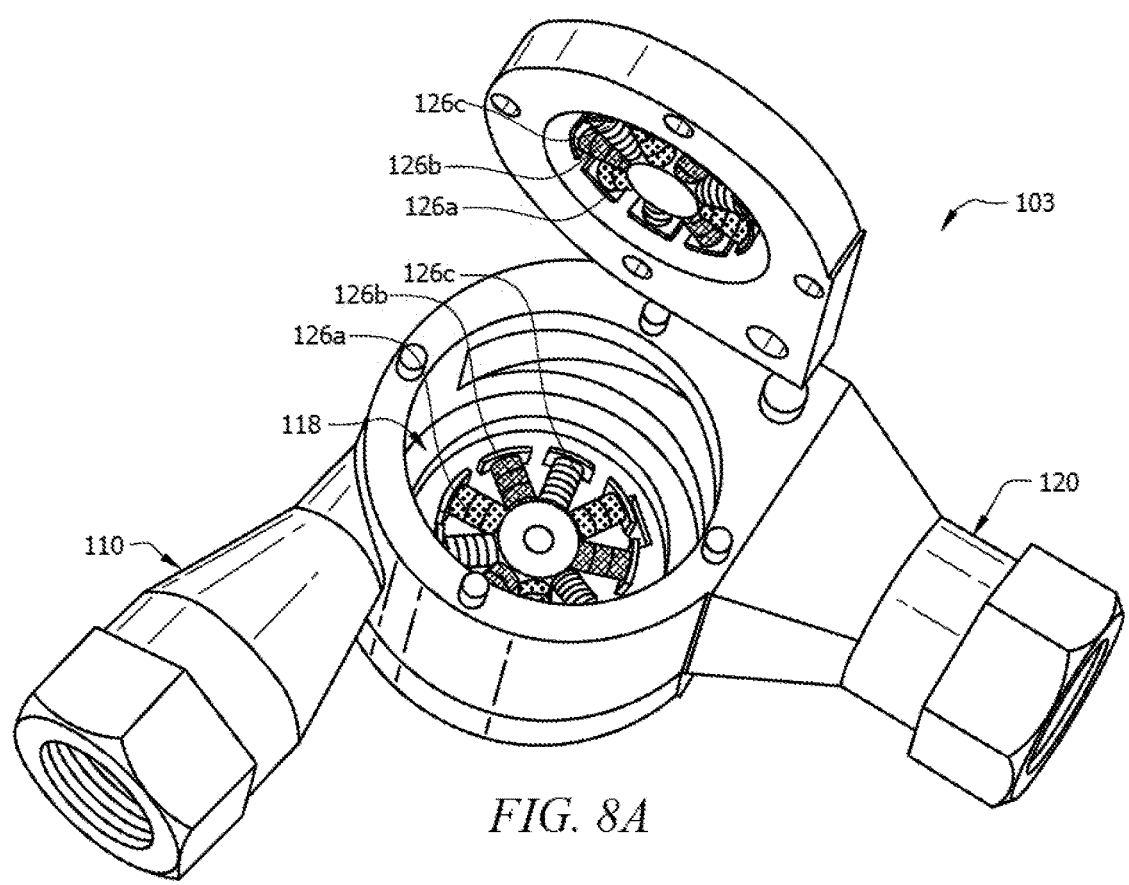
FIG. 8A is a perspective view of a certain embodiment of the turbine casing illustrating a certain location for the coils.
Figure 8B:
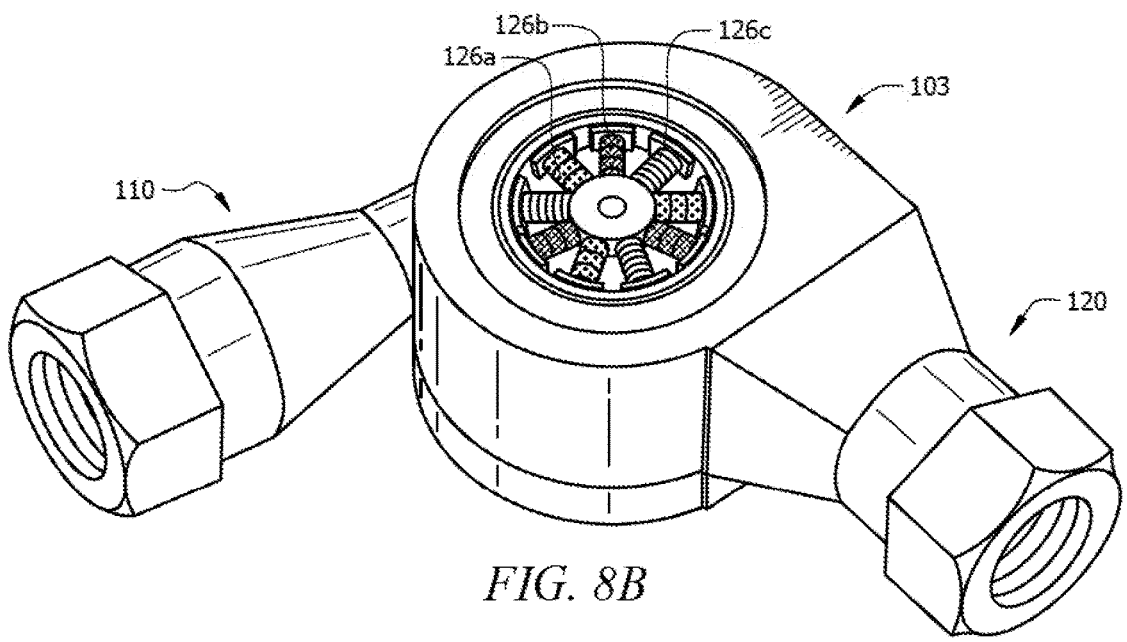
FIG. 8B is a perspective view of FIG. 8A when the turbine casing is closed.
Figure 8C:
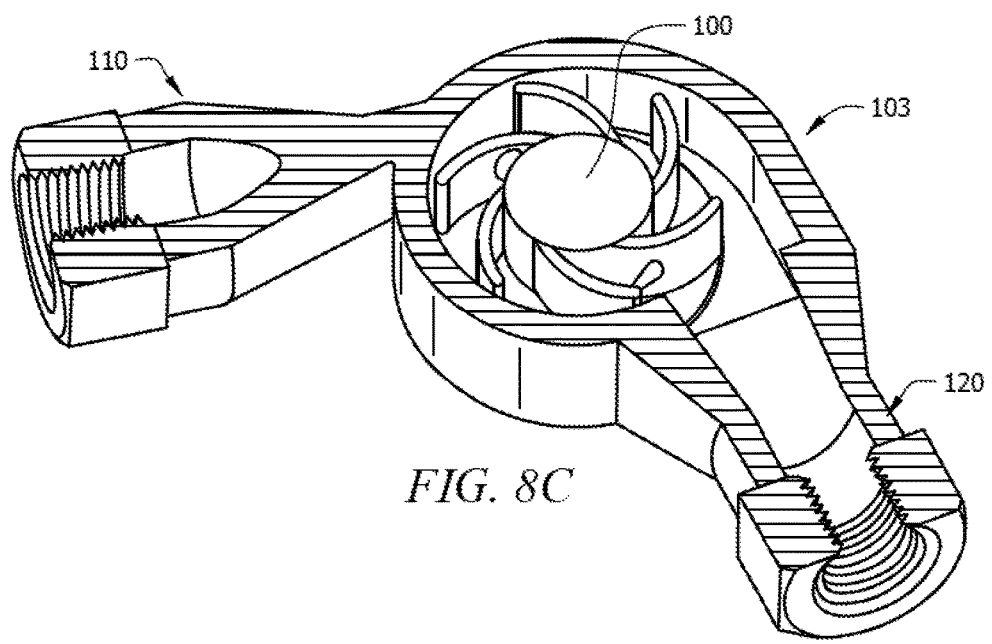
FIG. 8C is a perspective cutout view of a certain embodiment of the turbine casing and the rotor.

As shown in FIG. 7, PMs 124 are preferably arranged in a ring configuration, with alternating polarity and radial direction. Additionally, PMs 124 are set into rotor support discs 104 and the ring has a central axis aligned with the rotational axis of the rotor. As shown in FIG. 8, coils 126 are preferably integrated into the top and bottom of turbine casing 103. In this embodiment, there are nine coils 126 configured in three phases on both the top and bottom of turbine casing 103. The first phase is identified by coils 126a, the second phase is identified by coils 126b, and the third phase is identified by coils 126c. The rings of PMs 124 are assembled on the top and bottom of rotor 100, around coils 126, but with a micro gap to avoid any friction when the rotor is in movement. A double combination of coils and permanent magnets assures a higher efficiency that finally translates into more energy being transformed.

The relationship between turbine and PM generator starts in the novel design of the turbine, which is integrated with the PMs and coils in a unique compact system. The final system includes the PMs and coils attached inside of the rotor and walls of the turbine casing to maintain the preferred shape of the turbine casing and rotor while using the benefits of the rotor spin to create a variable magnetic field on the fixed coils and to generate electricity. A system of three phases (3Φ) of electrical energy is the result of the electromagnetic induction. The induction of electric currents into the coils fixed into the casing is produced by the magnetic fields from the ring of PMs, which spin when the rotor is moving. The PMs are assembled in alternating polarity on the rotor, and distributed in a ring configuration to produce radial lines of magnetic field that cross the coils in a perpendicular direction to generate electric current, induced when the movement of the rotor changes in position with respect to the PMs.

The mathematical models and the equations developed in the previous sections are related through the angular velocities, mechanical angular velocity ($\omega_m$) produced on the rotor and the electrical angular velocity ($\omega_e$) which is created on the ring of PMs. As previously defined, the mechanical angular velocity and the electrical angular velocity are related as $$\omega_e = \frac{n_p}{2}\omega_m.$$

So, if the maximum mechanical power is reached when $V_N$=5.4528 $U_1$ ($V_N$ is the fluid velocity after leave the nozzle in the rotor direction, that is known as nozzle velocity), and $U_1 = \omega_m r_1$, then a new equation emerges as a result of combining them, $$\text{emf} = 2\pi l r_{PM} B_p \omega_m N \sin\left(\frac{n_p}{2}\omega_m t\right) = 2\pi l r_{PM} B_p \frac{U_1}{r_1} N \sin\left(\frac{n_p}{2}\omega_m t\right)$$

Substituting $V_N$ and the constants values (l, $r_{PM}$, $r_1$, $n_p$) then the equation is rewritten as, $$\text{emf} = 2\pi l r_{PM} B_p \frac{U_1}{r_1} N \sin\left(\frac{n_p}{2}\omega_m t\right)$$

$$\text{emf} = \frac{2\pi l r_{PM} B_p}{5.4528} \frac{V_N}{r_1} N \sin\left(\frac{n_p}{2}\omega_m t\right)$$

$$\text{emf} = 0.1313 V_N \sin(282.14 * V_N * t)$$

Figure 9:
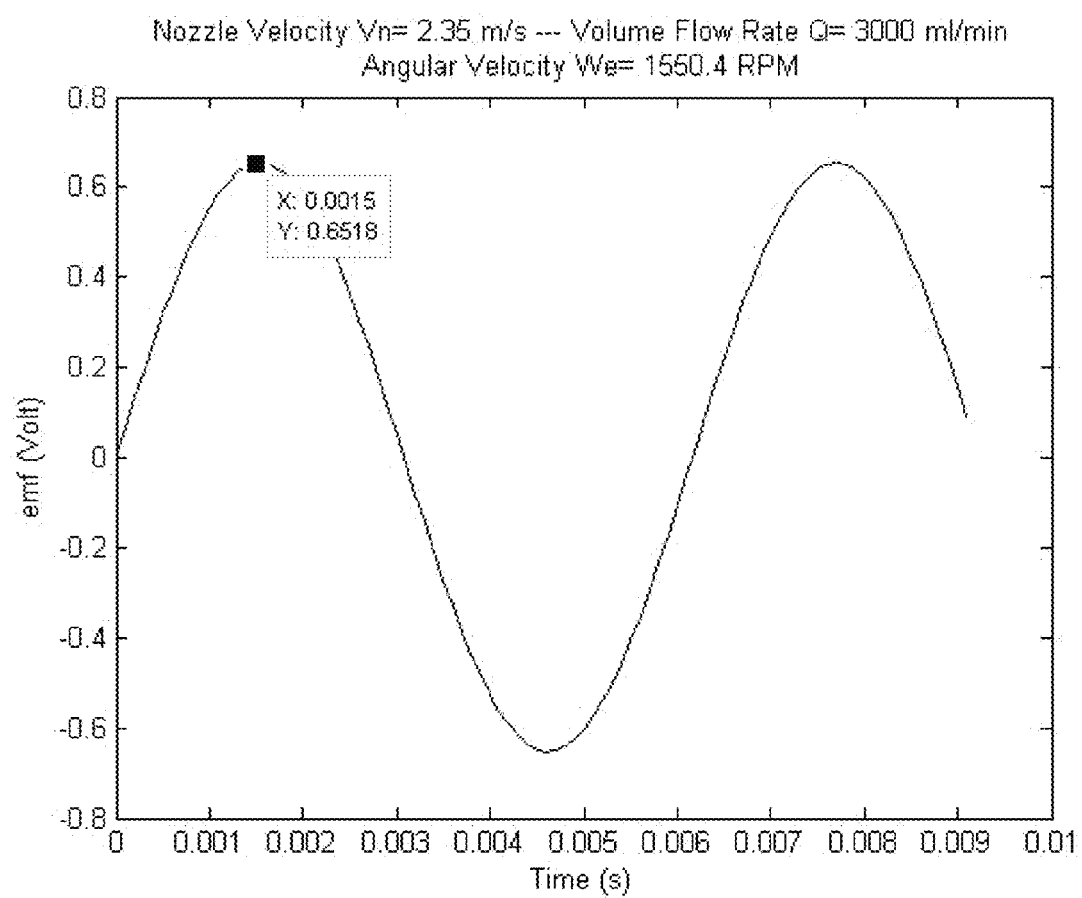
FIG. 9 is a graph of the electromotive force response of a mathematical model of the present invention.

The theoretical emf response when a volumetric flow rate $$Q = 3000 \frac{\text{ml}}{\text{min}}$$

goes through the system, with angular velocity $\omega_e$=1550.4 RPMs and produces a mechanical power from the rotor, $P_r$=102.3 mW can be seen in FIG. 9.

Experimentation

To determine the functionality of the assembled prototype and to develop the final tests, the turbine inlet system was connected to a domestic water system. The measurements of volume flow rate were taken on the turbine inlet, through a volume flow rate digital meter, connected in series with the water system and a gradual flow controller. The measurements of induced voltage were done on the terminals of the 3-phase system through a voltmeter and an oscilloscope connected in parallel with the motor-generator terminals. Three prototypes were tested as shown in Table 2 below:

TABLE 2

Comparative analysis of three prototypes.

| Prototype Model | Shape | Size | Geometry and curvature | Additional Characteristics |
|---|---|---|---|---|
| Model 1 | 8 blades | 3.175X, Small rotor | 90 degree between inlet and outlet, innovative casing design | Impulse turbine characteristics, rotor spin is require to free flow |
| Model 2 | 6 blades | 4X, Big rotor | 90 degree between inlet and outlet, innovative casing design | Impulse turbine characteristics, rotor spin is require to free flow |
| Model 3 | 6 notched blades | 3.175, Medium rotor | 100 degree between inlet and outlet, innovative casing design | Impulse and reaction turbine characteristics, cross-flow design, free flow |

The first two generation of prototypes were printed in the Virtual Manufacturing and Design Laboratory for Medical Devices (VirtualMDLab) at USF, by members of Dr. Lai-Yuen's team, and the last two generations were printed by USF's Engineering Technical Support Services (ENG TSS). Most of the prototypes developed through this dissertation work were made using a 3D prototyping printer which uses Acrylonitrile Butadiene Styrene (ABS) plastic to build parts (Dimension sst-768), while only two sets were made using a different 3D prototyping printer which uses a proprietary powder and binder system to build the parts (3D Systems' ZPrinter-450).

Figure 14A:
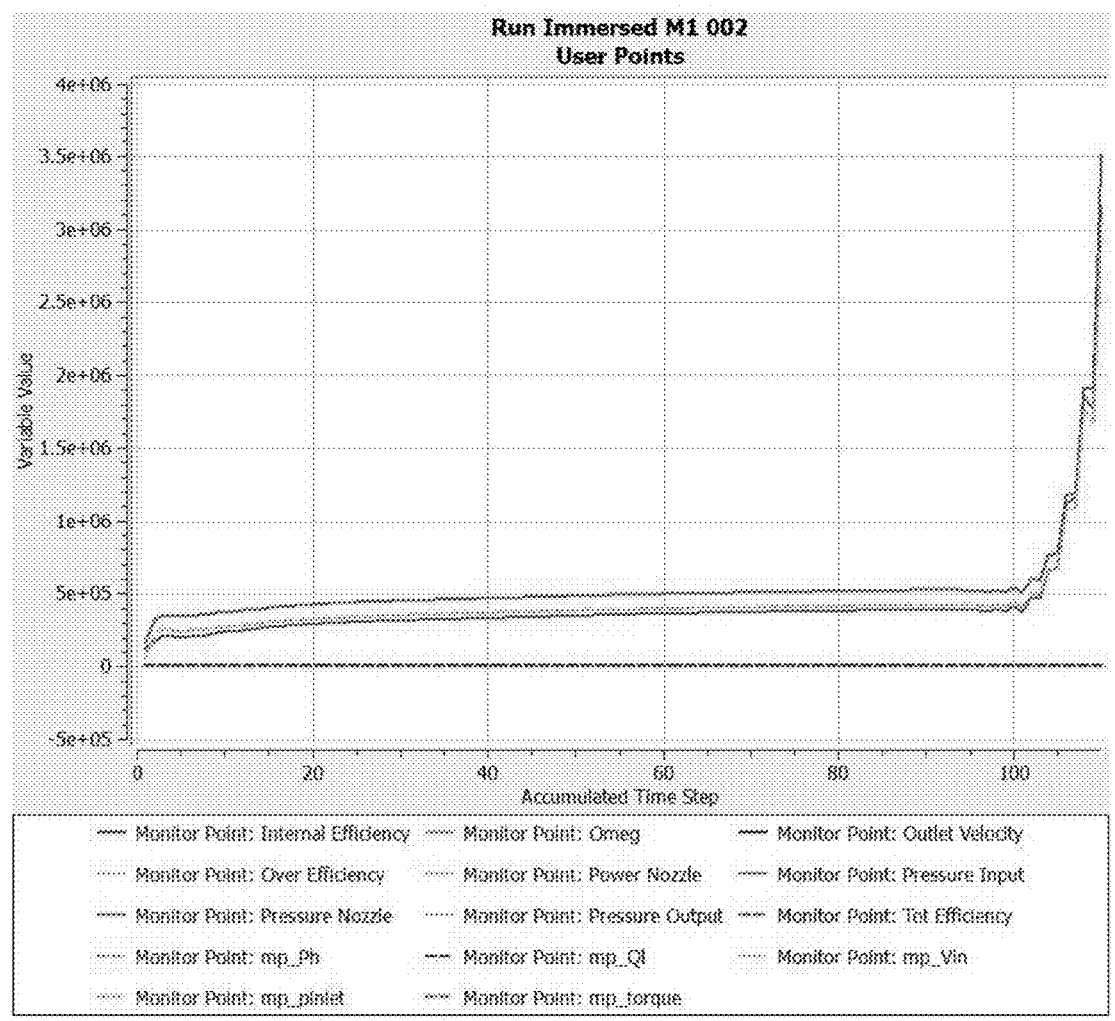
FIG. 14A is a graph of turbine simulations time response of systems behavior using volume flow rate Q=2.5 gallons per minute. The turbine model used is the same as FIG. 11, 3.175× non-notch model, with a 90-degree separation between the inlet and outlet sections of the turbine casing.
Figure 14B:
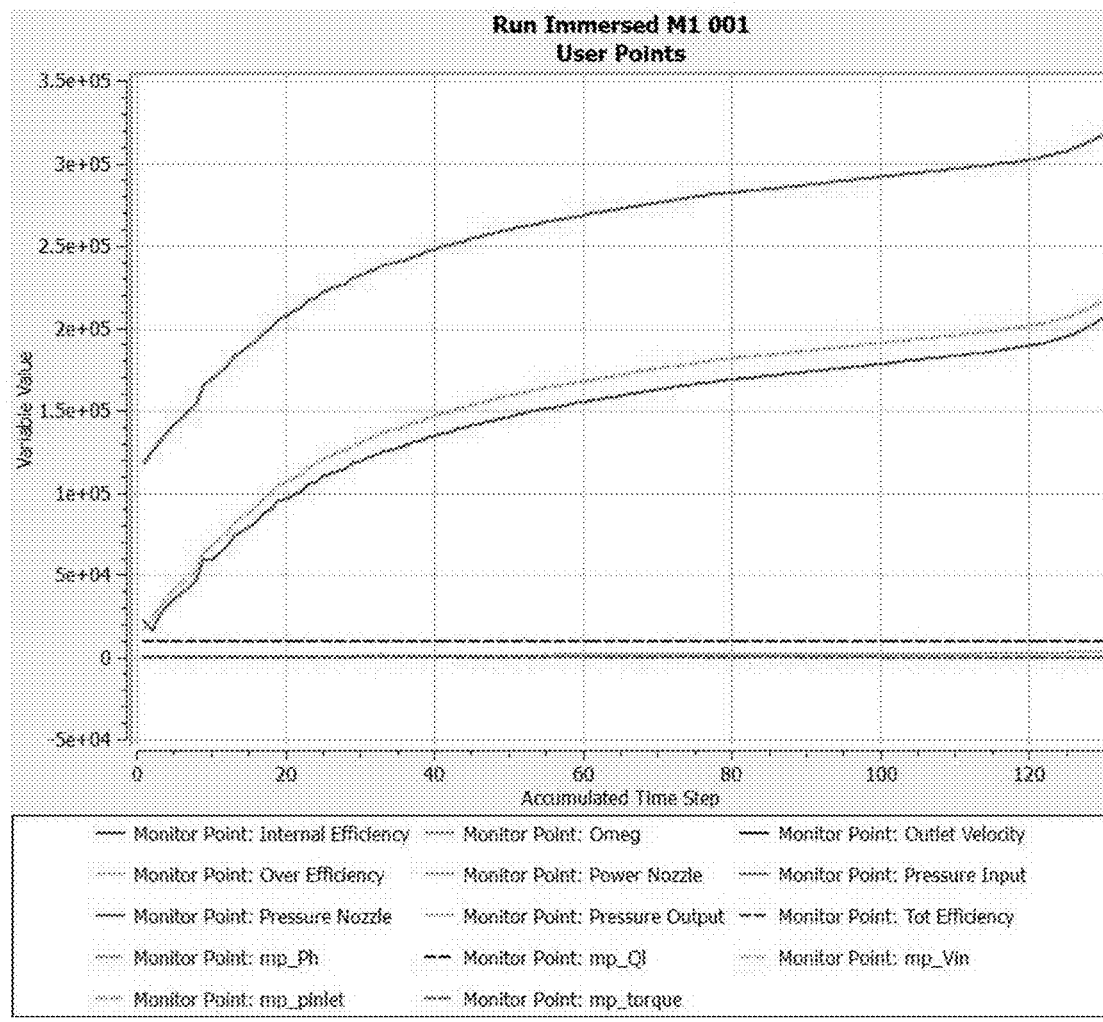
FIG. 14B is a graph of turbine simulations time response of systems behavior using volume flow rate Q=2.5 gallons per minute. The turbine represented is the 4× notch lacking model of FIG. 12, the 4× non-notched model having a 90-degree separation between the inlet and outlet section of the turbine casing.
Figure 14C:
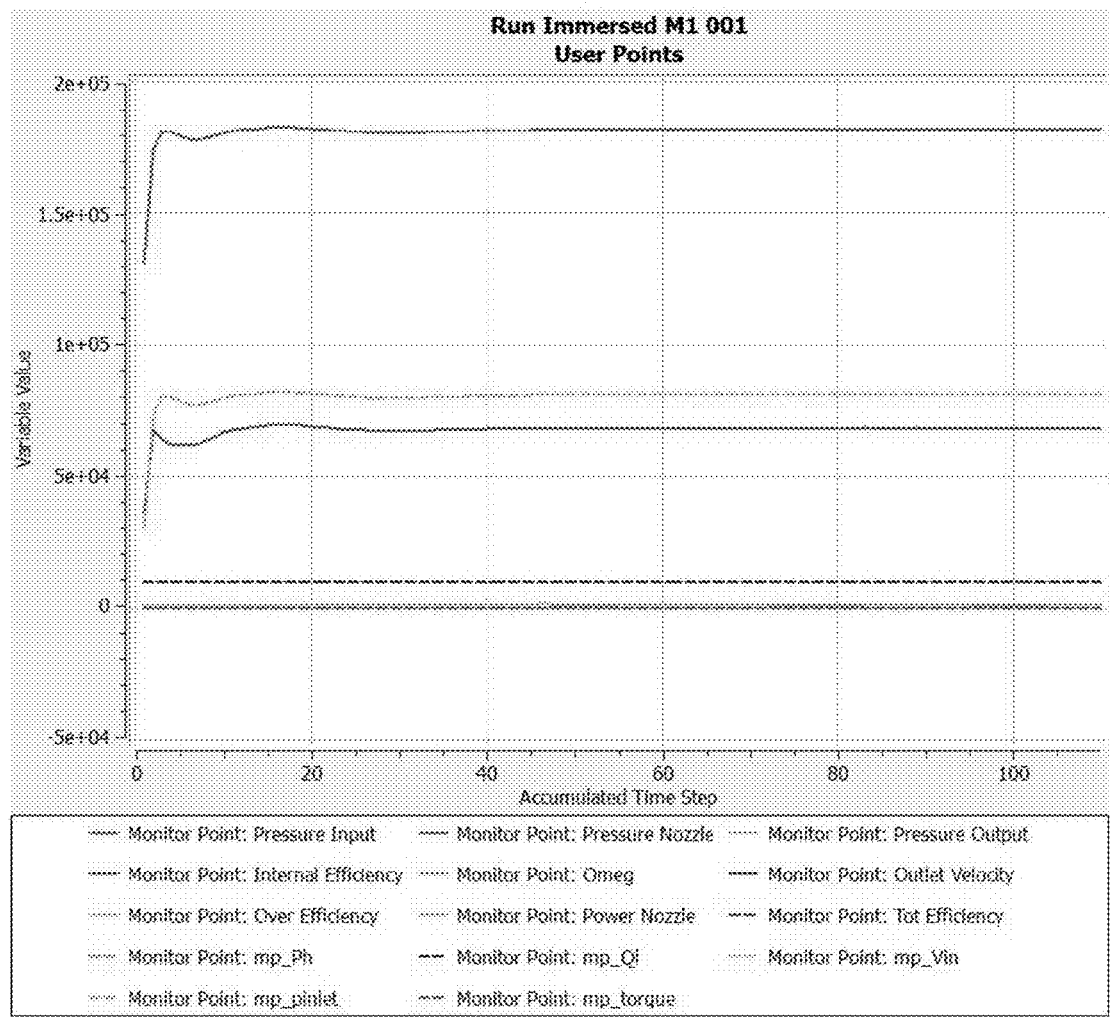
FIG. 14C is a graph of turbine simulations time response of systems behavior using volume flow rate Q=2.5 gallons per minute. The turbine represented is the 3.175× notched model.

Model 3 is the preferred embodiment. The turbine casing has an angle of 100 degrees between the inlet and outlet sections, this inclination results in the fluid being directed more towards the distal end of each blade, which has greater surface area since the notch is located on the internal, proximal edge. In other words, the first is a nozzle inclination of 10 degrees with respect to the radial and tangential axes. The behavior simulations of the fluid through the turbine are shown in FIG. 14C. FIG. 14C illustrates how the contribution of the nozzle inclination aids in reducing the vortices between the blades and on the central area of the rotor.

Motor Magnet Generator

There are different models of electromagnetic systems, which could be used as electromagnetic generators, but after an extensive cost benefit analysis, it was decided to use the shape and configuration of coils and permanent magnets used in typical hard disk drive (HDD) motors. These motors generally consist of a ring of permanent magnets and a winding in nine slots, which interact to create a three-phase electric power system.

In the assembly process of the three prototypes, 4 HDD motors were used, two of them from 3.5 inch HDD motors (3.5 inch is the physical dimensions of the drive), and two from 2.5 inch HDD motors (2.5 inch is the physical dimensions of the drive). These kinds of motors have the same shapes, but the sizes of all elements involved in the models are different, hence the magnetic induction response is different. As was previously defined, the induced voltage (emf) will be determined by the number of PMs, the surface area of each PM, the intensity and density of the magnetic field, and the rotation speed of the magnets around the coils.

Energy Generation System

TABLE 3

Turbine and permanent magnets dimensions and configuration.

| Turbine | | | Permanent Magnet Machine (PMM) | | |
|---|---|---|---|---|---|
| Parameters | Dimensions | Units | Parameters | Dimensions | Units |
| $\alpha_1$ | 10 | degree | $n_P$ | 12 | |
| $\alpha_2$ | 30.01 | degree | Slots (S) | 9 | |
| $\alpha_3$ | 50.35 | degree | l | 1 | mm |
| $\beta_1$ | 9.6 | degree | $r_{PM}$ | 2.6 | mm |
| $r_1$ | 3.95 | mm | $p_r$ | 16.34 | mm |
| $r_2$ | 3.1 | mm | N | 60 | Turns |
| $r_m$ | 3.5 | mm | $B_p$ | 1 | Tesla |
| $r_N$ | 0.65 | mm | $A_{pm}$ | 1.361 E−6 | $m^2$ |
| $r_r$ | 4 | mm | $\omega_m$ | 1000-8000 | RPM |
| $A_N$ | 1.327 E−6 | $m^2$ | Electrical Power | 70-700 | mW |

Energy Generation System Testing Results

Figure 11:
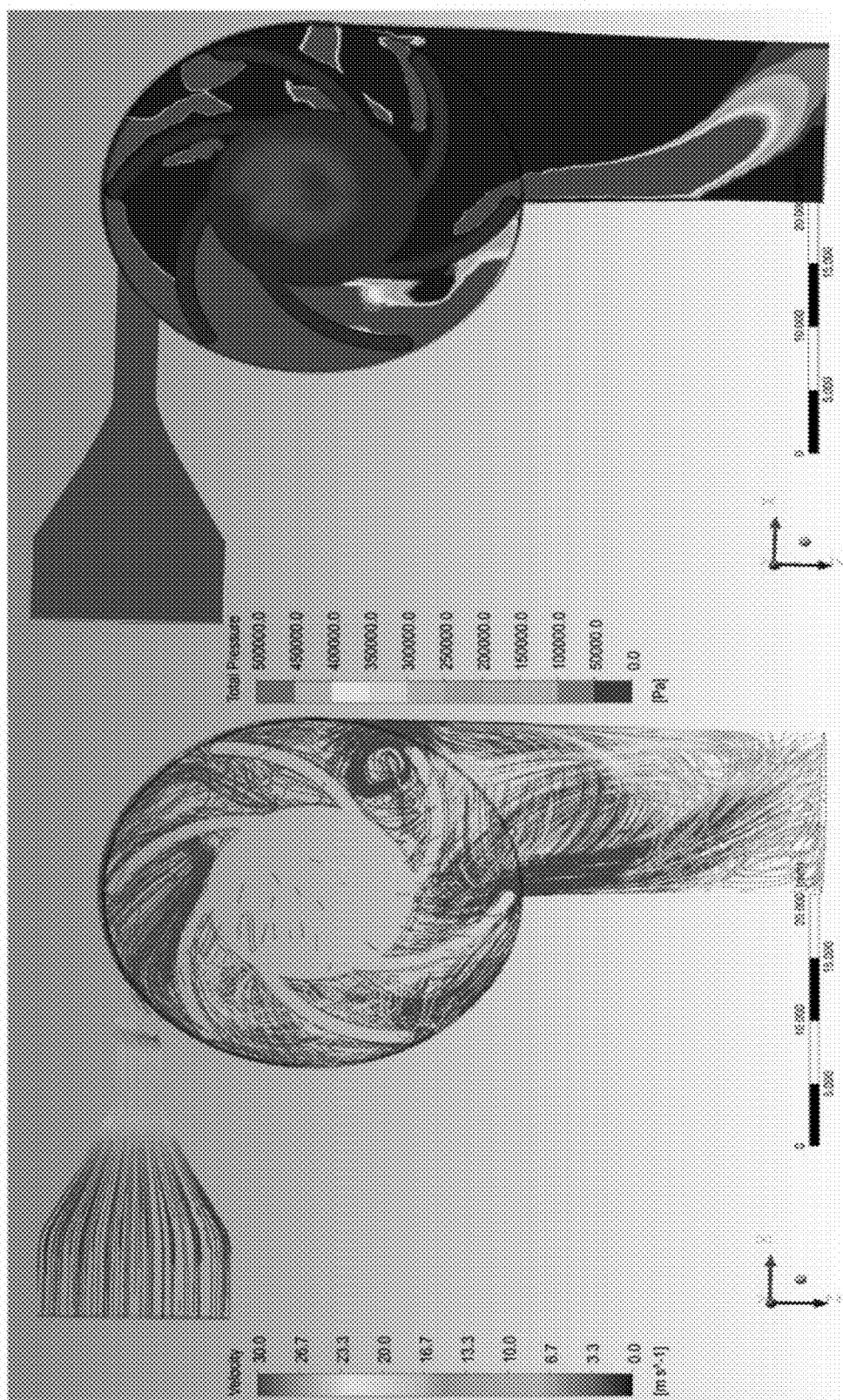
FIG. 11 is a turbine flow simulation representing the 3.175× non-notch model with a 90-degree separation between the inlet and outlet sections of the turbine casing.
Figure 12:
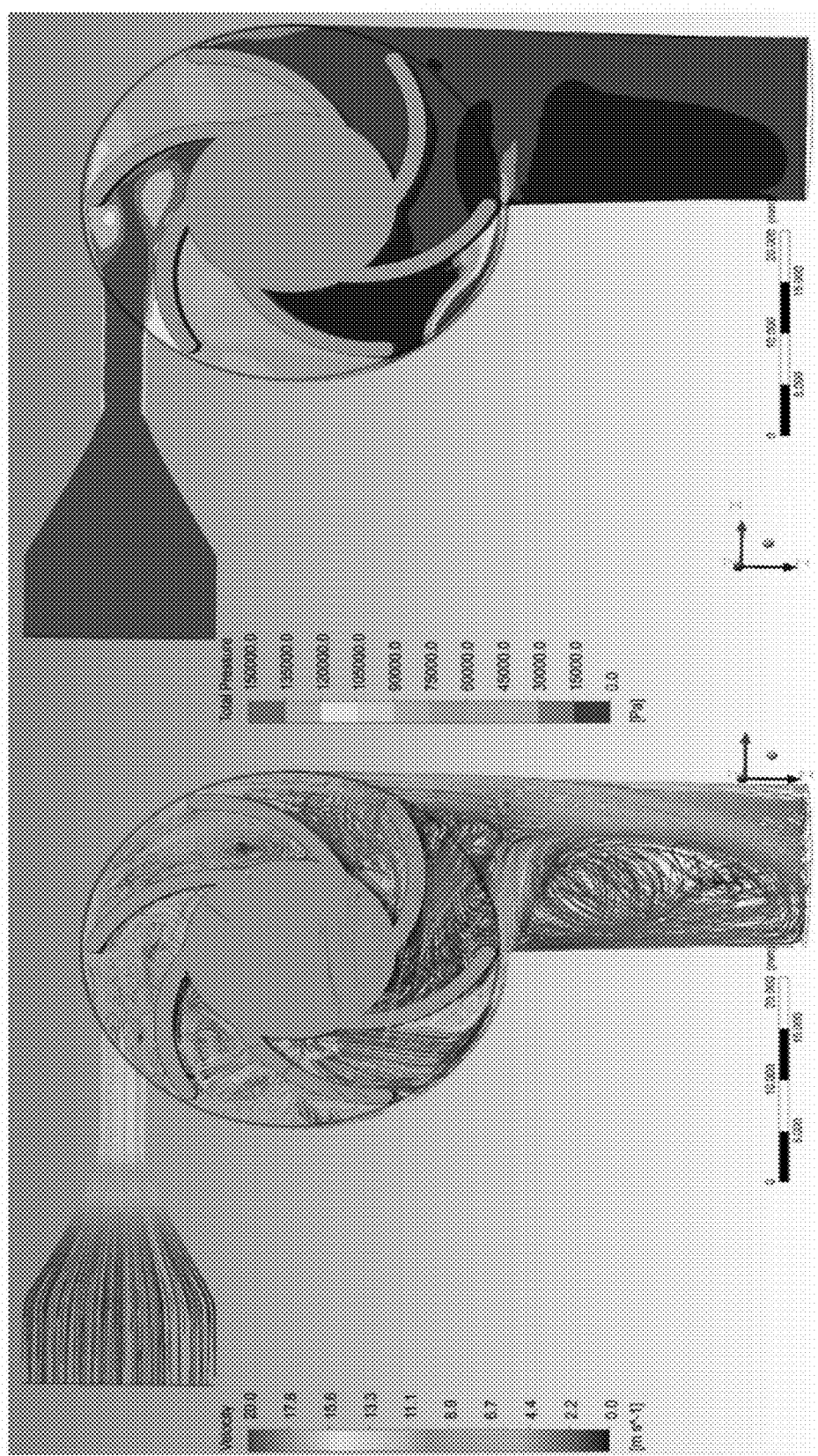
FIG. 12 is a turbine flow simulation representing the 4× non-notch model with a 90 degree separation between the inlet and outlet sections of the turbine casing.
Figure 13:
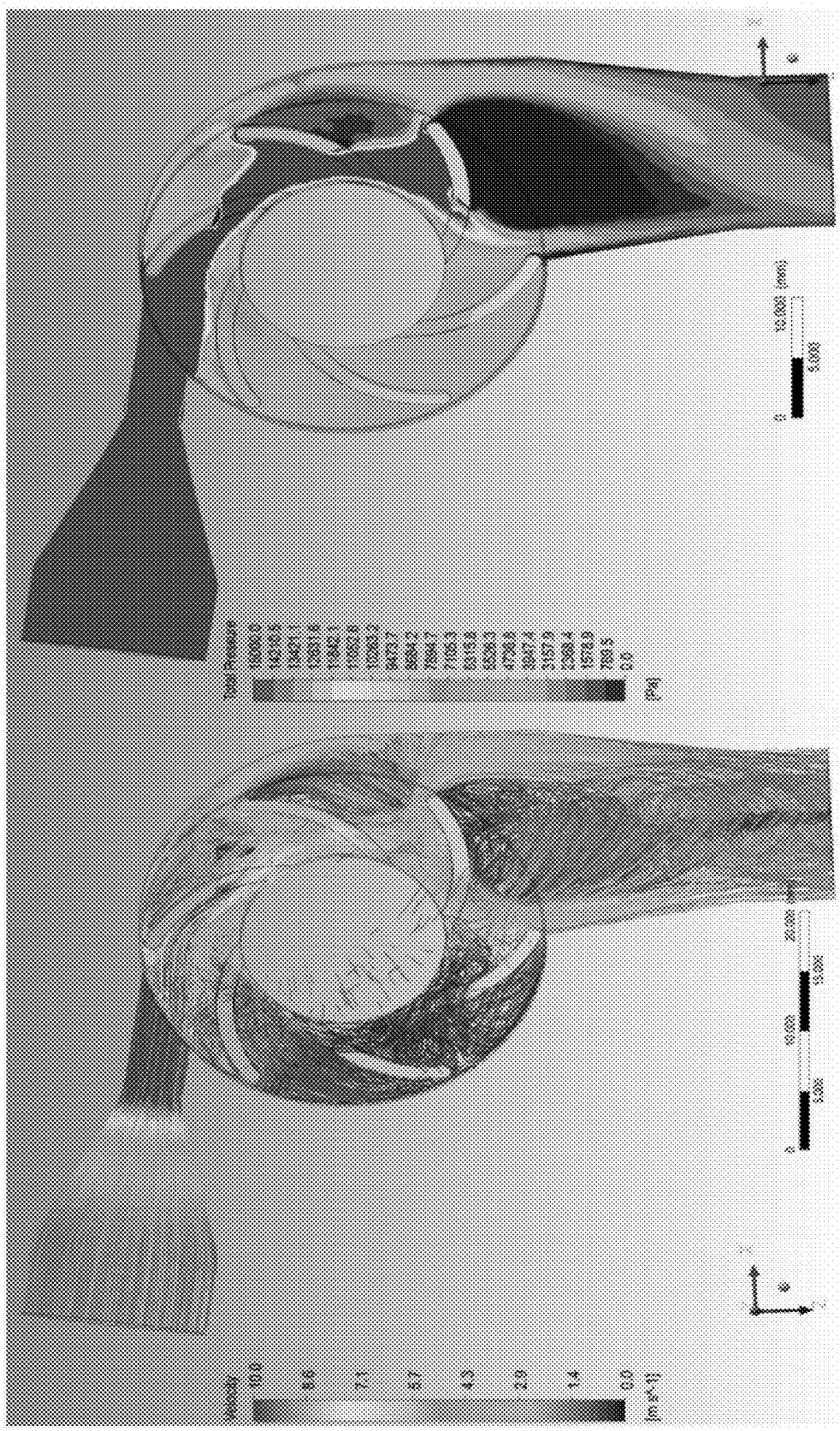
FIG. 13 is a turbine flow simulation representing the 3.175× notched model.

The three selected models have been simulated by using ANSYS Workbench V. 13.0, and the associated software to include geometry, mesh, pre-processing and post-processing. The simulation processes used the same solver control, output control, and data expressions, to maintain the same reference point for the analysis. The velocity and pressure behavior of the three models are shown in FIGS. 11-13.

Figure 10:
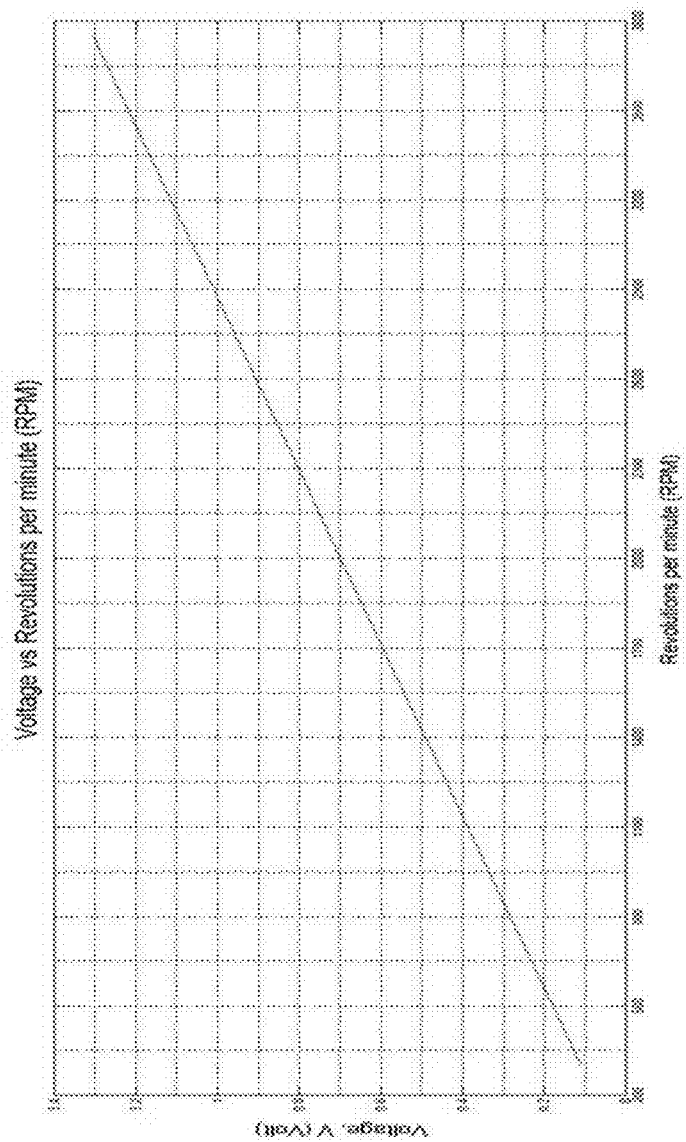
FIG. 10 is graph providing the characterization of a HDD motor used as PM-Generator

FIG. 10 shows the characterization data and linearization of a small HDD motor used as PM-generator. The data of FIG. 10 was collected at USF's AMBIR lab and was to find the relationships between the voltage and angular velocity, and between the volume flow rate and angular velocity, when the HDD motor is assembled into the turbines and used as a motor-generator machine.

The characteristics of the three models are summarized in Table 3; and the testing results are shown in Table 4 below. The data points of voltage and volume flow rate in Table 4 were taken using the Extech 430 (part number EX430) True RMS Autoranging Multimeter and the OMEGA Digital Paddlewheel Meter FP2001-RE respectively. The volume flow meter was connected between the domestic water system and the turbine inlet to measure how many gallons per minute were entering the Turbine-generator system, and to use this meter as a flow regulator. The volume flow rate measured was between 0 and 4 gallons per minute. The maximum Q of the turbine was sufficient to move the motor/generator in a safe range of revolutions per minute, without causing any damage to the internal structure of the generator's motor. The HDD motors used and assembled into the prototypes were designed to work at angular velocity of 5400 RPM [100]-[103].

TABLE 4

Test results: Volume flow rate vs. voltage produced.

| Prototype 1 (Old-3.175X) | | Prototype 2 (Old-4X) | | Prototype 3 (Final-3.175) | |
|---|---|---|---|---|---|
| Volume Flow Rate Q (Gallons/Minute) | Voltage (V) | Volume Flow Rate Q (Gallons/Minute) | Voltage (V) | Volume Flow Rate Q (Gallons/Minute) | Voltage (V) |
| 0.92 | 0.07 | 0.52 | 0.044 | 0.63 | 0.142 |
| 1.1 | 0.168 | 0.62 | 0.092 | 0.71 | 0.173 |
| 1.14 | 0.19 | 0.68 | 0.12 | 0.81 | 0.205 |
| 1.2 | 0.22 | 0.72 | 0.141 | 0.9 | 0.26 |
| 1.21 | 0.232 | 0.82 | 0.184 | 1.02 | 0.32 |
| 1.34 | 0.271 | 0.9 | 0.19 | 1.11 | 0.362 |
| 1.42 | 0.3 | 1 | 0.276 | 1.21 | 0.421 |
| 1.48 | 0.323 | 1.1 | 0.322 | 1.31 | 0.471 |
| 1.5 | 0.334 | 1.2 | 0.371 | 1.4 | 0.51 |
| 1.55 | 0.34 | 1.3 | 0.409 | 1.51 | 0.56 |
| 1.62 | 0.372 | 1.4 | 0.452 | 1.61 | 0.6 |
| 1.7 | 0.401 | 1.51 | 0.47 | 1.71 | 0.64 |
| 1.78 | 0.435 | 1.6 | 0.535 | 1.8 | 0.666 |
| 1.8 | 0.45 | 1.71 | 0.58 | 1.85 | 0.684 |
| 1.83 | 0.44 | 1.8 | 0.6 | 1.9 | 0.7 |
| 1.92 | 0.47 | 1.83 | 0.615 | 1.95 | 0.737 |
| 2 | 0.518 | 1.91 | 0.635 | 2 | 0.76 |
| 2.3 | 0.62 | 2 | 0.684 | 2.11 | 0.794 |
| 2.4 | 0.625 | 2.1 | 0.716 | 2.2 | 0.83 |
| 2.5 | 0.684 | 2.23 | 0.79 | 2.3 | 0.87 |
| 2.66 | 0.706 | 2.3 | 0.807 | 2.4 | 0.91 |
| 2.75 | 0.738 | 2.4 | 0.86 | 2.5 | 0.95 |
| 2.8 | 0.76 | 2.5 | 0.905 | 2.6 | 0.985 |
| 2.9 | 0.81 | 2.71 | 0.98 | 2.71 | 1.025 |
| 3 | 0.83 | 2.8 | 1 | 2.8 | 1.05 |
| 3.2 | 0.875 | 2.91 | 1.043 | 2.9 | 1.06 |
| 3.46 | 0.943 | 3.02 | 1.09 | 3 | 1.13 |
| 3.79 | 1.04 | 3.08 | 1.11 | 3.12 | 1.16 |
| | | 3.13 | 1.14 | 3.2 | 1.185 |
| | | 3.29 | 1.19 | 3.25 | 1.195 |
| | | 3.3 | 1.195 | 3.3 | 1.125 |
| | | 3.35 | 1.21 | 3.47 | 1.26 |
| | | 3.43 | 1.24 | | |

Analysis of the Results

The internal behavior of the turbines, when a fluid flows through the system, is shown in FIGS. 11, 12, and 13. These simulations show the internal differences between the three turbine models and confirm the adaptability problems with the non-notched models, when operating in a closed circulatory system. In contrast to the non-notched models (FIGS. 11 and 12), the notched blade turbine system, shown in FIG. 13, contains several innovations, the most important being the inclusion of a notch on each blade. As shown in FIG. 13, the notches in the internal central edge of each blade allow for continuous circulation of liquid inside of the rotor-chamber, and ensure more interaction between the fluid and the blades. In this novel design, the fluid strikes the first blade and the notch redirects the fluid, to impact more than one blade.

The simulations in FIGS. 11-13 show the impulse jet behavior on the first blade in the three prototyped models. Only in the notched system is most of the fluid directed clockwise, resulting in more than one blade being impacted and contributing to an increased rotor spin. The simulations of the notched turbine in FIG. 13, illustrates how the notched design results in more interaction between the fluid and the blades than that of non-notched blades. FIGS. 11 and 12 show the fluid impacting the first non-notched blade, producing only a single force impulse on the rotor, while the notched blade model in FIG. 13 shows a direct jet impact on the first blade, and an indirect impact on second and third blades. While this benefit is mostly due to the notches in the blades, the blade curvature and casing shape also aid in the directed flow.

Other differences between models are in the transient response (see FIGS. 14A-C), which is immediate in the notched turbine (FIG. 14C). In addition, flow circulation problems were detected in the non-notched bladed turbines because, when the flow was interrupted, the turbine inlet pressure and the pressure in the first blade increased dramatically, causing vortices inside of the rotor blades. These vortices could reduce the lifetime of the turbine system.

Figure 15:
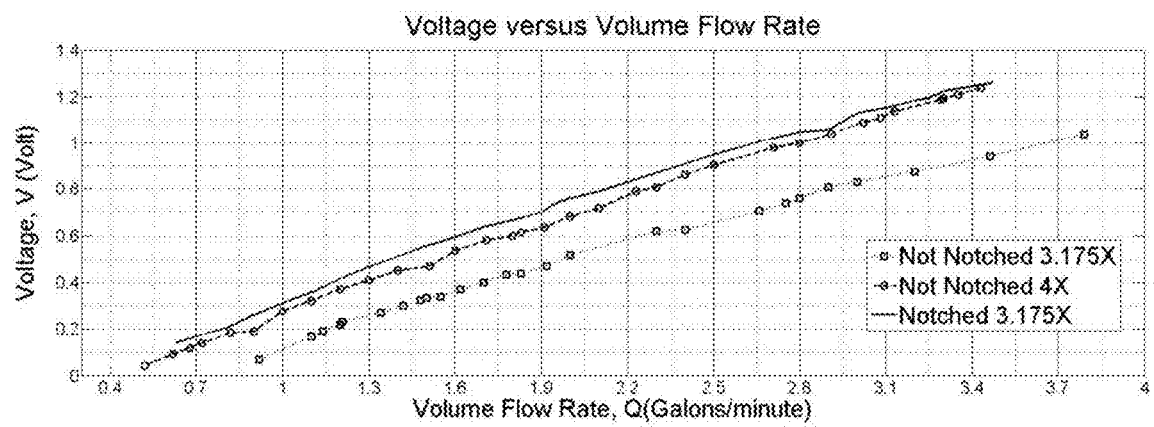
FIG. 15 is a graph showing voltage versus volume flow rate for the three tested models.
Figure 16:
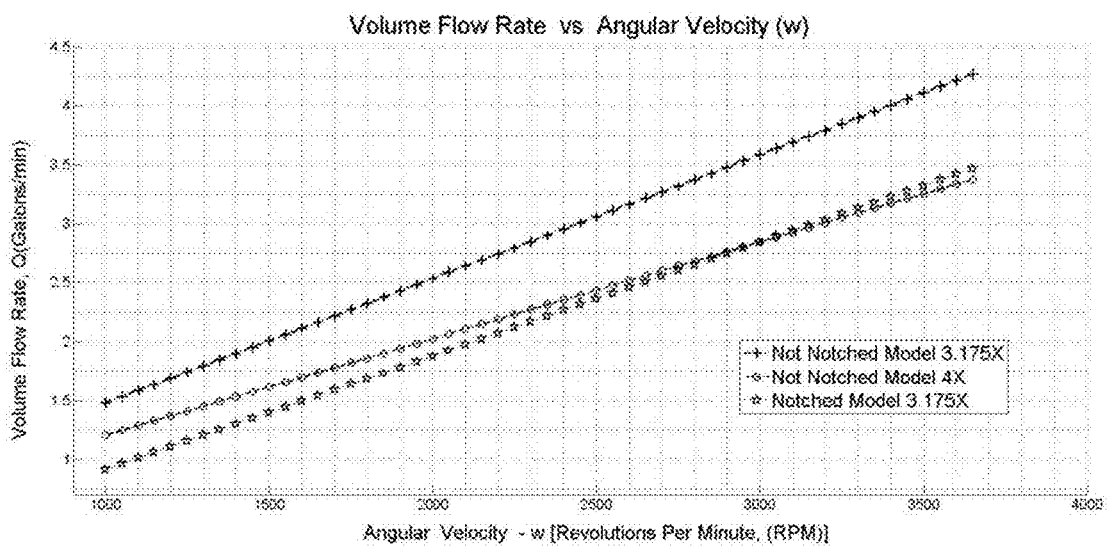
FIG. 16 is a graph showing volume flow rate versus angular velocity for the three tested models.

The testing results of Voltage (V) vs. Volume Flow Rate (Q) and Voltage (V) vs. Angular Velocity (ω) of the three prototypes are shown in FIGS. 15 and 16, respectively. Using the same volume flow rate of the three models, an increase in voltage can be seen in the notched model when compared to the models without the notch. Moreover, to spin the rotor in the three prototypes, a higher volume flow rate is needed to spin the non-notched models, than in the notched model. In summary, the test results validate the novel notched blade design of the present invention. Furthermore, these analyses support the conclusion that the notched system is more efficient than the non-notched models, and satisfies the minimal efficiency general standard of impulse turbines, which reach an average of 70% efficiency.

Figure 17:
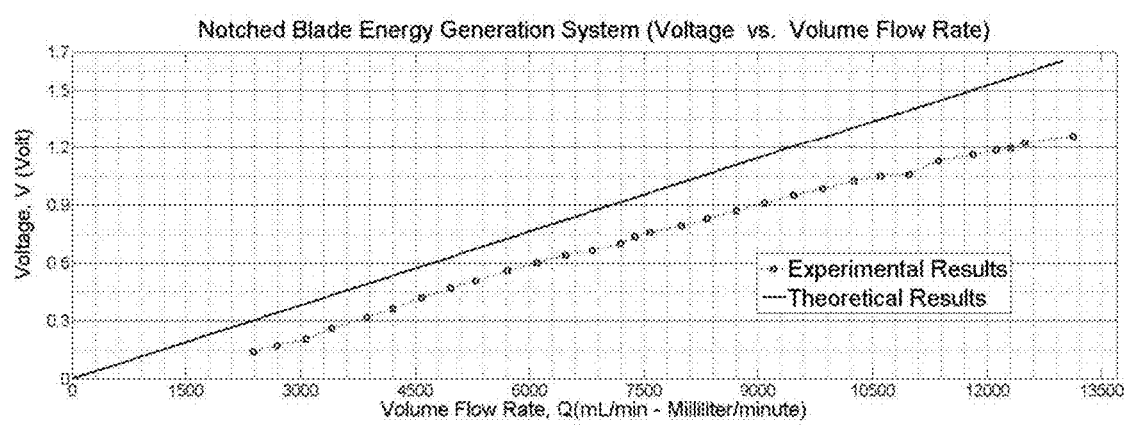
FIG. 17 is a graph showing voltage versus volume flow rate for notched blade model.

FIG. 17 was developed to understand the difference between the theoretical calculations and the experimental data. The mathematical model was used to find the relationship between volume flow rate and the ideal voltage that must be produced by the notched blade energy generation system. The parameters of a 3.175× size model were used and the final relationship is shown FIG. 17. The experimental data of the notched blade energy generation prototype was used to complete FIG. 17. Under ideal conditions, the experimental and theoretical results of FIG. 17 should be close to being equal. The mathematical relationship of experimental to theoretical produces a result of 53%. This result has multiple causes, which are listed as follows:

a. The theoretical calculations were developed using a perfect model, which did not include the losses, by structure, frictions, material, viscosity, and gravity.
b. The materials used to develop the prototypes, and the limitations of the 3D printer machines at USF labs created assembly problems.
c. The prototype quality was impacted by structural problems in the casing walls, and many tiny holes increased wall porosity and changed the internal behavior of the system.
d. The relationship between the inlet and outlet volume flow rate was affected by the porosity of the material, which became a considerable factor that adversely affected the efficiency of the system.
e. The materials, facilities, and tools used presented limitations, but were sufficient to show proof of concept.
f. Finally, the HDD motors used as motor-generators, which added friction, weight, forces, and torques, were not taken into account in the theoretical model resulting in an efficiency of 53% when compared with the experimental results.

In a certain embodiment, the present invention may utilize any number of notched blades known to a person having ordinary skill in the art, however, there are preferably between six and twelve blades.

Figure 18:
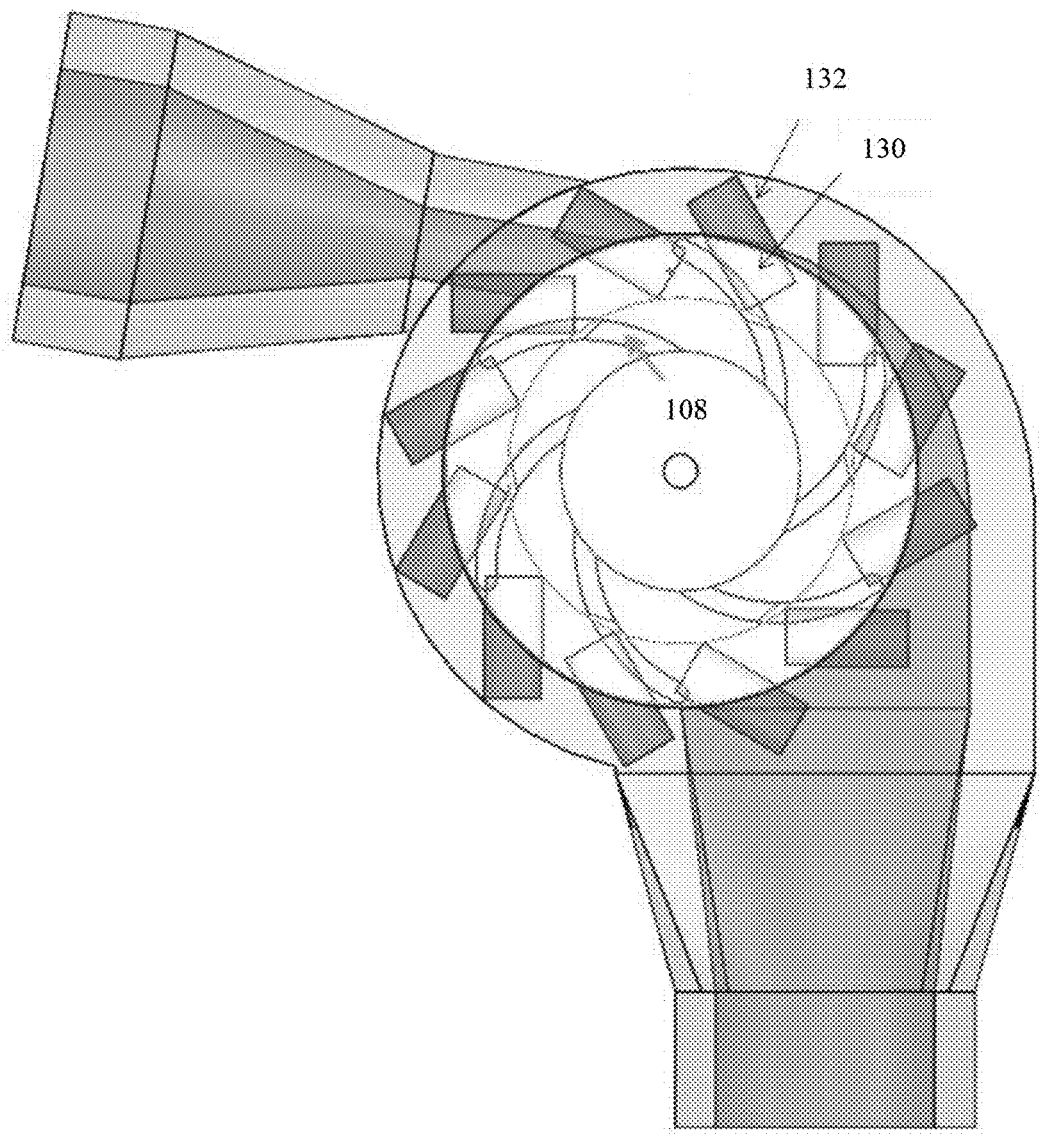
FIG. 18 is a side view showing a certain embodiment of the levitation system.

In a certain embodiment, a levitation system may be used on the rotor to create rotor levitation as previously mentioned. A permanent-magnet configuration in the casing and the rotor creates the rotor levitation effect. This special characteristic could minimize friction inside of the turbine, reducing pressure through the turbine, as well as contribute to increased rotor spin and efficiency. In a certain embodiment, as shown in FIG. 18, the present invention utilizes twenty four PMs 130 attached in the lateral side of each rotor disk, and twenty four PMs 132 inside of the rotor chamber to create rotor levitation. In a certain embodiment, PMs 130 and 132 are arranged in the rotor and rotor chamber so that they are in the same plane and can perfectly aligned with each other in the longitudinal direction, see FIG. 18. These PMs have 30 degree of inclination with respect to the radial direction and all of them have the same external polarity, to produce repulsion when the PM's frontal cross section are longitudinally aligned and attraction when there are 15 degree or more between them. The orientation of the PMs allows for rotor levitation (bearingless, brushless and without spindles), resulting in frictionless rotation.

In a certain embodiment, the present invention is made of certain materials that allow for integration into a bio-physiological system, including a titanium turbine, permanent magnets coated with biocompatible material, and copper inductor coils coated with biocompatible material. Additionally, the circuit elements and connectors exposed to an in vivo environment will be constructed of silicon carbide, and any surface in contact with blood or tissue will be biocompatible.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATED REFERENCES

Henry Cabra, Sylvia W. Thomas, "Design and Simulation of a Miniature Generator by Using a Spindle Motor Machine" $5^{th}$ Annual Engineering Research Day. Poster Competition. College of Engineering, University of South Florida. November 2012.

Henry Cabra, Sylvia W. Thomas, "Design, Simulation, and Test of a Millimeter Bio Power Generator". Society of Hispanic Professional Engineering SHPE 2012 Conference. Paper Competition. November 2012.

Henry Cabra, Sylvia W. Thomas, "Design, Simulation, and Test of a Millimeter Power Generator". NanoMed 2012—International Conference on Nanotechnology in Medicine. Abstract accepted for oral presentation. 7-9 Nov. 2012, London, UK. (Oral presentation did not occur).

Henry Cabra, "Design, Simulation, Prototype, and Testing of a Notched Blade Energy Generation System," Dissertation Paper.

[1] J. Peirs, D. Reynaerts, and F. Verplaetsen, "A microturbine for electric power generation," Sensors and Actuators A: Physical, vol. 113, no. 1, pp. 86-93, June 2004.

[2] P. C.-P. Chao, C. I. Shao, C. X. Lu, and C. K. Sung, "A new energy harvest system with a hula-hoop transformer, micro-generator and interface energy-harvesting circuit," Microsyst Technol, vol. 17, no. 5-7, pp. 1025-1036, June 2011.

[3] J. Martinez-Quijada and S. Chowdhury, "A two-stator MEMS power generator for cardiac pacemakers," in IEEE International Symposium on Circuits and Systems, 2008. ISCAS 2008, 2008, pp. 161-164.

[4] P. D. Mitcheson, "Analysis and Optimisation of Energy-Harvesting Micro-Generator Systems," Imperial College, 2005.

[5] R. Yang, Y. Qin, C. Li, G. Zhu, and Z. L. Wang, "Converting Biomechanical Energy into Electricity by a Muscle-Movement-Driven Nanogenerator," Nano Letters, vol. 9, no. 3, pp. 1201-1205, March 2009.

[6] Y. Nakanishi, S. Iio, Y. Takahashi, A. Kato, and T. Ikeda, "Development of a Simple Impulse Turbine for Nano Hydropower," Journal of Fluid Science and Technology, vol. 4, no. 3, pp. 567-577, 2009.

[7] D. P. Arnold and M. G. Allen, "Fabrication of Microscale Rotating Magnetic Machines," in Multi-Wafer Rotating MEMS Machines, J. Lang, Ed. Springer US, 2010, pp. 157-190.

[8] M. Bugge and G. Palmers, "Implantable device for utilization of the hydraulic energy of the heart," RE4139422 June 2010.

[9] T. W. Piaget, B. Mi, L. E. Juffer, K. R. Maile, A. V. Chavan, and C. Zhang, "Implantable Medical Device with Internal Piezoelectric Energy Harvesting,".

[10] B. Pless and J. A. Connor, "IMPLANTABLE POWER GENERATOR," 2008020096321 August 2008.

[11] A. C. Fernandez-Pello, A. P. Pisano, K. Fu, D. C. Walther, A. Knobloch, F. Martinez, M. Senesky, C. Stoldt, R. Maboudian, S. Sanders, and D. Liepmann, "MEMS Rotary Engine Power System," IEEJ Transactions on Sensors and Micromachines, vol. 123, no. 9, pp. 326-330, 2003.

[12] J. D. Jackson and R. F. Fox, "Classical electrodynamics," American Journal of Physics, vol. 67, p. 841, 1999.

[13] M. F. Iskander, Electromagnetic fields and waves. Prentice Hall Englewood Cliffs, 1992.

[14] A. Kovetz, Electromagnetic theory. Oxford University Press Oxford, 2000.

[15] Lorentz, F., Barstad, "CFD Analysis of a Pelton Turbine," Norwegian University of Science and Technology, Department of Energy and Process Engineering, 2012.

[16] "CrossFlow Turbine Design," Scribd. [Online]. Available: http://www.scribd.com/doc/117792063/CrossFlow-Turbine-Design. [Accessed: 11 Mar. 2013].

[17] J.-C. Marongiu, F. Leboeuf, J. Caro, and E. Parkinson, "Free surface flows simulations in Pelton turbines using an hybrid SPH-ALE method," Journal of Hydraulic Research, vol. 48, no. supl, pp. 40-49, 2010.

[18] A. Perrig, "Hydrodynamics of the free surface flow in Pelton turbine buckets," EPFL Theses, no. 3715, 2007.

[19] B. R. Cobb and K. V. Sharp, "Impulse (Turgo and Pelton) turbine performance characteristics and their impact on pico-hydro installations," Renewable Energy, vol. 50, pp. 959-964, February 2013.

[20] H. Cabra and S. W. Thomas, "FABRICATION OF CROSS-FLOW BIO-MICRO-TURBINE."

[21] Y. D. Choi, J. I. Lim, Y. T. Kim, and Y. H. Lee, "Performance and Internal Flow Characteristics of a Cross-Flow Hydro Turbine by the Shapes of Nozzle and Runner Blade," Journal of Fluid Science and Technology, vol. 3, no. 3, pp. 398-409, 2008.

[22] S. Chalasani and J. M. Conrad, "A survey of energy harvesting sources for embedded systems," in IEEE Southeastcon, 2008, 2008, pp. 442-447.

[23] M. Lossec, B. Multon, and H. Ben Ahmed, "Micro-kinetic generator: Modeling, energy conversion optimization and design considerations," in MELECON 2010-2010 15th IEEE Mediterranean Electrotechnical Conference, 2010, pp. 1516-1521.

[24] A. S. Holmes, G. Hong, K. R. Pullen, and K. R. Buffard, "Axial-flow microturbine with electromagnetic generator: design, CFD simulation, and prototype demonstration," presented at the Micro Electro Mechanical Systems, 2004. 17th IEEE International Conference on. (MEMS), 2004, pp. 568-571.

[25] B. Philippon, "Design of a film cooled MEMS micro turbine," Massachusetts Institute of Technology, 2001.

[26] M.-C. Tsai and L.-Y. Hsu, "Design of a Miniature Axial-Flux Spindle Motor With Rhomboidal PCB Winding," IEEE Transactions on Magnetics, vol. 42, no. 10, pp. 3488 3490, October 2006.

[27] B. S. Jeon, K. J. Park, S. J. Song, Y. C. Joo, and K. D. Min, "Design, fabrication, and testing of a MEMS micro-turbine," J Mech Sci Technol, vol. 19, no. 2, pp. 682-691, February 2005.

[28] "turbine: History of water turbine technology—Britannica Online Encyclopedia," 31 Jan. 2013. [Online]. Available: http://www.britannica com/EBchecked/topic/609552/turbine/45676/History-of-water-turbine-technology. [Accessed: 31 Jan. 2013].

[29] S. J. Williamson, B. H. Stark, and J. D. Booker, "Performance of a low-head pico-hydro Turgo turbine," Applied Energy, vol. 102, pp. 1114-1126, February 2013.

[30] J. De Andrade, C. Curiel, F. Kenyery, O. Aguillón, A. Vasquez, and M. Asuaje, "Numerical Investigation of the Internal Flow in a Banki Turbine," International Journal of Rotating Machinery, vol. 2011, pp. 1-12, 2011.

[31] J. Martinez-Quijada and S. Chowdhury, "Body-Motion Driven MEMS Generator for Implantable Biomedical Devices," presented at the Electrical and Computer Engineering, 2007. CCECE 2007. Canadian Conference on, 2007, pp. 164-167.

[32] "turbine: History of water turbine technology—Britannica Online Encyclopedia," 31 Jan. 2013. [Online]. Available: http://www.britannica com/EBchecked/topic/609552/turbine/45676/History-of-water-turbine-technology. [Accessed: 31 Jan. 2013].

[33] M. Durali and M. I. of T. T. A. Program, Design of small water turbines for farms and small communities. Technology Adaptation Program, Massachusetts Institute of Technology, 1976.

[34] T. Ikeda, S. Iio, and K. Tatsuno, "Performance of nano-hydraulic turbine utilizing waterfalls," Renewable Energy, vol. 35, no. 1, pp. 293-300, 2010.

[35] T. Meier, Mini hydropower for rural development: a new market-oriented approach to maximize electrification benefits with special focus on Indonesia. Lit Verlag, 2001.

[36] K. Miyazaki, M. Takashiri, J. -i. Kurosaki, B. Lenoir, A. Dauscher, and H. Tsukamoto, "Development of a micro-generator based on Bi2Te3 thin films," presented at the Thermoelectrics, 2007. ICT 2007. 26th International Conference on, 2007, pp. 294-299.

[37] WangWang, J. Liu, Song, and Z. L. Wang, "Integrated Nanogenerators in Biofluid," Nano Letters, vol. 7, no. 8, pp. 2475-2479, 2007.

[38] R. Cordero, A. Rivera, M. Neuman, R. Warrington, and E. Romero, "Micro-rotational electromagnetic generator for high speed applications," presented at the 2012 IEEE 25th International Conference on Micro Electro Mechanical Systems (MEMS), 2012, pp. 1257-1260.

[39] S. Kerzenmacher, J. Ducree, R. Zengerle, and F. von Stetten, "An abiotically catalyzed glucose fuel cell for powering medical implants: Reconstructed manufacturing protocol and analysis of performance," Journal of Power Sources, vol. 182, no. 1, pp. 66-75, July 2008.

[40] Y. J. Chen, C. T. Pan, and Z. H. Liu, "Analysis of an in-plane micro-generator with various microcoil shapes," Microsyst Technol, vol. 19, no. 1, pp. 43-52, January 2013.

[41] J. Martinez-Quijada and S. Chowdhury, "Body-Motion Driven MEMS Generator for Implantable Biomedical Devices," in Electrical and Computer Engineering, 2007. CCECE 2007. Canadian Conference on, 2007, pp. 164-167.

[42] C. R. Saha, T. O'Donnell, N. Wang, and P. McCloskey, "Electromagnetic generator for harvesting energy from human motion," Sensors and Actuators A: Physical, vol. 147, no. 1, pp. 248-253, September 2008.

[43] S. Kerzenmacher, J. Ducree, R. Zengerle, and F. von Stetten, "Energy harvesting by implantable abiotically catalyzed glucose fuel cells," Journal of Power Sources, vol. 182, no. 1, pp. 1-17, July 2008.

[44] J. Lueke and W. A. Moussa, "MEMS-Based Power Generation Techniques for Implantable Biosensing Applications," Sensors (Basel), vol. 11, no. 2, pp. 1433-1460, January 2011.

[45] Z. Wang, "Energy harvesting for self-powered nanosystems," Nano Research, vol. 1, no. 1, pp. 1-8, July 2008.

[46] F. Herrault, C.-H. Ji, and M. G. Allen, "Ultraminiaturized High-Speed Permanent-Magnet Generators for Milliwatt-Level Power Generation," Journal of Microelectromechanical Systems, vol. 17, no. 6, pp. 1376-1387, December 2008.

[47] L. Debnath, "The legacy of Leonhard Euler—a tricentennial tribute," International Journal of Mathematical Education in Science and Technology, vol. 40, no. 3, pp. 353-388, 2009.

[48] C.-S. Liu, P.-D. Lin, and M.-C. Tsai, "A miniature spindle motor with fluid dynamic bearings for portable storage device applications," Microsystem Technologies, vol. 15, no. 7, pp. 1001-1007, 2009.

[49] "[Micro and Precision Engineering Research Group] Microturbine for electric power generation." [Online]. Available: http://www.mech.kuleuven.be/micro/topics/turbine/. [Accessed: 2 Apr. 2013].

[50] N. Ghalichechian, A. Modafe, M. I. Beyaz, and R. Ghodssi, "Design, Fabrication, and Characterization of a Rotary Micromotor Supported on Microball Bearings," Journal of Microelectromechanical Systems, vol. 17, no. 3, pp. 632-642, 2008.

[51] "Kinetron the micro energy company: the smallest micro-generators, micro-motors and micro-magnets in the world." [Online]. Available: http://www.kinetron.nl/default.htm?loadurl=http %3A//www.kinetron.nl/cms/publish/content/showpage.asp%3Fthemeid%3D1&inframe=content. [Accessed: 4 Apr. 2013].

[52] Kinetron Company, "The 14-pole Micro Generator with Sm2Co17 magnet (MG205)." [Online] Available: http://www.kinetron.nl/cms/publish/content/downloaddocument.asp?document id=7. [Accessed: 4 Apr. 2013].

[53] S. Das, D. P. Arnold, I. Zana, J. W. Park, M. G. Allen, and J. H. L. Lang, "Microfabricated high-speed axial-flux multiwatt permanent-magnet generators—Part I: Modeling," Microelectromechanical Systems, Journal of, vol. 15, no. 5, pp. 1330-1350, 2006.

[54] D. P. Arnold, S. Das, J. W. Park, I. Zana, J. H. Lang, and M. G. Allen, "Microfabricated high-speed axial-flux multiwatt permanent-magnet generators—Part II: Design, fabrication, and testing," Microelectromechanical Systems, Journal of, vol. 15, no. 5, pp. 1351-1363, 2006.

[55] R. Cordero, A. Rivera, M. Neuman, R. Warrington, and E. Romero, "Micro-rotational electromagnetic generator for high speed applications," presented at the 2012 IEEE 25th International Conference on Micro Electro Mechanical Systems (MEMS), 2012, pp. 1257-1260.

[56] M. S. Slaughter, M. A. Sobieski, D. Tamez, T. Horrell, J. Graham, P. S. Pappas, A. J. Tatooles, and J. LaRose, "HeartWare Miniature Axial-Flow Ventricular Assist Device," Tex Heart Inst J, vol. 36, no. 1, pp. 12-16, 2009.

[57] D. Timms, "A review of clinical ventricular assist devices," Medical Engineering & Physics, vol. 33, no. 9, pp. 1041-1047, November 2011.

[58] O. H. Frazier, C. Gemmato, T. J. Myers, I. D. Gregoric, B. Radovancevic, P. Loyalka, and B. Kar, "Initial Clinical Experience with the HeartMate® II Axial-Flow Left Ventricular Assist Device," Tex Heart Inst J, vol. 34, no. 3, pp. 275-281, 2007.

[59] "ABIOMED AB5000 Circulatory Support System—Texas Heart Institute—Heart Assist Devices." [Online]. Available: http://texasheart.org/Research/Devices/abiomed_ab5000.cfm. [Accessed: 5 Apr. 2013].

[60] D. J. Burke, E. Burke, F. Parsaie, V. Poirier, K. Butler, D. Thomas, L. Taylor, and T. Maher, "The HeartMate II: Design and Development of a Fully Sealed Axial Flow Left Ventricular Assist System," Artificial Organs, vol. 25, no. 5, pp. 380-385, 2001.

[61] O. H. Frazier, N. A. Shah, T. J. Myers, K. D. Robertson, I. D. Gregoric, and R. Delgado, "Use of the Flowmaker (Jarvik 2000) left ventricular assist device for destination therapy and bridging to transplantation," Cardiology, vol. 101, no. 1-3, pp. 111-116, 2004.

[62] S. Haj-Yahia, E. J. Birks, P. Rogers, C. Bowles, M. Hipkins, R. George, M. Amrani, M. Petrou, J. Pepper, and G. Dreyfus, "Midterm experience with the Jarvik 2000 axial flow left ventricular assist device," The Journal of Thoracic and Cardiovascular Surgery, vol. 134, no. 1, pp. 199-203, 2007.

[63] S. Takatani, "Progress of rotary blood pumps," Artificial organs, vol. 30, no. 5, pp. 317-321, 2006.

[64] K. E. Griffith and E. Jenkins, "Abiomed Impella® 2.5 patient transport: lessons learned," Perfusion, vol. 25, no. 6, pp. 381-386, 2010.

[65] R. Krishnamani, D. DeNofrio, and M. A. Konstam, "Emerging ventricular assist devices for long-term cardiac support," Nature Reviews Cardiology, vol. 7, no. 2, pp. 71-76, 2010.

[66] "Circulatory & Ventricular Assist Devices—Center for Circulatory Support—University of Michigan Cardiac Surgery." [Online]. Available: http://www.med.umich.edu/cardiac-surgery/patient/adult/ccs/vad.shtml. [Accessed: 5 Apr. 2013].

[67] F. M. White, Fluid Mechanics. McGraw-Hill, 2010.

[68] S. L. Dixon, Fluid mechanics, thermodynamics of turbomachinery. Butterworth-Heinemann, 2005.

[69] R. H. Enns, "World of Motion," in It's a Nonlinear World, Springer New York, 2011, pp. 131-171.

[70] I. E. Idelchik, Handbook of hydraulic resistance, 1994. Begell House, Redding, Conn., USA.

[71] H. Bruus, Theoretical microfluidics. Oxford University Press, USA, 2008.

[72] G. Ingram, Basic Concepts in Turbomachinery. Bookboon, 2009.

[73] M. Durali and M. I. of T. T. A. Program, "Design of Small Water Turbines for Farms and Small Communities," 1976.

[74] O. ZIA, O. A. GHANI, S. T. WASIF, and Z. HAMID, "DESIGN, FABRICATION AND INSTALLATION OF A MICRO-HYDRO POWER PLANT," 2010.

[75] J. L. Gordon, "Hydraulic turbine efficiency," Canadian Journal of Civil Engineering, vol. 28, no. 2, pp. 238-253, 2001.

[76] H. Bruus, Theoretical microfluidics. Oxford University Press, USA, 2008.

[77] S. L. Dixon, Fluid mechanics, thermodynamics of turbomachinery. Butterworth-Heinemann, 2005.
[78] B. S. Massey, Mechanics of fluids, vol. 1. Taylor & Francis, 1998.
[79] F. M. White, Fluid Mechanics. McGraw-Hill, 2010.
[80] T. S. Desmukh, Fluid Mechanics and Hydraulic Machines (A Lab Manual). Firewall Media, 2001.
[81] D. J. Griffiths and R. College, Introduction to electrodynamics, vol. 3. prentice Hall Upper Saddle River, N J, 1999.
[82] A. Krawczyk and S. Wiak, Electromagnetic fields in electrical engineering, vol. 22. IOS Press, 2002.
[83] H. Polinder and M. J. Hoeijmakers, "Analytic calculation of the magnetic field in PM machines," in, Conference Record of the 1997 IEEE Industry Applications Conference, 1997. Thirty-Second IAS Annual Meeting, IAS '97, 1997, vol. 1, pp. 35-41 vol. 1.
[84] D. L. Trumper, W. Kim, and M. E. Williams, "Design and analysis framework for linear permanent-magnet machines," IEEE Transactions on Industry Applications, vol. 32, no. 2, pp. 371-379, 1996.
[85] M. F. Iskander, Electromagnetic fields and waves. Prentice Hall Englewood Cliffs, 1992.
[86] A. Kovetz, Electromagnetic theory. Oxford University Press Oxford, 2000.
[87] A. Krawczyk and S. Wiak, Electromagnetic fields in electrical engineering, vol. 22. IOS Press, 2002.
[88] D. C. Hanselman, Brushless permanent-magnet motor design. McGraw-Hill New York, 1994.
[89] J. F. Gieras, R.-J. Wang, and M. J. Kamper, Axial flux permanent magnet brushless machines. Springer, 2008.
[90] J. F. Gieras, Permanent Magnet Motor Technology: Design and Applications, Third Edition. Taylor & Francis US, 2011.
[91] "Uses: Rare Earth Elements: Rare Earths Global Limited." [Online]. Available: http://www.rareearthsglobal.com/content/products/uses.htm. [Accessed: 18 Oct. 2013].
[92] M. Humphries, Rare earth elements: The global supply chain. DIANE Publishing, 2010.
[93] "Permanent Magnets—Magnetism & Spin Electronics—Physics—Trinity College Dublin." [Online] Available: http://www.tcd.ie/Physics/Magnetism/Research/permanent.php. [Accessed: 18 Oct. 2013].
[94] Z. Q. Zhu and C. C. Chan, "Electrical machine topologies and technologies for electric, hybrid, and fuel cell vehicles," in Vehicle Power and Propulsion Conference, 2008. VPPC'08. IEEE, 2008, pp. 1-6.
[95] K. T. Chau, null, and C. Liu, "Overview of Permanent-Magnet Brushless Drives for Electric and Hybrid Electric Vehicles," IEEE Transactions on Industrial Electronics, vol. 55, no. 6, pp. 2246-2257, June.
[96] J. R. Bumby and R. Martin, "Axial-flux permanent-magnet air-cored generator for small-scale wind turbines," Electric Power Applications, IEE Proceedings—, vol. 152, no. 5, pp. 1065-1075, 2005.
[97] D. W. Novotny, Vector Control and Dynamics of AC Drives. Oxford University Press, 1996.
[98] A. M. EL-Refaie and T. M. Jahns, "Optimal flux weakening in surface PM machines using concentrated windings," in Conference Record of the 2004 IEEE Industry Applications Conference, 2004. 39th IAS Annual Meeting, 2004, vol. 2, pp. 1038-1047 vol. 2.
[99] J. Y. Chen, C. V. Nayar, and L. Xu, "Design and finite-element analysis of an outer-rotor permanent-magnet generator for directly coupled wind turbines," IEEE Transactions on Magnetics, vol. 36, no. 5, pp. 3802-3809, 2000.

B. Chao, "Hard Disk Drive Spindle Motor System Design For Data Recording With Ultrahigh TPI," pp. 5123-5128, November D.-K. Jang and J.-H. Chang, "Development of a new spindle motor for a hard disk drive," pp. 1601-1606, September 2013.

Z. J. Liu, C. Bi, Q. D. Zhang, M. A. Jabbar, and T. S. Low, "Electromagnetic design for hard disk drive spindle motors with fluid film lubricated bearings," pp. 3893-3895, September 1996.

J. F. Gieras, Permanent Magnet Motor Technology: Design and Applications, Third Edition. Taylor & Francis US, 2011.

L. JIANGTAO, "Analysis and determination of cogging torque and unbalanced magnetic forces in permanent magnet spindle motors for hard disk drives," 2006.

Q. Li, V. Naing, and J. M. Donelan, "Development of a biomechanical energy harvester," Journal of NeuroEngineering and Rehabilitation, vol. 6, no. 1, p. 22, June 2009.

K. Bazaka and M. V. Jacob, "Implantable Devices: Issues and Challenges," Electronics, vol. 2, no. 1, pp. 1-34, 2012.

What is claimed is:

1. A rotor, comprising:
    a plurality of blades, wherein each blade has a proximal edge, a distal edge, and a length running between the proximal edge and the distal edge, the proximal edges of the blades are disposed at a predetermined concentric orientation about a rotational axis of the rotor; and
    a notch centrally and adjacently disposed on the proximal edge of each blade.

2. The rotor of claim 1, further including a central hub axially aligned with the rotational axis of the rotor, and the axial hub having a lateral surface in communication with the proximal edge of each blade.

3. The rotor of claim 2, wherein the hub has a cylindrical shape with a radius that is equal to half of a total radius of the rotor.

4. The rotor of claim 1, further including a first support disc and a second support disc, wherein each support disc is axially aligned with the rotational axis of the rotor and in communication with a side of each blade in the plurality of blades.

5. The rotor of claim 1, wherein the notch in each blade is semicircular in shape and has a radius equal to or less than half of a radius of one of the blades.

6. A turbine generator, comprising:
    a turbine casing, wherein the turbine casing further includes an inlet section, a nozzle fluidly coupled to the inlet section, a rotor chamber fluidly coupled to the nozzle, an outlet section fluidly coupled to the rotor chamber, and hollows adapted to receive inductor coils;
    a rotor disposed in the rotor chamber, the rotor including a plurality of blades, wherein each blade in the plurality of blades has a central transversal axis, a distal edge, a proximal edge disposed at a predetermined concentric orientation about a rotational axis of the rotor and a notch disposed along the central transversal axis;
    a magnet generator assembly further comprising:
        at least one permanent magnet disposed on the rotor; and
        at least one inductor coil disposed in the hollows of the turbine casing in an orientation perpendicular to the centrifugal movement of the at least one permanent magnet.

7. The turbine generator according to claim 6, further comprising a levitation system including a plurality of permanent magnets disposed in a first wall of the turbine casing, a plurality of permanent magnets disposed in a second wall of the turbine casing, and a plurality of permanent magnets disposed in the rotor, wherein the permanent magnets disposed in the rotor and turbine casing are configured to magnetically suspend the rotor in the rotor chamber such that the rotor is not in contact with the turbine casing.

8. The turbine generator according to claim 6, wherein the rotor further includes a cross-flow design such that the notch on each blade is adjacent to the proximal edge of each blade.

9. The turbine generator according to claim 6, wherein the rotor further includes a cylindrical hub axially aligned with the rotor's axis of rotation, wherein the hub includes a lateral surface in communication with the proximal edge of each blade.

10. The turbine generator according to claim 9, wherein the hub has a radius that is generally equal to half of a total radius of the rotor.

11. The turbine generator according to claim 6, wherein the at least one inductor coil includes a plurality of inductor coils having a 3-phase, 9-slot winding layout, where each phase has three circular coils separated by 120 degrees in a star configuration and connected in series.

12. The turbine generator according to claim 6, further comprising each part of the turbine generator made of or coated in a biocompatible material.

13. The turbine generator according to claim 6, wherein the inlet section and outlet section of the turbine casing are separated by an angle of one hundred degrees with respect to the rotational axis of the rotor.

14. The turbine generator according to claim 6, further including a first support disc and a second support disc, wherein each support disc is axially aligned with the rotational axis of the rotor and in communication with a side of each blade.

15. The turbine generator according to claim 6, wherein the notch in each blade is semicircular in shape and has a radius equal to or less than half of the radius of one of the blades.

16. A turbine generator, comprising:
   a turbine casing, wherein the turbine casing further includes:
      an inlet section;
      a nozzle fluidly coupled to the inlet section;
      a rotor chamber fluidly coupled to the nozzle;
      an outlet section fluidly coupled to the rotor chamber;
      hollows adapted to receive inductor coils; and
      one hundred degrees of separation between the inlet section and the outlet section;
   a rotor disposed in the rotor chamber, wherein the rotor further includes:
      a central hub;
      a plurality of blades, wherein each blade has a central transversal axis, a distal edge, a proximal edge attached to the central hub, and a notch disposed along the central transversal axis adjacent to the proximal edge;
      a first support disc and a second support disc, wherein each support disc is axially aligned with the rotational axis of the rotor and in communication with a side of each blade;
   a magnet generator assembly further comprising:
      at least one permanent magnet disposed in the rotor;
      at least one inductor coil disposed in the hollows of the turbine casing in an orientation perpendicular to the centrifugal movement of the at least one permanent magnet; and
   a levitation system including a plurality of permanent magnets disposed in a first wall of the turbine casing, a plurality of permanent magnets disposed in a second wall of the turbine casing, and a plurality of permanent magnets disposed in the rotor, wherein the permanent magnets disposed in the rotor and turbine casing are configured to magnetically suspend the rotor structure in the rotor chamber such that the rotor structure is not in contact with the turbine casing.

17. The turbine generator according to claim 16, wherein the at least one inductor coil includes a plurality of inductor coils having a 3-phase, 9-slot winding layout, where each phase has three circular coils separated by 120 degrees in a star configuration and connected in series.

18. The turbine generator according to claim 16, wherein the hub of the rotor has a cylindrical shape with a radius that is generally equal to half of a total radius of the rotor.

19. The turbine generator according to claim 16, wherein the notch in each blade is semicircular in shape and has a radius equal to or less than half of the radius of one of the blades.

* * * * *